US007890580B2

(12) United States Patent
Kikkoji et al.

(10) Patent No.: US 7,890,580 B2
(45) **Date of Patent: *Feb. 15, 2011**

(54) COMMUNICATION METHOD, COMMUNICATION DEVICE, AND PROGRAM

(75) Inventors: Hiroyuki Kikkoji, Tokyo (JP); Nozomu Okuzawa, Tokyo (JP); Yoshiyuki Takaku, Tokyo (JP); Susumu Yamahara, Tokyo (JP); Shinsuke Yamashita, Kanagawa (JP); Jun Moriya, Tokyo (JP); Yasuhiro Murase, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/618,460

(22) Filed: Nov. 13, 2009

(65) Prior Publication Data

US 2010/0057889 A1 Mar. 4, 2010

Related U.S. Application Data

(62) Division of application No. 10/556,944, filed as application No. PCT/JP2004/007033 on May 18, 2004, now Pat. No. 7,631,036.

(30) Foreign Application Priority Data

| | | | |
|---|---|---|---|
| Jul. 14, 2003 | (JP) | ............................. | 2003-274302 |
| Aug. 11, 2003 | (JP) | ............................. | 2003-291741 |
| Sep. 4, 2003 | (JP) | ............................. | 2003-313167 |
| Sep. 26, 2003 | (JP) | ............................. | 2003-336377 |

(51) Int. Cl.
*G06F 15/16* (2006.01)

(52) U.S. Cl. ....................... 709/203; 709/219; 709/231; 725/2; 725/4; 725/34; 725/36; 725/39; 725/44; 725/56; 725/60; 725/61; 725/87; 725/97

(58) Field of Classification Search ................ 709/203, 709/219, 231; 725/2, 4, 34, 36, 39, 44, 56, 725/60, 61, 87, 97
See application file for complete search history.

(56) References Cited

U.S. PATENT DOCUMENTS 5,826,029 A 10/1998 Gore, Jr. et al.

(Continued)

FOREIGN PATENT DOCUMENTS

JP 5-219053 8/1993

(Continued)

*Primary Examiner*—Michael Won
(74) *Attorney, Agent, or Firm*—Oblon, Spivak, McClelland, Maier & Neustadt, L.L.P.

(57) ABSTRACT

To further correctly obtain related information about contents being received from a server. A communication apparatus 1 successively transmits request information that requests related information about contents being received via a network 30, at specified intervals (S1), receives related information corresponding to that request information (S2), temporarily stores (S3), displays it (S4), and performs contents updating processing. Here, if a direction to store the related information about the contents is entered, the communication apparatus 1 requests again request information for related information about contents, separately from the contents updating processing (S10). Then, the communication apparatus 1 receives related information corresponding to that request information (S11), and stores it (S13). This enables the latest related information to be further correctly obtained out of related information concerning contents, and obtaining related information before updating is reduced.

16 Claims, 23 Drawing Sheets

U.S. PATENT DOCUMENTS

| | | | | |
|---|---|---|---|---|
| 6,002,394 | A | 12/1999 | Schein et al. | |
| 6,317,784 | B1 | 11/2001 | Mackintosh et al. | |
| 6,453,355 | B1 | 9/2002 | Jones et al. | |
| 6,501,854 | B1 * | 12/2002 | Konishi et al. | 382/181 |
| 6,587,547 | B1 | 7/2003 | Zirngibl et al. | |
| 6,611,623 | B2 * | 8/2003 | Konishi et al. | 382/181 |
| 6,708,203 | B1 | 3/2004 | Makar et al. | |
| 6,799,326 | B2 | 9/2004 | Boylan, III et al. | |
| 6,938,080 | B1 | 8/2005 | Kahveci et al. | |
| 6,968,364 | B1 | 11/2005 | Wong et al. | |
| 6,985,694 | B1 | 1/2006 | De Bonet et al. | |
| 7,058,965 | B1 | 6/2006 | Gordon et al. | |
| 7,124,424 | B2 | 10/2006 | Gordon et al. | |
| 7,134,131 | B1 | 11/2006 | Hendricks et al. | |
| 7,197,713 | B2 | 3/2007 | Stern | |
| 7,231,416 | B1 | 6/2007 | Busuioc | |
| 7,263,560 | B2 | 8/2007 | Abdelaziz et al. | |
| 7,308,413 | B1 | 12/2007 | Tota et al. | |
| 7,346,650 | B2 * | 3/2008 | Nomura et al. | 709/203 |
| 7,356,477 | B1 | 4/2008 | Allan et al. | |
| 7,373,652 | B1 | 5/2008 | Bayrakeri et al. | |
| 7,421,123 | B2 * | 9/2008 | Konishi et al. | 382/181 |
| 2005/0267750 | A1 | 12/2005 | Steuer et al. | |
| 2006/0217829 | A1 | 9/2006 | Umezawa et al. | |

FOREIGN PATENT DOCUMENTS

| | | |
|---|---|---|
| JP | 10-336169 | 12/1998 |
| JP | 11-31129 | 2/1999 |
| JP | 2000-181778 | 6/2000 |
| JP | 2000-222360 | 8/2000 |
| JP | 2001-195064 | 7/2001 |
| JP | 2001-273305 | 10/2001 |
| JP | 2001-307464 | 11/2001 |
| JP | 2002-358283 | 12/2002 |
| JP | 2003-46459 | 2/2003 |
| JP | 2003-92556 | 3/2003 |
| JP | 2003-150174 | 5/2003 |
| JP | 2003-208369 | 7/2003 |

* cited by examiner

COMMUNICATION METHOD, COMMUNICATION DEVICE, AND PROGRAM

CROSS-REFERENCE TO RELATED APPLICATIONS

This application is a continuation of U.S. patent application Ser. No. 10/556,944, filed on Nov. 16, 2005, the entire content of which is incorporated herein by reference. U.S. patent application Ser. No. 10/556,944 is the National Stage of PCT/JP04/07033, filed on May 18, 2004, which claims priority to Japanese Application No. 2003-274302, filed on Jul. 14, 2003, Japanese Application No. 2003-291741, filed on Aug. 11, 2003, Japanese Application No. 2003-313167, filed on Sep. 4, 2003, and Japanese Application No. 2003-336377, filed on Sep. 26, 2003.

TECHNICAL FIELD

The present invention relates to a communication method, a communication apparatus and a program, and more particularly relates to a communication method, a communication apparatus and a program for correctly obtaining necessary information out of information provided via a network.

BACKGROUND ART

Radio stations and television (TV) stations (hereinafter, they are simply referred to as "broadcasting stations") broadcast various programs, and audiences listen to or watch a program by selecting a frequency and receiving a broadcast signal at the predetermined frequency transmitted from each broadcasting station by a radio receiver or a TV receiver. In recent years, the broadcasting stations release information peculiar to each broadcasting station on the network, and provide information on the programs that were broadcasted, such as information about the contents of the broadcasted programs and the musical compositions that were broadcasted in the programs, to the audiences.

Specifically, as to a musical composition broadcasted by a radio station, in addition to the tune title and the artist name, information including the title, the serial number, the year of release, the sales company, the broadcasting time and date, and the like, of a compact disc (CD) in that the musical composition is recorded is released on the network. Further, also information about the musical compositions that were broadcasted in a past specific time is released. Generally, such information is updated at appropriate time. Heretofore, the information about the musical compositions was obtained by the user by using a personal computer (PC) or the like connected to the network.

Further, also search systems in which by using a portable auxiliary terminal having a radio receiving section, time memorizing means, and the like, when the user was pleased with a musical composition that was broadcasted, the time is memorized in the auxiliary terminal, and information about such musical composition is retrieved later from a database in that information has been stored by the broadcasting station based on that time via a PC or the like have been proposed (for example, see patent document 1).

In this manner, the user can obtain the information about the musical composition by using a PC or an auxiliary terminal. Furthermore, also the distribution of a musical composition and the purchase of a CD can be performed based on the obtained information.

Patent Document 1—Patent laid-open number 2001-273305 (paragraph number [0021]-[0029], FIG. 1).

However, actual broadcasting and updating of information obtainable by the user is not linked correctly, and the information is usually updated at constant intervals. Thus, if the user found a musical composition that he/she likes under broadcasting and thereupon performs an operation to obtain information about that musical composition by using a PC or the like, there is a case where information obtainable by the user still has not been updated at the time, and the user obtains information about the musical composition immediately before the musical composition that the user likes. Therefore, the user has to perform the operation to obtain the objective information again after waiting for updating of obtainable information, or since it was a tune that the user listened for the first time, the user erroneously recognizes that thus obtained information about the musical composition immediately before the tune as correct information.

Further, in search systems using a conventional auxiliary terminal, correct information about musical composition being broadcasted cannot be obtained in real time.

DESCRIPTION OF THE INVENTION

Considering the above points, the present invention has been done and aims to provide a communication method between the information obtaining side and the information providing side such as a broadcasting station that enables the user who wants to obtain information to further correctly obtain the latest information.

Furthermore, the present invention aims to provide a communication apparatus and a program that enables the user who wants to obtain information to further correctly obtain the latest information.

To solve the above problems, in a communication method according to the present invention, the first transmission step of successively transmitting request information that requests related information concerning contents in a broadcasting program being received, at specified intervals, the first receiving step of receiving related information corresponding to the request information transmitted in the first transmission step, the temporarily-storing step of temporarily storing the related information received in the first receiving step in temporarily-storing means, the display step of displaying the related information temporarily stored in the temporarily-storing step, the second transmission step of transmitting request information that requests related information about contents, according to an input that directs to store the related information about the contents, the second receiving step of receiving related information corresponding to the request information transmitted in the second transmission step, and the storing step of storing the related information received in the second receiving step in storing means are provided.

According to such communication method, request information that requests related information concerning contents in a broadcasting program being received is successively transmitted at specified intervals, and related information corresponding to that request information is received, temporarily stored, and displayed. And then, if a command to store the related information about the contents is inputted, request information for the related information about the contents is requested again, and related information corresponding to that request information is received and stored.

Further, in a communication method according to the present invention, the first terminal transmission step of successively transmitting request information that requests related information concerning contents in a broadcasting program being received at specified intervals by a terminal apparatus, the first server transmission step of transmitting related information corresponding to the request information to the terminal apparatus by a server that provides the above related information, the first terminal receiving step of receiving the related information transmitted by the first server transmission step, by the terminal apparatus, the temporarily-storing step of temporarily storing the related information received in the first terminal receiving step in temporarily-storing means by the above terminal apparatus, the display step of displaying the related information temporarily stored in the temporarily-storing step by the terminal apparatus, the second terminal transmission step of transmitting request information that requests related information about contents, according to an input that directs to store the related information about the contents by the terminal apparatus, the second server transmission step of transmitting related information corresponding to the request information transmitted in the second terminal transmission step to the terminal apparatus by the server, and the storing step of storing the related information transmitted in the second server transmission step in storing means by the terminal apparatus are provided.

According to such communication method, request information that requests related information concerning contents in a broadcasting program being received is successively transmitted at specified intervals, and related information corresponding to that request information is received, temporarily stored, and displayed. Then, if a command to store the related information about the contents is inputted, request information for related information about the contents is requested again, and related information corresponding to that request information is received and stored.

Further, in a communication apparatus according to the present invention, first transmission means for successively transmitting request information that requests related information concerning contents in a broadcasting program being received at specified intervals, first receiving means for receiving related information corresponding to the request information transmitted by the first transmission means, temporarily-storing means for temporarily storing the related information received by the first receiving means, display means for displaying the related information stored by the temporarily-storing means, second transmission means for transmitting request information that requests related information about contents, according to an input that directs to store the related information about the contents, second receiving means for receiving related information corresponding to the request information transmitted by the second transmission means, and storing means for storing the related information received by the second receiving means are provided.

According to such communication apparatus, the first transmission means successively transmits request information that requests related information concerning contents in a broadcasting program being received at specified intervals. The first receiving means receives related information corresponding to that transmitted request information. The temporarily-storing means temporarily stores the received related information. And the display means displays the related information temporarily stored. Further, the second transmission means transmits again request information that requests related information, according to an input that directs to store the related information about the contents. The second receiving means receives related information corresponding to that transmitted request information. And the storing means stores the received related information.

Furthermore, a program according to the present invention makes a computer perform the processing for successively transmitting request information that requests related information concerning contents in a broadcasting program being received at specified intervals, for receiving related information corresponding to the transmitted request information, for temporarily-storing the received related information in temporarily-storing means, for displaying the related information temporarily stored in the temporarily-storing means, for transmitting request information that requests related information about contents, according to an input that directs to store the related information about the contents, for receiving related information corresponding to the request information transmitted according to the input that directs to store the related information about the contents, and for storing the received related information corresponding to the request information transmitted according to the input that directs to store the related information about the contents in storing means.

According to such program, request information that requests related information concerning contents in a broadcasting program being received is successively transmitted at specified intervals, related information corresponding to that transmitted request information is received and temporarily stored. After the display of the related information temporarily stored, related information about the contents is requested again according to a command to store the related information about the contents, and the related information is received and stored.

According to the present invention, related information concerning contents in a broadcasting program being received is requested at specified intervals, and the related information is received and displayed, and if there is an input that directs to store the related information about the contents, related information is requested again, and the related information is received. Therefore, among the related information, the specified information that is the latest related information when the storing was directed can be correctly obtained, and that the user erroneously obtains information from the information providing side is reduced. Thus, communication between the information obtaining side and the information providing side can be correctly and smoothly performed.

BEST MODE FOR CARRYING-OUT OF THE INVENTION

Embodiments according to the present invention will be described in detail with reference to the accompanying drawings.

(1) Basic Principle of this Invention

Figure 1:
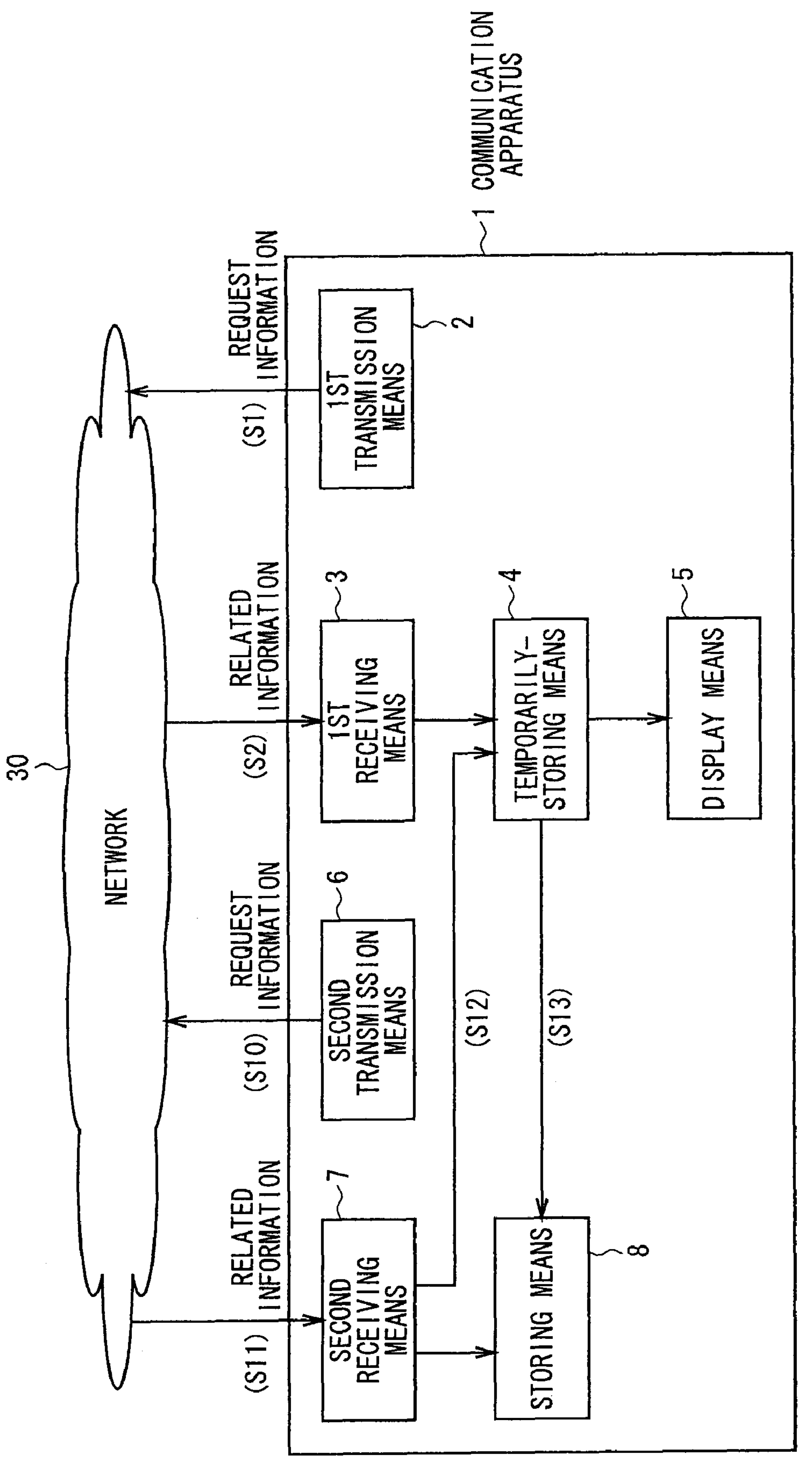
FIG. 1 is a block diagram of a communication apparatus according to the present invention.

FIG. 1 is a block diagram of a communication apparatus according to the present invention.

This communication apparatus 1 shown in FIG. 1 is a communication apparatus on the information obtaining side that obtains related information concerning contents such as musical compositions in a broadcasting program distributed via a network 30. This communication apparatus 1 has first transmission means 2 for successively transmitting request information that requests related information concerning such contents, to a communication apparatus on the information providing side such as a server via the network 30, at specified intervals, for example, every 30 seconds.

Further, the communication apparatus 1 has first receiving means 3 for receiving related information corresponding to the request information transmitted by the first transmission means, via the network 30, temporarily storing means 4 for temporarily storing the received related information in a storage unit or the like, and display means 5 for displaying the related information temporarily stored, such as a display unit.

The communication apparatus 1 has second transmission means 6, when there was an input that directs to store related information about contents, for transmitting again request information that requests related information about contents, to the communication apparatus on the information providing side such as a server via the network 30. Further, the communication apparatus 1 has second receiving means 7 for receiving related information corresponding to the request information via the network 30, and storing means 8 for recording and storing the received related information in a storage unit or the like.

Figure 2:
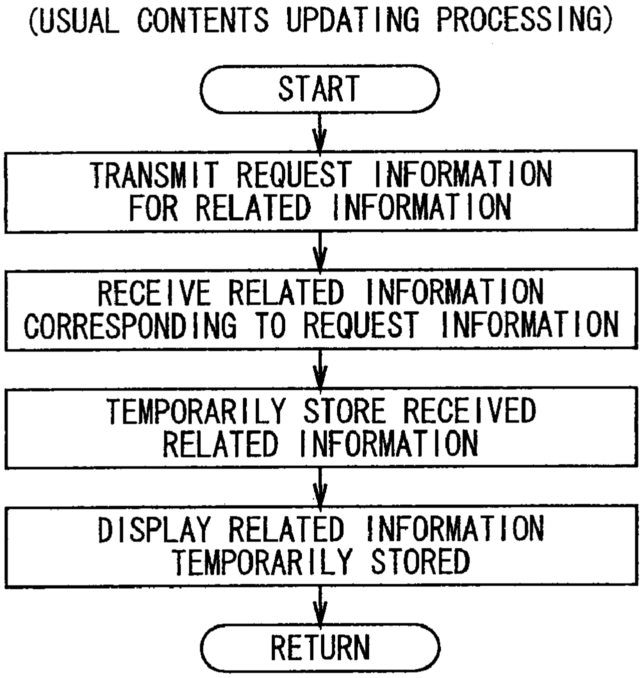
FIG. 2 is a flowchart showing the flow of normal contents updating processing.
Figure 3:
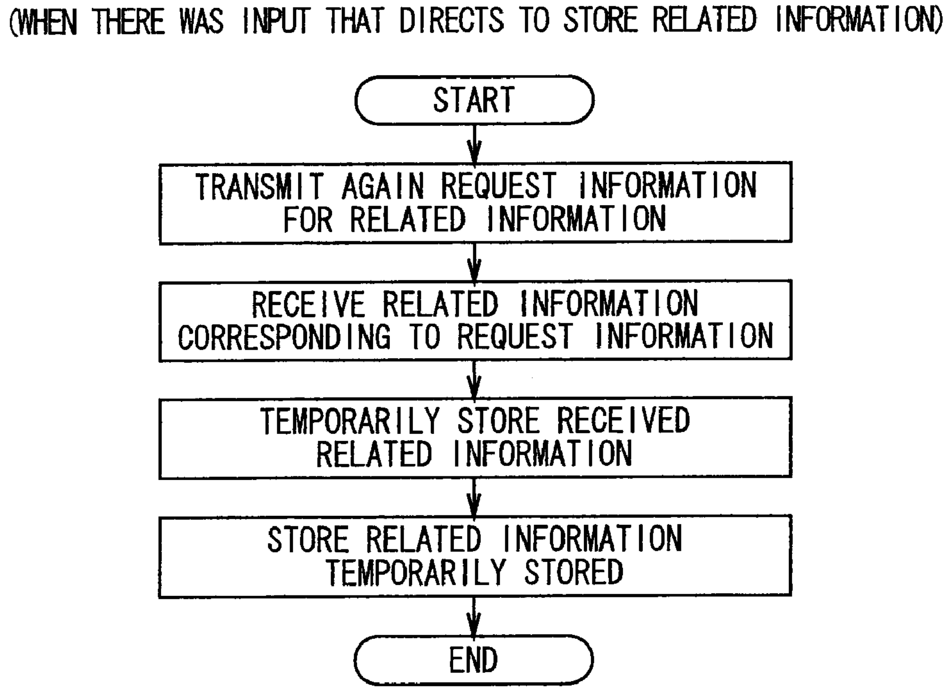
FIG. 3 is a flowchart showing the flow when there was an input that directs to store related information.

FIGS. 2 and 3 are charts showing the flow of processing in the communication apparatus according to the present invention.

FIG. 2 is a flowchart showing the flow of normal contents updating processing, and FIG. 3 is a flowchart showing the flow when there was an input that directs to store related information.

As shown in FIG. 2, when in obtaining related information about contents by means of the communication apparatus 1 having the above configuration, the communication apparatus 1 successively transmits request information that requests related information to a server or the like at specified intervals by the first transmission means 2 (step S1), and receives related information corresponding to the transmitted request information by the first receiving means 3 (step S2).

The communication apparatus 1 temporarily stores the related information received by the first receiving means 3 by the temporarily-storing means 4 (step S3). At the same time, the communication apparatus 1 displays the related information temporarily stored by the display means 5 (step S4). Such system that the communication apparatus 1 successively performs polling to a server and obtains and displays related information about broadcasting contents being received in real time will be described later, as a second embodiment with reference to a sequence chart further detailed.

If there is an input that directs to store related information about contents, as shown in FIG. 3, the communication apparatus 1 transmits again request information that requests related information to a server or the like by the second transmission means 6 (step S10), receives related information corresponding to the transmitted request information by the second receiving means 7 (step S11), temporarily stores the received related information by the temporarily-storing means 4 (step S12), and stores the related information temporarily stored by the storing means 8 (step S13).

In these steps S12 and S13, the received related information is temporarily stored, and then the related information temporarily stored is stored. Thereby, for instance, only the information which should be stored at last can be stored in the storing means 8 among the related information temporarily stored in the temporarily-storing means 4. Note that, the related information received by the second receiving means 7 also can be directly stored in the storing means 8 without via the temporarily-storing means 4.

According to such communication method, normally, related information concerning contents in a broadcasting program being received is requested, received and displayed at specified intervals, and when there was an input that directs to store related information, related information is requested again. Therefore, even if contents still has not been updated on the display, related information about the contents when the storing was directed can be obtained. As a result, the latest related information can be correctly obtained. Thus, that erroneous information is stored in the communication apparatus 1 is reduced, and communication between the information obtaining side and the information providing side can be correctly and smoothly performed.

(2) First Embodiment

In a first embodiment, as an example, a network system in which the above communication apparatus 1 is used as a terminal unit that is connected to the server of a broadcasting station or the like via a network and the user of the terminal unit can obtain related information about musical compositions provided by the server via the network will be described. Here, in the related information about the music composition, in addition to the title and the artist name of the musical composition, the title and the product number, the year of release, the sales company, of the CD or the like in that the musical composition is recorded, and the time and date that the musical composition was broadcasted, and the like, are included. Hereinafter, the processing for storing related information when the user obtains the related information about a musical composition is referred to as "clip", and the clipped related information is referred to as "clip information".

Figure 4:
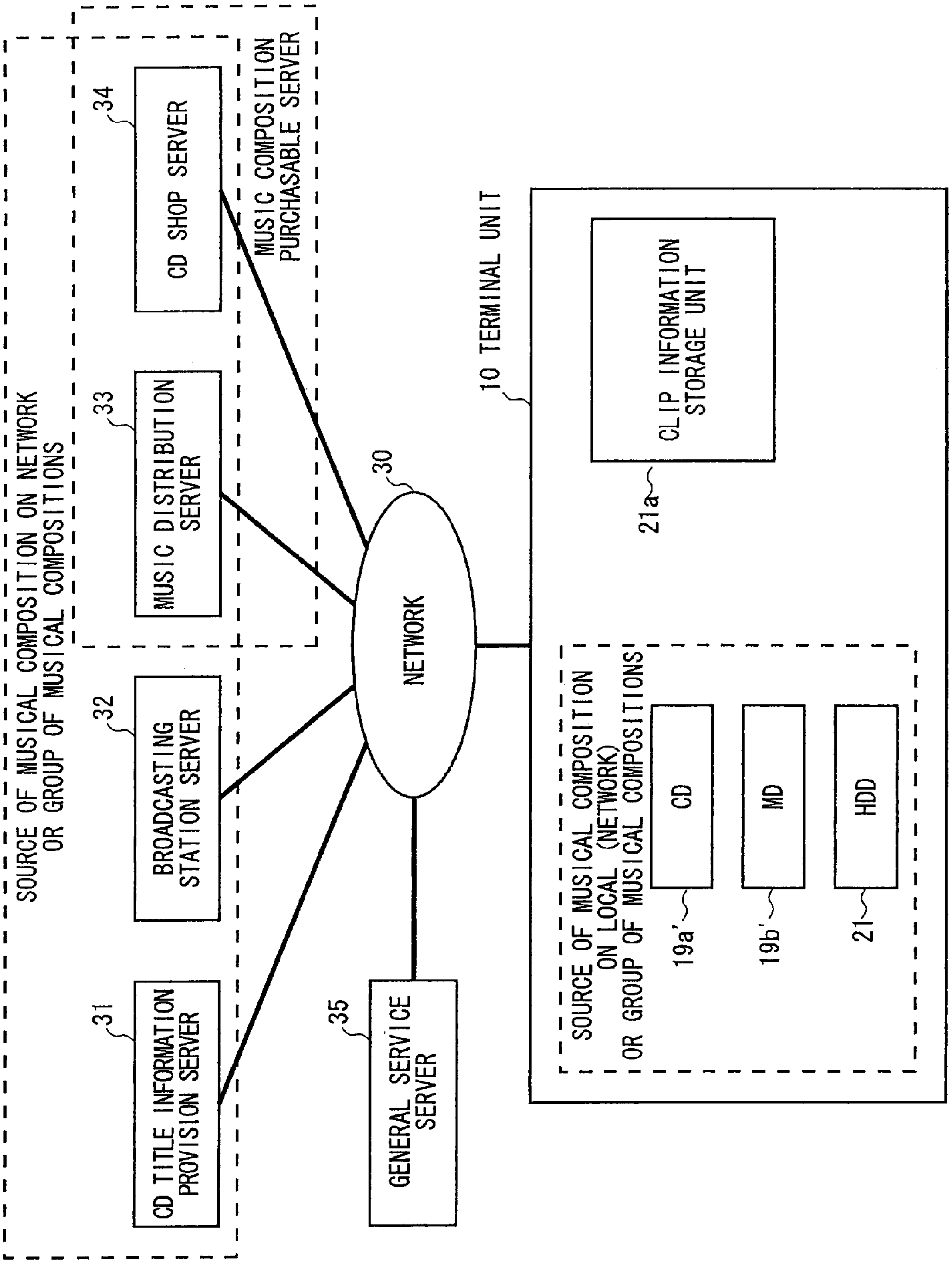
FIG. 4 is a schematic diagram illustrating a network system in a first embodiment.

FIG. 4 is a diagram illustrating the network system in the first embodiment.

A terminal unit 10 serving as a communication apparatus is connected to various servers via the network 30. The network 30 is for example the Internet. The servers are for example a CD title information provision server 31, a broadcasting station server 32 serving as a related information provision server, a music distribution server 33, a CD shop server 34, and a general service server 35 serving as an authentication server that performs various general services, and the like.

The CD title information provision server 31 performs a distribution service of related information about a musical composition recorded in a CD being on sale.

The broadcasting station server 32 is a server managed by a broadcasting station of FM, TV or the like, and performs a provision service of related information about a musical composition to be broadcasted. If roughly classifying functions for providing related information by the broadcasting station server 32, they are classified into two as follows. The first function is a (now-on-air) function to provide related information about a musical composition being broadcasted now. The second function is a function to provide a list of related information about musical compositions that were already broadcasted (on-air list), responding to a request from the terminal unit 10. For instance, the broadcasting station server 32 provides related information about musical compositions that were broadcasted in a specified program, or provides related information about musical compositions that were broadcasted within a specified time zone.

The music distribution server 33 is a server that performs a service to distribute digital data about a musical composition (musical composition data). For instance, the music distribution server 33 provides musical composition data only to the terminal unit 10 of the user who did the purchase procedure of the musical composition. Further, the music distribution server 33 can provide related information about musical compositions that can be distributed.

The CD shop server 34 is a server for performing the acceptance of orders or the like for mail order of CDs. The CD shop server 34 also performs a distribution service of audio data for demonstration or the like, and a provision service of related information about musical compositions recorded in CDs being sold.

As the above, plural servers perform provision services of information concerning a musical composition or a group of musical compositions on the network 30. That is, each server functions as the source of the musical composition or the group of musical compositions on the network 30. Here, normally, the information provided by each server is updated for example at constant intervals, and as the occasion demands, the information before updating is stored in a storage unit provided in each server, and the storage unit of an updating recording/management server further separately provided, or the like.

Note that, the servers shown in FIG. 4 are an example of the apparatus that provides the source of a musical composition or a group of musical compositions via the network 30. That is, provided that it is an apparatus enabling the other apparatuses to access the source of musical composition or a group of musical compositions on the network 30, the apparatus can function as the source of the musical composition or the group of musical compositions on the network 30.

Further, the music distribution server 33 and the CD shop server 34 are musical composition purchasable servers, and has a function to sell audio data about a musical composition or audio data about a group of musical compositions by on-line. If the user accesses the musical composition purchasable server by operating the terminal unit 10, the user can practically purchase a musical composition or a group of musical compositions via the network 30. By performing a purchase procedure to the music distribution server 33, the user of the terminal unit 10 can download audio data from the music distribution server 33. Further, by performing a purchase procedure to the CD shop server 34, the user of the terminal unit 10 can have the shop deliver a CD or the like to his/her house.

The terminal unit 10 stores the source of a musical composition or a group of musical compositions on a local network in a recording medium such as a CD 19*a*', a Mini Disc (MD, trademark) 19*b*', and a hard disk drive (HDD) 21. These sources are different depending on the type and the purpose of the terminal unit 10.

Note that, the source of the musical composition or the group of musical compositions on the local network shown in FIG. 4 is an example. That is, provided that it is a recording medium existing on a local network of the terminal unit 10, by recording a musical composition or a group of musical compositions in it, it can be functioned as the source of the musical composition or the group of musical compositions on the local network.

On the other hand, the terminal unit 10 has a clip information storage unit 21*a* for storing clipped related information. The clip information storage unit 21*a* is a secondary storage unit in the terminal unit 10, and is a nonvolatile storage medium such as a hard disk, a magneto-optical disk, and a nonvolatile memory. For instance, a part of the memory area in the HDD or the like can be functioned as the clip information storage unit 21*a*, and can be managed as a folder (clip folder). Note that, the terminal unit 10 can perform clipping to both of a musical composition and a group of musical compositions. Therefore, as to an FM program including many interesting musical compositions, a CD album, or the like, related information about the group of interested musical compositions can be stored by one clip operation, by clipping it whole.

By the way, the terminal unit 10 in this embodiment is combined with a function as audio equipment having a function to reproduce a musical composition.

Figure 5:
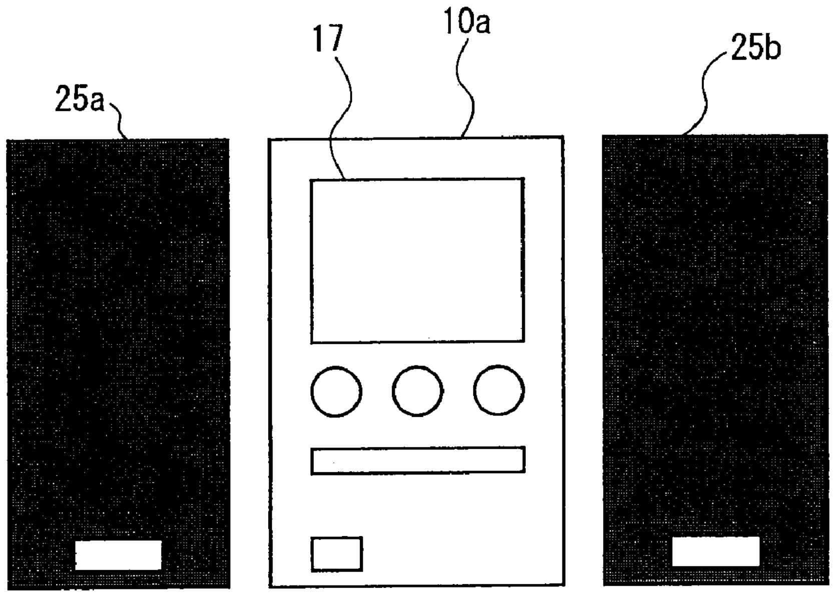
FIG. 5 is a schematic diagram illustrating an appearance of a terminal unit.
Figure 5:
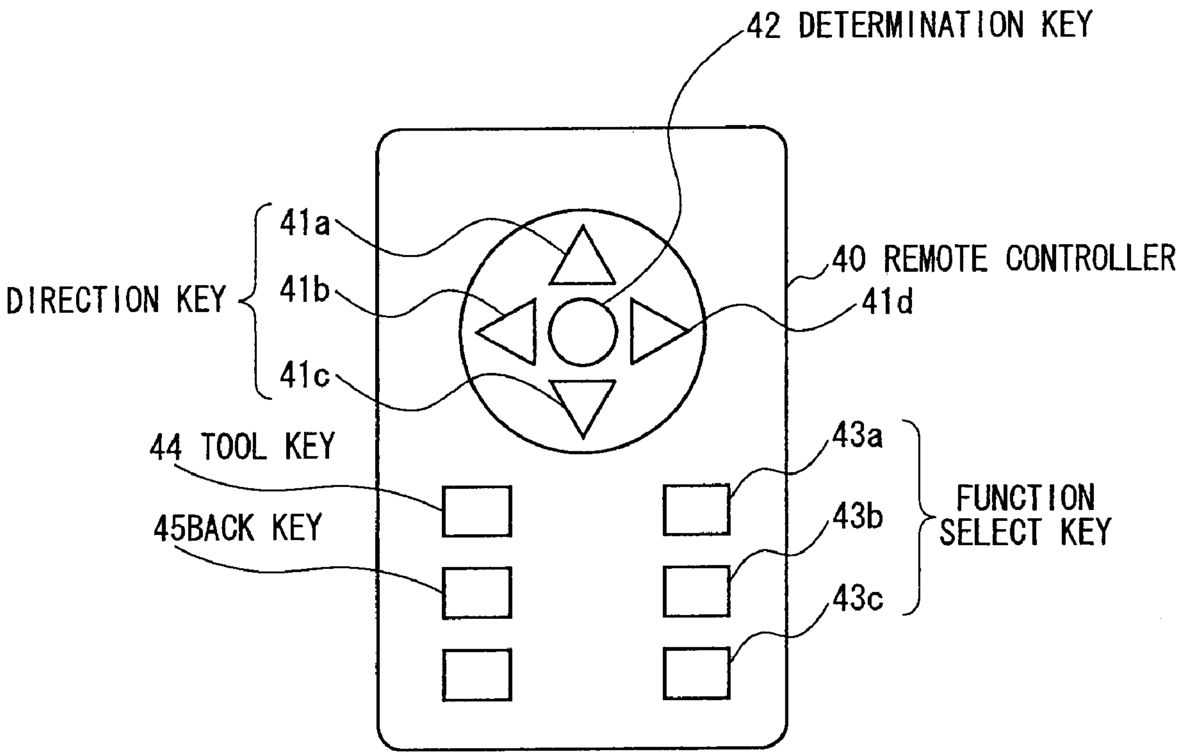

FIG. 5 is a diagram illustrating the appearance of the terminal unit.

As shown in FIG. 5, the terminal unit 10 according to this embodiment has an appearance similar to a general system component. The terminal unit 10 is composed of a main body of unit 10*a*, speakers 25*a*, 25*b*, and a remote controller 40. In the main body of unit 10*a*, a function to play a CD and a digital versatile disc (DVD), a function to record/play an MD, and a function to receive FM broadcasting and TV broadcasting are provided. An audio signal generated in the main body of unit 10*a* is transmitted to the speakers 25*a*, 25*b*, so that a sound is emitted from the speakers 25*a*, 25*b*.

Further, in the main body of unit 10*a*, a display device 17 is provided. In the display device 17, related information about a musical composition being reproduced, clipped related information, or the like is displayed.

The remote controller 40 is an input unit for remotely operating the main body of unit 10*a*. In the remote controller 40, plural operation keys are provided. If an operation key is depressed by the user, a signal corresponding to the depressed operation key is transmitted from the remote controller 40 to the main body of unit 10*a*, by radio communication means such as infrared rays.

As the operation keys, there are direction keys 41*a*-41*d*, a determination key 42, function select keys 43*a*-43*c*, a tool key 44, a back key 45, and the like.

The direction keys 41*a*-41*d* will be used to move a cursor displayed in the display device 17 and a position to be focused, for example. The four direction keys 41*a*-41*d* respectively correspond to each direction of up, down, left and right, and the cursor or the like is moved into a direction that corresponds to the depressed direction key.

The determination key 42 will be used to determine the contents displayed in the display device 17, for example.

The function select keys 43*a*-43*c* will be used to select a function. For example, the three function select keys 43*a*-43*c* are respectively corresponded to a function to use a general service, a tuner function, and a function to manage local contents. If one of the function select keys is depressed, the main body of unit 10*a* gets into the operation mode of a function that corresponds to the depressed function select key.

The tool key 44 is a button to display a tool menu on the display device 17. In the tool menu, commands which correspond to the contents displayed in the display device 17 are displayed. The user selects an arbitrary command from the tool menu, and processing corresponding to the command can be executed by the terminal unit 10. For instance, if the user selects an arbitrary command by operating the direction keys 41*a*-41*d* and depresses the determination key 42, processing corresponding to the selected command is performed in the main body of unit 10*a*.

The back key 45 is a button to return the display contents in the display device 17 to the state immediately before.

Note that, in the remote controller 40, various operation keys can be provided other than the keys shown in FIG. 5. For example, they are volume control keys, a play key of a CD or the like, and a stop key.

Next, the internal configuration of the terminal unit 10 will be described.

Figure 6:
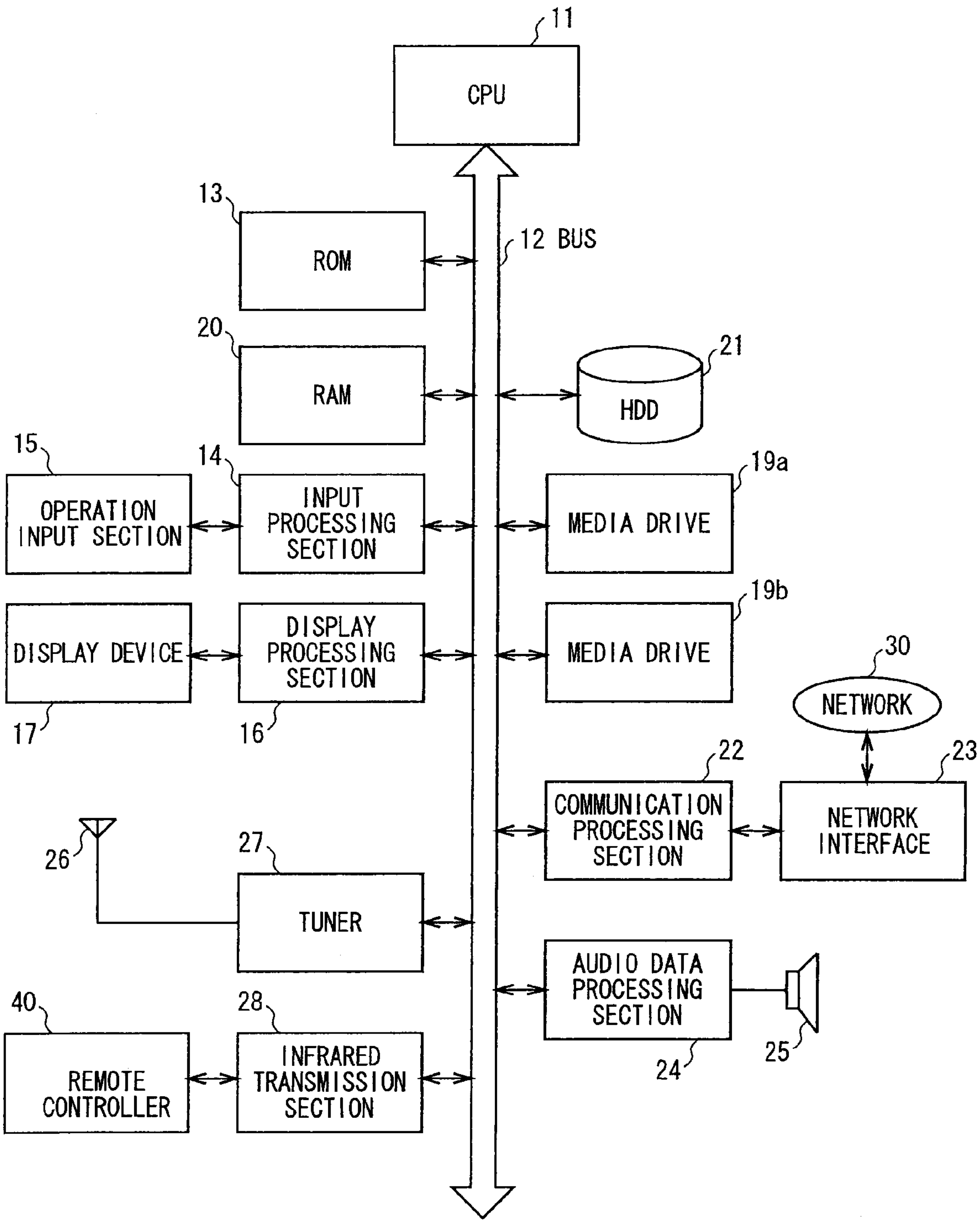
FIG. 6 is a block diagram showing the hardware configuration of the terminal unit.

FIG. 6 is a block diagram showing the hardware configuration of the terminal unit. By such terminal unit 10 as shown in FIG. 6, management, recording and reproducing of various sources of musical compositions or the like can be performed.

The central processing unit (CPU) 11 performs the entire control and operation processing of the terminal unit 10, based on a started program. For example, the CPU 11 performs communication operation via the network 30, input/output operation to the user, reproducing of contents from media and clipping, storing contents in the HDD 21 and management for it, and information search via the network 30 based on clipped related information or the like. Note that, the contents data that the terminal unit 10 of this embodiment copes with and can record/reproduce is audio contents data and contents data of motion pictures. The CPU 11 transmits/receives a control signal and data to/from each circuit section via a bus 12.

In a read only memory (ROM) 13, operating programs to be executed by the CPU 11, program loaders, various coefficients of operation, parameters used in programs, and the like have been stored. In a random access memory (RAM) 20 serving as temporarily-storing means, a program to be executed by the CPU 11 is expanded. Further, they are used as a data area and a task area that is necessary when the CPU 11 executes various processing. For instance, in the RAM 20, related information that the terminal unit 10 received from the server is temporarily stored.

The operation input section 15 has various operators such as operation keys, a jog dial, and a touch panel that are provided in the casing of the terminal unit 10. Note that, a keyboard and a mouse for graphical user interface (GUI) operation may be provided as the operation input section 15. Information inputted by the operation input section 15 is subjected to predetermined processing in an input processing section 14, and the resultant signal is transmitted to the CPU 11 as an operation command. The CPU 11 performs operations and control necessary to obtain operation as equipment that responds to the inputted operation command.

As the display device 17 serving as display means, a display device such as a liquid crystal display is connected, and various information is displayed. If the CPU 11 supplies display data to a display processing section 16 in accordance with various operating states, an input state and a communication state, the display processing section 16 makes the display device 17 perform display operation based on the supplied display data. For example, in the display device 17, the contents of related information distributed from the server and the contents of clip information are displayed. If the search of a musical composition is performed via the network 30, the search result is displayed in the display device 17.

The media drives 19*a*, 19*b* are drives that can record/reproduce the contents of a musical composition recorded in a portable recording medium or the like (also there is a case of only reproducing depending on the recording medium). Note that, the kind of recording medium that can be used for recording or reproducing by each of the media drives 19*a*, 19*b* is not limited to one. That is, also recording/reproducing can be performed to plural kinds of recording mediums. For example, the media drive 19*a* performs reproducing of a CD or a DVD, and the media drive 19*b* performs recording/reproducing of an MD.

The portable recording medium to record the contents of a musical composition or the like should not be limited to optical recording mediums such as a CD and a DVD. For instance, contents can be recorded also in a recording medium having a semiconductor memory such as a flash memory. In the case, the reader/writer of the flash memory is connected to the bus 12.

The user can view/listen to a musical composition by inserting a recording medium (such as a CD, a DVD and an MD) that arbitrary contents have been recorded into the media drive 19*a*, 19*b*, and performing a predetermined operation to the remote controller 40 or the operation input section 15. For instance, if the user operates the remote controller 40 for a direction to reproduce contents by the media drive 19*a*, the CPU 11 directs to reproduce the contents to the media drive 19*a*. In response to this, the media drive 19*a* executes reading from the loaded recording medium, by accessing the specified contents.

If thus read contents are audio contents, the contents are subjected to decoding or the like by the processing of the CPU 11 as the occasion demands, and then the resultant signal is transmitted to an audio data processing section 24. In the audio data processing section 24, the signal is subjected to the processing of a sound field such as equalizing, volume control, and processing such as D/A conversion and amplification, and the resultant signal is outputted from a speaker section 25. Note that, the speaker section 25 is composed of such plural speakers 25*a*, 25*b* as shown in FIG. 5, and the sound can be emitted in stereo.

Further, the contents reproduced by the media drive 19*a*, 19*b* also can be stored in the HDD 21 as an audio data file by the control of the CPU 11. The format of this audio data file also may be set to digital audio data at a sampling frequency 44.1 KHz in 16 bit quantization in a CD format. To save the capacity of the HDD 21, the audio data file may be set to compressed audio data in a format that was subjected to compression processing according to a predetermined method. Further, also the compression method is not limited to this but also advanced transform acoustic coding (ATRAC, trademark) method, MPEG audio layer-3 (MP3) method can be adopted.

A tuner 27 is for example an AM/FM radio tuner, and demodulates a broadcast signal received by an antenna 26 based on the control of the CPU 11. Of course, the tuner may be a television tuner, a satellite broadcasting tuner, a digital broadcasting tuner, or the like. The demodulated broadcast audio signal is subjected to necessary processing in the audio data processing section 24, and the resultant signal is outputted from the speaker section 25 as a broadcast sound.

A communication processing section 22 performs encoding of send data and decoding of receive data based on the control of the CPU 11. A network interface 23 transmits send data encoded in the communication processing section 22 to predetermined equipment for the external network, via the network. Further, the network interface 23 supplies information transmitted from the equipment for the external network via the network to the communication processing section 22. The communication processing section 22 transmits the received information to the CPU 11. As the information that the terminal unit 10 transmits via the network 30, there is request information that requests related information about contents, for example, related information about a musical composition that was broadcasted by FM radio or the like, and as the information that the terminal unit 10 receives, there is such related information about contents.

An infrared communication section 28 performs communication with the remote controller 40 by radio communication means such as infrared rays. Then, the infrared communication section 28 performs predetermined processing on a signal transmitted from the remote controller 40, and transmits thus obtained signal to the CPU 11 as an operation command. The CPU 11 performs necessary operations and control so that operation as equipment that responded to the inputted operation command can be obtained.

The processing functions of this embodiment can be realized by the hardware configuration as the above.

Note that, the configuration of the terminal unit 10 is not limited to this configuration in FIG. 6 but it can be considered further variously. For example, an interface with peripheral equipment by a communication mode such as the universal serial bus (USB), the IEEE1394, and the Bluetooth may be provided. Then, also the audio contents downloaded by the above network interface 23 via the network 30 and the audio contents transmitted via an interface such as the above USB and IEEE1394 can be stored in the HDD 21. Further, a terminal which is used to connect a microphone and an external headphone, a video output terminal which can be used when in reproducing a DVD, a line connection terminal, an optical digital connection terminal, or the like may be provided. Furthermore, a PCMCIA slot, a memory card slot or the like may be formed so that data can be transmitted/received to/from an external information processing unit and audio equipment.

Next, the configuration of program modules in the system of this embodiment will be described. Note that, a program module is data in that processing to be executed by the terminal unit 10 is described, and a predetermined function can be realized by the terminal unit 10 based on the program module. In the explanation below, the function which will be realized by executing a program module is called by the name of the program module.

Figure 7:
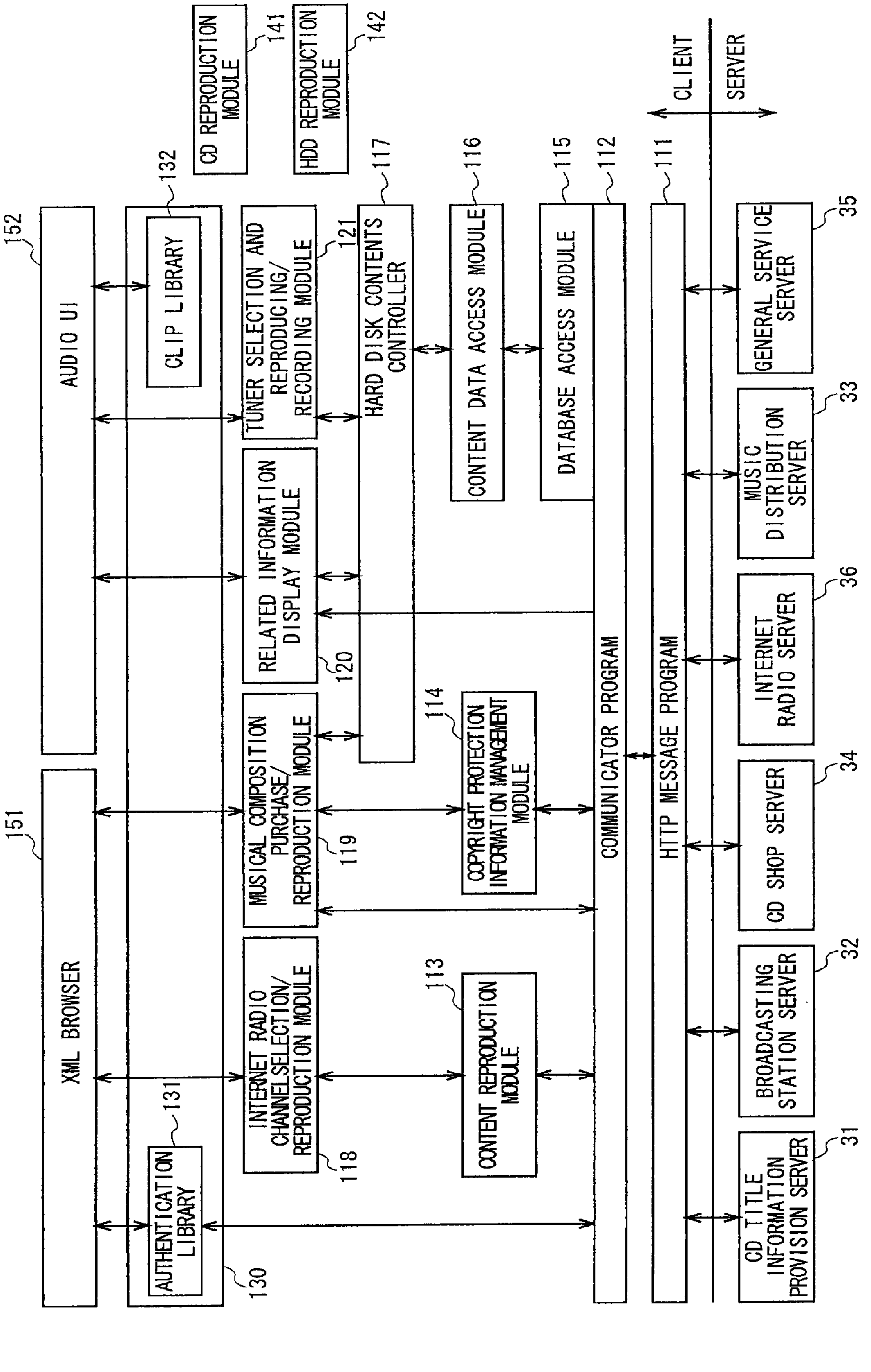
FIG. 7 is a schematic diagram showing the configuration of program modules in the terminal unit.

FIG. 7 is a diagram showing the configuration of program modules in the terminal unit. As shown in FIG. 7, the program modules in the terminal unit 10 are formed so as to be operated on the operating system (OS). The terminal unit 10 can perform communication with the CD title information provision server 31, the broadcasting station server 32, the music distribution server 33, the CD shop server 34, the general service server 35 for performing various general services, the Internet radio server 36, and various servers other than them, by the function of each program module.

A hypertext transfer protocol (HTTP) message program 111 is a program to perform communication with various servers such as the CD title information provision server 31, the broadcasting station server 32, the CD shop server 34, and the general service server 35, by HTTP communication. A communicator program 112 is a communication module to perform various communication with the general service server 35 or the like.

A contents reproducing module 113 for interpreting the codec of contents and reproducing the contents and a copyright protection information management module 114 for dealing information about copyright protection are in the position of the upper directories of the communicator program 112 (a function close to a user interface). As the upper directory of the contents reproducing module 113, an Internet radio channel selection/reproducing module 118 for performing the select and reproducing of Internet radio is provided. As the upper directory of the copyright protection information management module 114, a musical composition purchase/reproducing module 119 for controlling purchase of a musical composition and reproducing of a tune for demonstration is provided.

As the upper directory of these Internet radio channel selection/reproducing module 118 and musical composition purchase/reproducing module 119, an extensible markup language (XML) browser 151 is provided. The XML browser 151 interprets the contents of an XML file transmitted from various servers, and performs visual display on the display device 17. Further, the input contents that the user performed to the terminal unit 10 when the terminal unit 10 is in a general service use mode are interpreted in the XML browser 151. Then, a processing request corresponding to the input contents or the like is transmitted from the XML browser 151 to another module. For instance, a musical component selected by the user through the XML browser 151 is purchased by the musical composition purchase/reproducing module 119 and is written to the HDD 21 via a hard disk contents controller 117.

An authentication library 131 in a library 130 is connected to the communicator program 112. The authentication library

131 performs authentication processing of the general service server 35 and the other various servers.

As the upper directories of the communicator program 112, a database access module 115, a contents data access module 116 and a hard disk contents controller 117 are provided. The database access module 115 accesses various databases constructed in the HDD 21. The contents data access module 116 accesses contents stored in the HDD 21. The hard disk contents controller 117 manages the contents stored in the HDD 21.

As the upper directories of the hard disk contents controller 117, a related information display module 120, a tuner selection and reproducing/recording module 121 and the musical composition purchase/reproducing module 119 are provided. The related information display module 120 displays the title and the artist name of a musical composition broadcasted by a radio station in the display device 17. The tuner selection and reproducing/recording module 121 selects the radio station and records the contents of the musical composition received from the above radio station on the HDD 21.

For instance, the musical composition received from the radio station that was selected through an audio user interface (Audio UI) 152 is written to the HDD 21 via the contents data access module 116.

The related information display module 120 receives the title and the artist name of the musical composition broadcasted by the radio station as related information by the tuner selection and reproducing/recording module 121, from the CD title information provision server 31, the broadcasting station server 32 or the like via the HTTP message program 111, and displays this in the display device 17 via the audio user interface 152.

Note that, the related information to be displayed in the display device 17 via the audio user interface 152 can be temporarily stored in a clip library 132 in the library 130. Also, the related information can be finally stored in the HDD 21 via the database access module 115, according to a direction from the user.

Further, as the program modules in the terminal unit 10, a CD reproducing module 141 for reproducing a CD, and an HDD reproducing module 142 for reproducing the HDD 21 are included. The reproducing result is outputted through the audio data processing section 24 and the speaker section 25.

In the terminal unit 10 having such configuration, related information can be received from a server, and the related information can be clipped. Note that, in addition to clip, also a search and purchase processing of a musical composition can be performed.

Next, the processing when in clipping related information by means of the terminal unit 10 having the above configuration will be described. Here, clip of related information in the case where a radio station broadcasts a program by radio communication means and also distributes its program information to the terminal unit 10 via the network 30 will be described as an example.

Generally, radio stations broadcast various programs by radio communication means. To listen to a specified program, the user of the terminal unit 10 tunes the terminal unit 10 to the frequency of the broadcast signal of the radio station that broadcasts the program, so that the broadcast signal is received by the antenna 26. The broadcast signal is demodulated by the tuner 27, and then the demodulated signal is subjected to the processing in the audio data processing section 24, and the resultant signal is outputted from the speaker section 25 as a broadcast sound.

In addition to such program broadcasting, the radio station distributes program information on the program to various terminal units, from the broadcasting station server 32 in the radio station via the network 30. If general services are available by the terminal unit 10, the user of the terminal unit 10 can refer to the display device 17 for the contents of the distributed program information.

Figure 9:
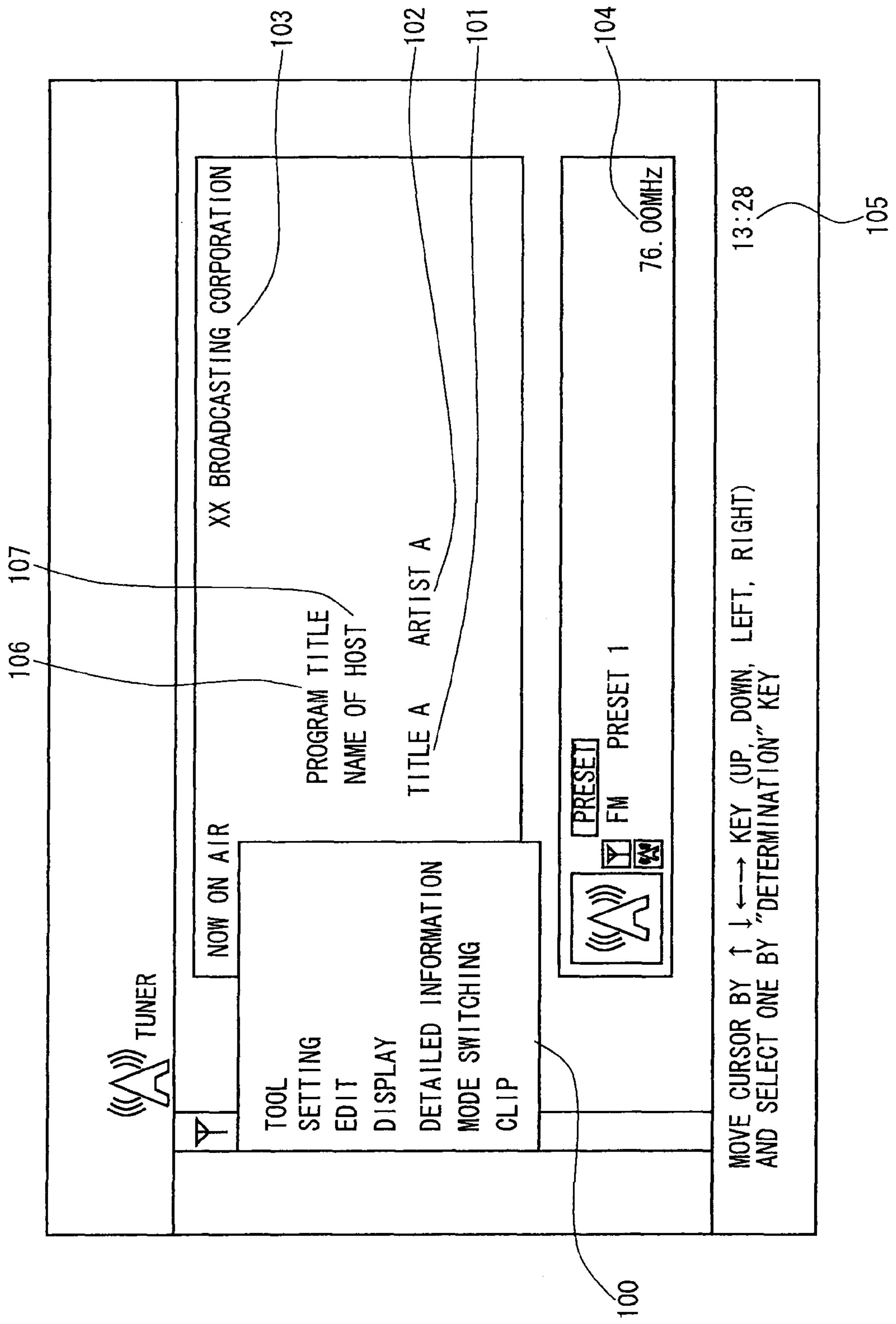
FIG. 9 is a schematic diagram showing an example of a contents display screen.

For example, as shown in FIG. 9, contents to be displayed in the display device 17 are now-on-air information in that the radio station name 130, the frequency of the radio station 104, the time 105, the program title 106 and the name of host 107, and the like are displayed other than the tune title 101 and the artist name 102 of a music composition that was broadcasted or being broadcasted now by the radio station. Related information concerning such contents is the title, the product number, the year of release, the sales company, and the like, of the CD or the like in that the musical composition is recorded, other than the title 101 and the artist name 102 of the musical composition.

Such contents are usually updated in the terminal unit 10 at specified intervals. At the time, the terminal unit 10 first successively transmits request information that requests related information about the contents to the broadcasting station server 32, at constant intervals of 30 seconds, for example. The broadcasting station server 32 which received the request information transmits related information corresponding to the request information to the terminal unit 10 via the network 30. In the terminal unit 10, the received related information is temporarily stored, in the RAM 20, for example. Here, the storage medium for temporarily storing the above related information is not limited to the RAM. Because the related information may be deleted when the power of this unit was cut off, it may be a volatile storage medium, however, it also may be a nonvolatile storage medium. In the display device 17 of the terminal unit 10, display is performed by means of the contents of the related information temporarily stored in the RAM 20 or the like, and a contents display screen is updated every time when new related information is stored.

Note that, in the broadcasting station server 32, distributing related information is updated at constant intervals separately from updating processing on the terminal unit 10 side. At that time, related information before updating is stored in a storage medium such as the HDD 21.

In the above updating of contents along with the progression of broadcast, if a musical composition that the user prefers is broadcasted, the user can clip related information about the musical composition while listening to the broadcast.

Figure 8:
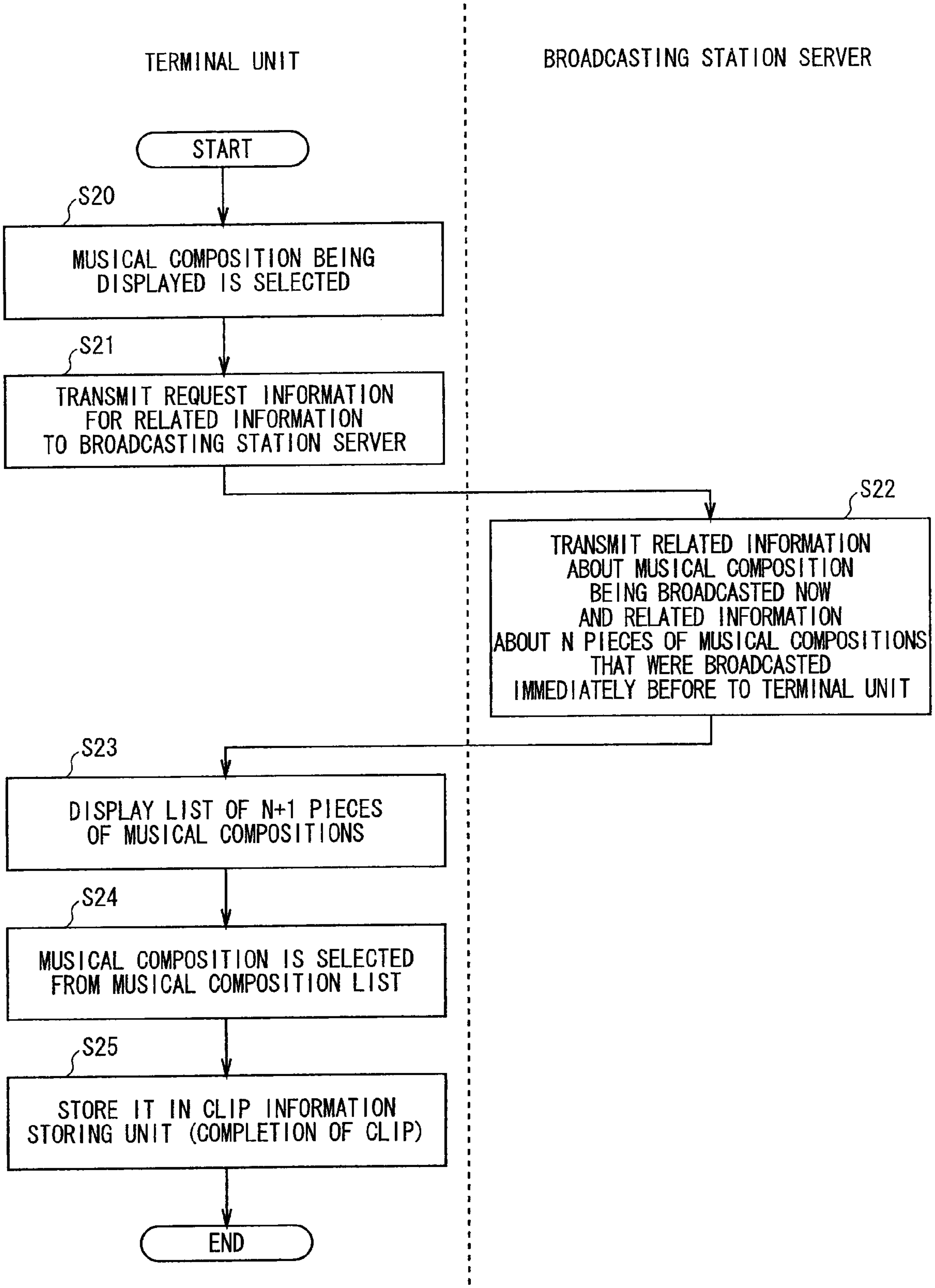
FIG. 8 is a flowchart showing the flow of a clip.
Figure 10:
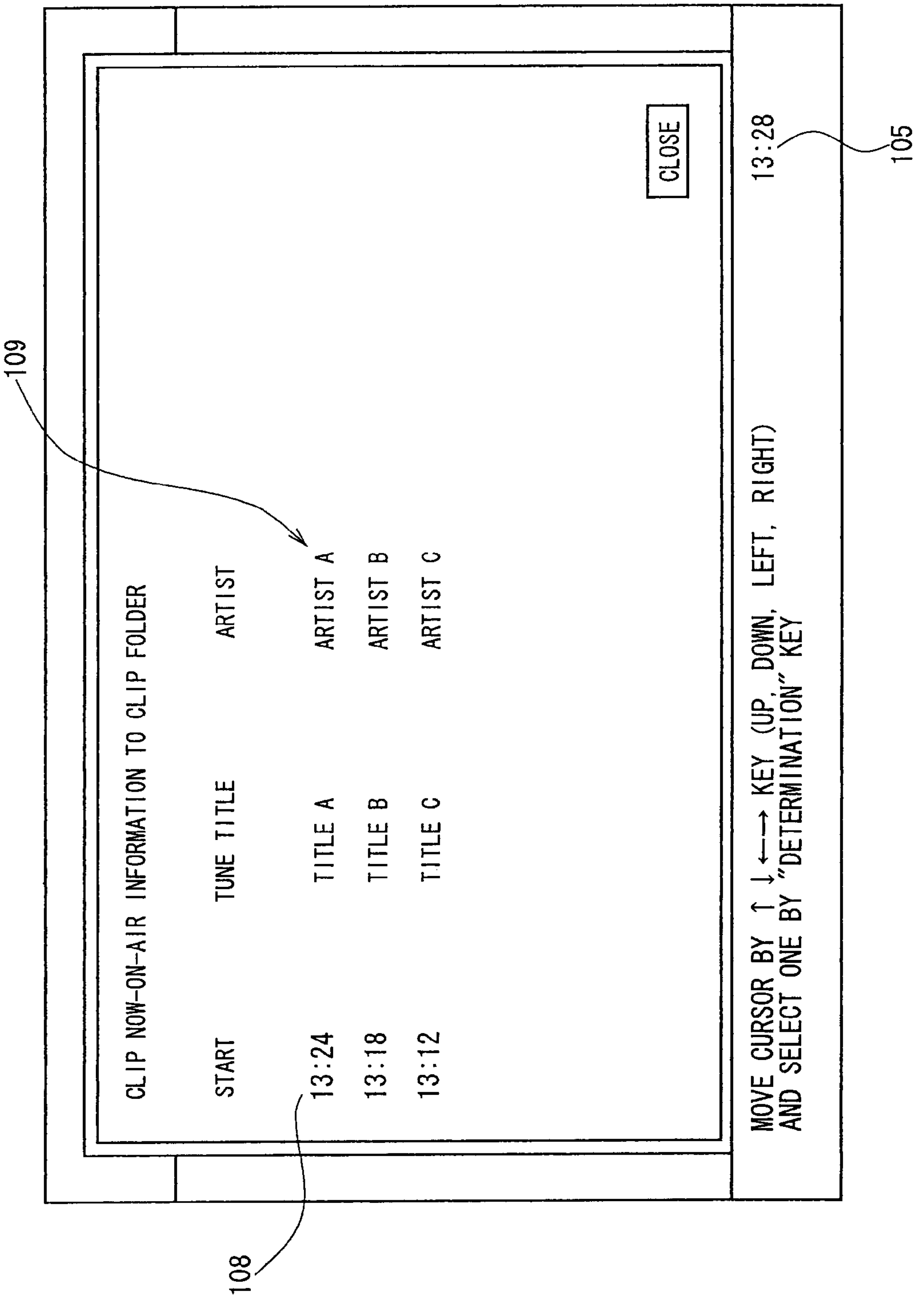
FIG. 10 is a schematic diagram showing a first example of a musical composition selection screen.
Figure 11:
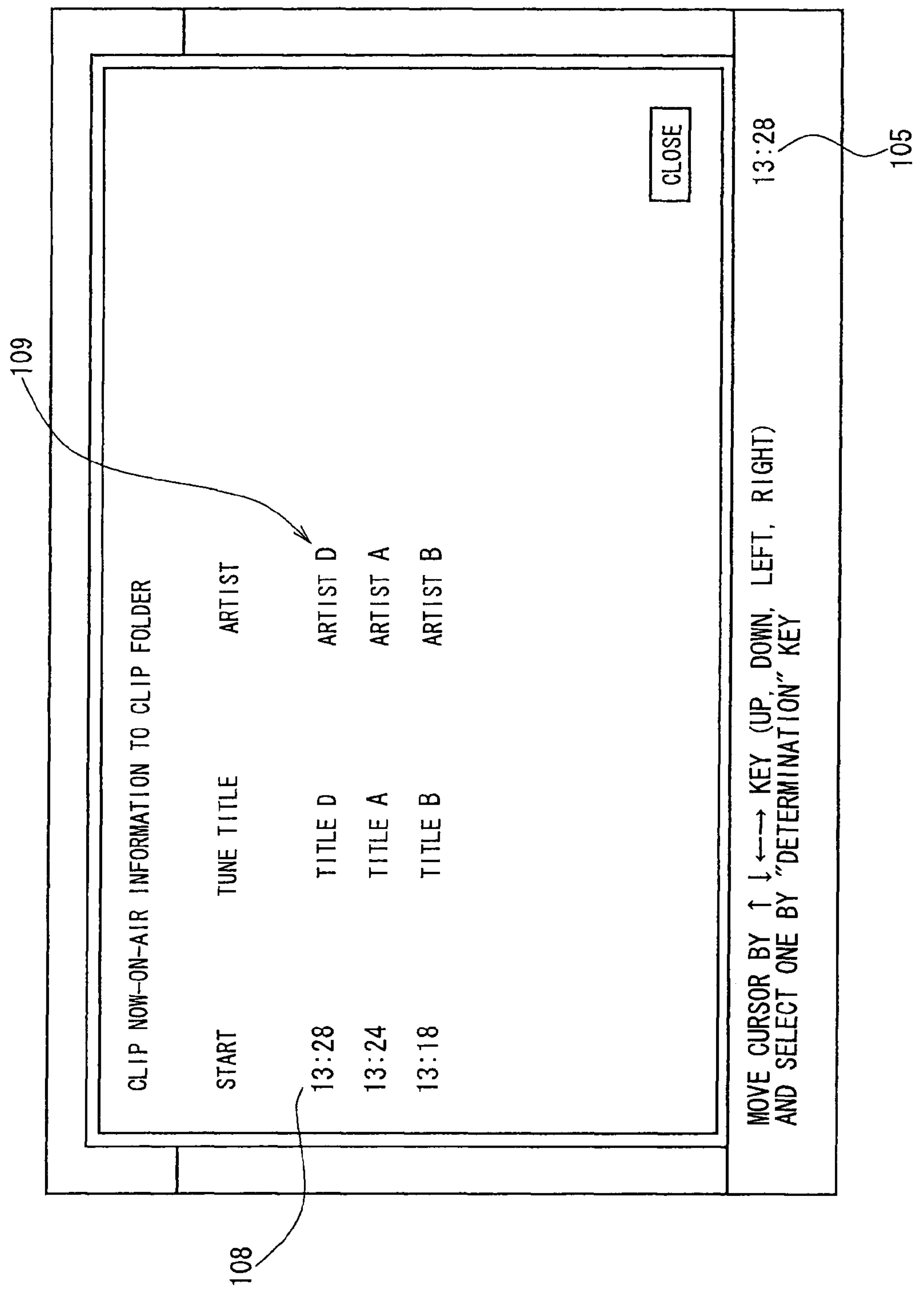
FIG. 11 is a schematic diagram showing a second example of a musical composition selection screen.

FIG. 8 is a chart showing the flow of clip. FIG. 9 is an example of a contents display screen. FIG. 10 is a first example of a musical composition selection screen. And FIG. 11 is a second example of the musical composition selection screen.

When in clipping, the user first selects a musical composition being displayed by operating the remote controller 40 or the operation input section 15 (step S20). In the example shown in FIG. 9, for example, if the tool key 44 in the remote controller 40 is depressed by the user, each command of "tool", "setting", "edit", "display", "detailed information", "mode switching" and "clip" is displayed in a tool menu 100. Here, if the user adjusts focus or the like to "clip" by operating the direction key 41*a* or the direction key 41*b* and depresses the determination key 42, the musical composition being displayed now in the display device 17 (title A, artist a) is selected.

However, the contents of contents being displayed in the display device 17 are updated at constant intervals in the terminal unit 10, so that the contents sometimes coincide with the current broadcasting contents and sometimes not. Therefore, the musical composition being displayed that the user selected is not limited to be a musical composition that the user preferred when the user listened to the broadcasting. For instance, there is a case where under broadcasting, if a certain musical composition was begun to play and the user preferred this and selects immediately the musical composition being displayed at the time in order to clip related information about it, the musical composition being displayed is a musical composition that was broadcasted preceding the musical composition being broadcasted now that the user tried to clip.

If the musical composition being displayed is selected by the user, a command to clip related information is inputted to the terminal unit 10. Responding to this input, request information that requests related information about contents is transmitted again to the broadcasting station server 32 via the network 30, separately from normal contents updating processing (step S21). Thereby, the occurrence of clip operation is notified the broadcasting station server 32.

By receiving the notification of occurrence of clip operation, in the broadcasting station server 32, as related information corresponding to the request information, related information before updating that has been stored in a storage device or the like is retrieved, and related information about the musical composition being broadcasted now and related information about N pieces of musical compositions that were broadcasted immediately before this musical composition is transmitted to the terminal unit 10 (step S22). At the time, the number N of the musical compositions to be requested related information about it can be previously arbitrarily set by the user on the terminal unit 10 side.

If the terminal unit 10 receives a total of N+1 pieces of related information, the related information is temporarily stored in the RAM 20 or the like, for example. Then, as shown in FIG. 10, a list 109 of the times to start broadcasting 108, the titles of these tunes (title A, B, C) and the artist names (artist a, b, c), of three pieces of respective musical compositions (hereinafter, this is referred to as a "musical composition list") is displayed (step S23). Note that, in the case where plural musical compositions are included in the musical composition list 109, the musical composition list 109 is an on-air list.

In the musical composition list 109, the musical composition which was displayed when the clip operation was performed, and the musical compositions which were displayed before the clip operation are included. Further, in the case where related information stored in the broadcasting station server 32 has been updated to related information about a musical composition being broadcasted now when that clip operation was performed, the musical composition after updating is included in the musical composition list 109.

For instance, in the case where the musical composition (title A, artist a) that was displayed when in selecting a musical composition shown in FIG. 9 agrees with the musical composition that was broadcasted when in selecting the musical composition, as shown in FIG. 10, the musical composition that the user intends to clip (title A, artist a) is displayed at the top of the musical composition list 109. Following it, the musical compositions (title B, artist b, title C, artist c) that were broadcasted previous to that musical composition are displayed in the order that the time to start broadcasting is late from the upper.

On the other hand, in the case where the musical composition (title A, artist a) that was displayed when in selecting the musical composition shown in FIG. 9 is a musical composition immediately before the musical composition (title D, artist d) that was broadcasted when in selecting the musical composition, if updating in the broadcasting station server 32 has finished, as shown in FIG. 11, the musical composition (title D, artist d) that the user intends to clip is displayed at the top of the musical composition list 109. Following it, the musical compositions (title A, artist a, title B, artist b) that were broadcasted previous to that are displayed in the order that the time to start broadcasting is late from the upper.

Therefore, the user can specify the musical composition that he/she was pleased and originally intended to clip from the time to start broadcasting, the tune title and the artist name, by referring to the musical composition list 109, and can recognize that the latest musical composition in the musical composition list 109 is the musical composition that the he/she originally intended to clip.

The user selects a musical composition that he/she wants to finally clip with the remote controller 40 or the like. For instance, when the musical composition list 109 is being displayed, the user selects the musical composition by means of the direction keys 41*a*, 41*b* and the determination key 42 in the remote controller 40.

Further, in the terminal unit 10, if setting focus or the like to the latest musical composition that will be displayed at the top of the list at the same time as the display of the musical composition list 109, the user can select the latest musical composition only by depressing the determination key 42 in the remote controller 40. In this case, from the time when the user selected a musical composition in step S20 while listening to a broadcast, the user can select the latest musical composition without viewing the display in the display device 17.

If a musical composition is selected from the displayed musical composition list 109 (step S24), the terminal unit 10 records related information about the selected musical composition in a clip folder in the clip information storage unit 21*a*, and completes the clip of the related information (step S25).

Note that, also plural musical compositions can be selected from the musical composition list 109, not only one musical composition. Thus, plural related information can be clipped at once.

According to the above construction, provided that related information in the broadcasting station server 32 has been updated to related information about the musical composition being broadcasted when clip operation was performed, that is, when there was an input to direct clip, the user can get the latest related information in real time. Therefore, that related information about a musical composition immediately before is erroneously clipped is decreased, and target related information to be originally clipped can be correctly clipped. Furthermore, the latest related information can be obtained without waiting for normal contents updating processing on the terminal unit 10 side.

(3) Second Embodiment

In a second embodiment, a service system in which a service that the user can obtain related information about broadcast contents being received in real time by that a communication unit successively performs polling to a server and it can be displayed is realized by one of plural service servers, as described above with reference to FIG. 2, will be described. This service system has a single sign-on function. Note that, because clipping processing is the same as the aforementioned first embodiment, the description will be omitted.

(3-1) System Configuration

Figure 12:
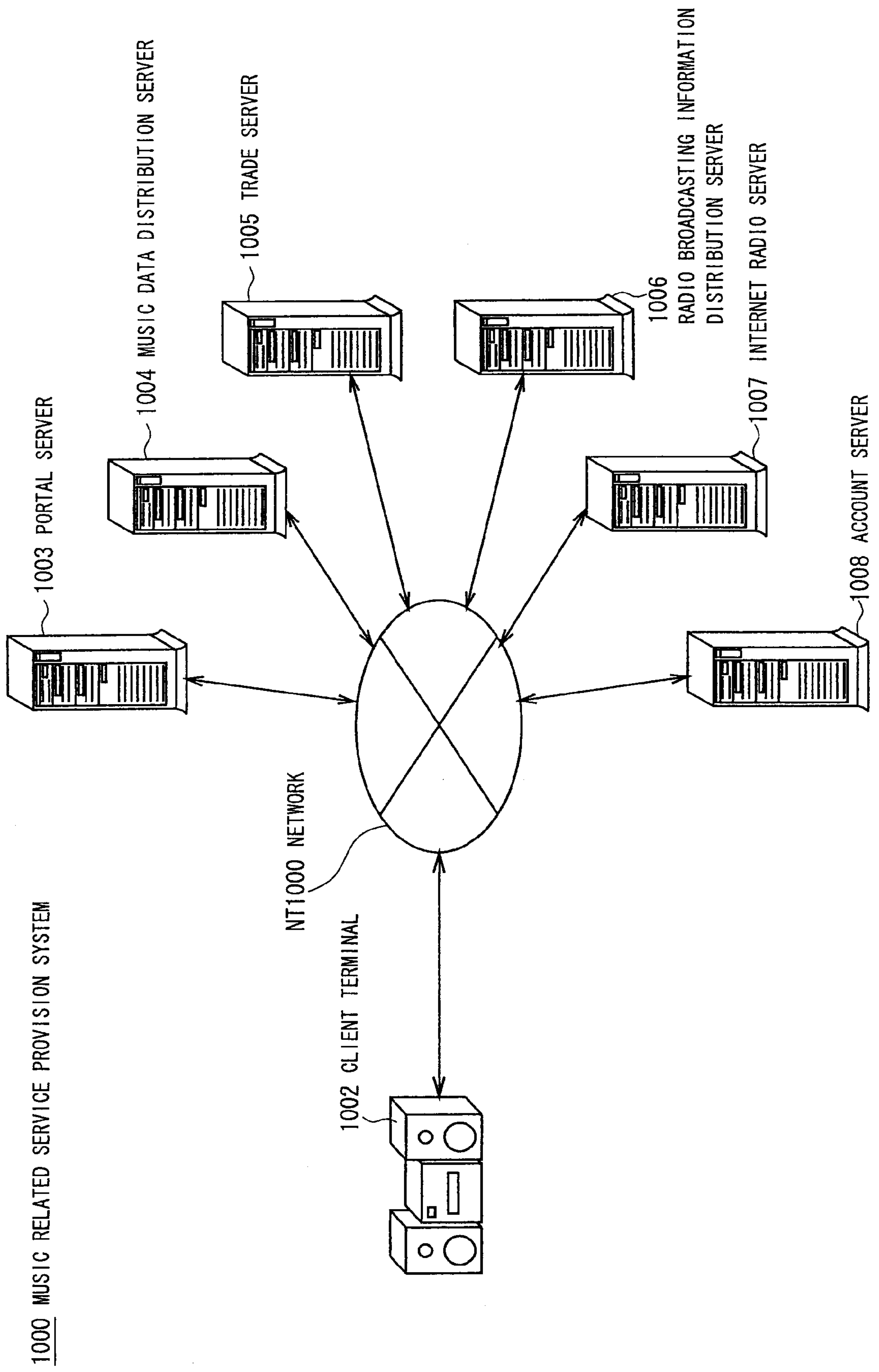
FIG. 12 is a schematic diagram showing the whole construction of a music related service provision system in a second embodiment.

Referring to FIG. 12, a music related service provision system serving as the service system is denoted by 1000 as a whole, and has the client terminal 1002 of the user who contracts with the administrator dealer of this music related service provision system 1000, a portal server 1003 for managing the above client terminal 1002 serving as a service server, and plural servers 1004-1008 for providing various services concerning music for the above client terminal 1002.

In this embodiment, the music data distribution server 1004 provides music data distribution services for distributing music data in the formats such as the adaptive transform acoustic coding 3 (ATRAC3), the advanced audio coding (AAC), the Windows media audio (WMA), the RealAudio G2 music codec, and the MPEG audio layer 3 (MP3), to the client terminal 1002.

The trade server 1005 provides trade services for selling a compact disc (CD), a digital versatile disc (DVD), or the like, to the user via the client terminal 1002.

The radio broadcasting information distribution server 1006 provides radio broadcasting information distribution services for distributing radio broadcasting information about a radio program by radio broadcasting broadcasted by a radio station, music, and the like, broadcasted via a radio station, to the client terminal 1002.

The Internet radio server 1007 provides Internet radio broadcasting services for broadcasting radio broadcasting data to the client terminal 1002 via a network NT1000 that corresponds to the Internet, in the format of streaming distribution.

In addition to this, the account server 1008 performs charging processing for charging the user various charges, according to a request from the portal server 1003 or the like.

Note that, the client terminal 1002 in this second embodiment corresponds to the terminal unit 10 in the first embodiment. The portal server 1003 corresponds to the general service server 35. The music data distribution server 1004 corresponds to the music distribution server 33. The trade server 1005 corresponds to the CD shop server 34. The radio broadcasting information distribution server 1006 corresponds to the broadcasting station server 32. And the network NT1000 corresponds to the network 30.

(3-2) Configuration of Client Terminal 1002

(3-2-1) Functional Circuit Block Configuration of Client Terminal 1002

Figure 13:
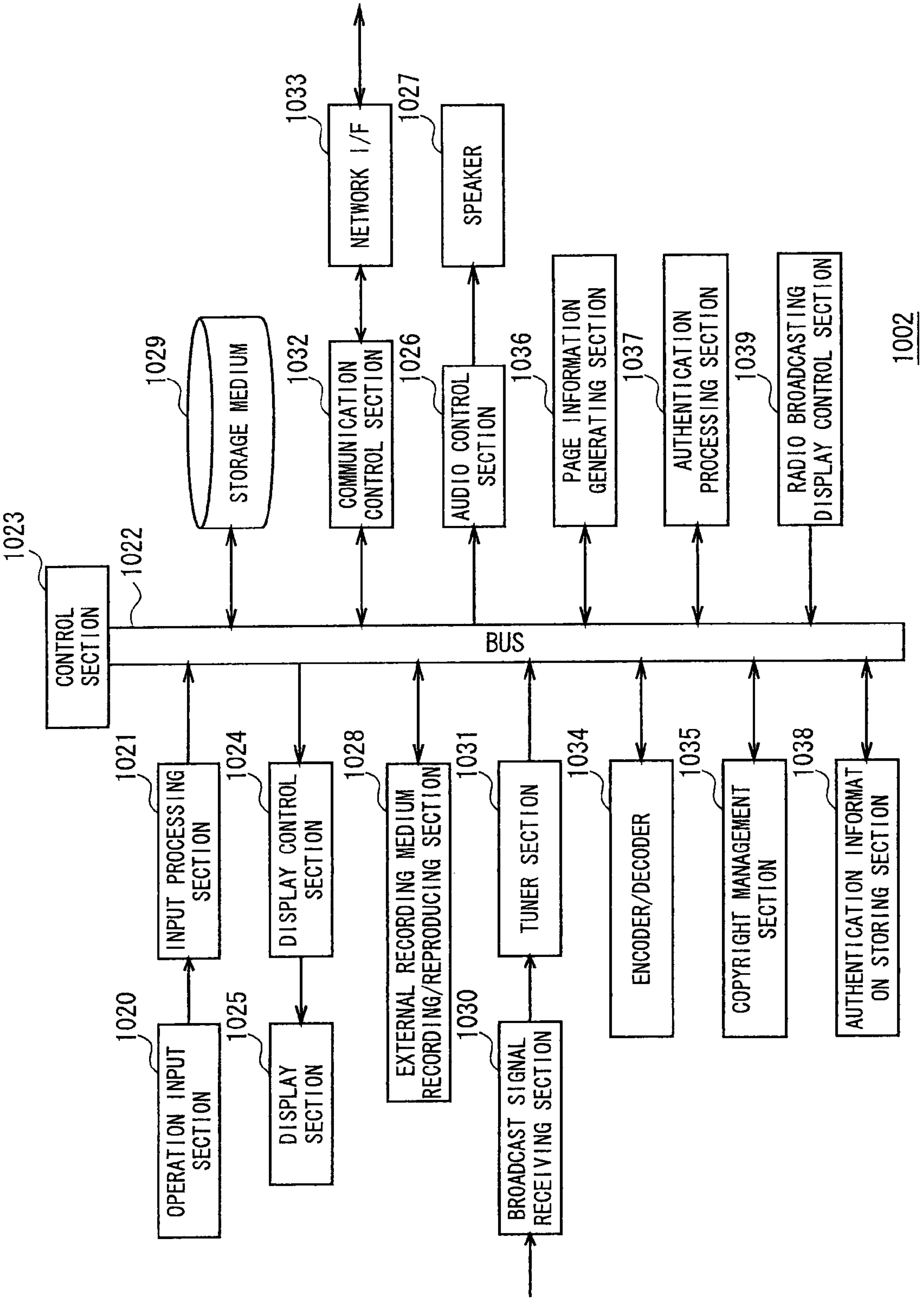
FIG. 13 is a block diagram showing the hardware configuration of a client terminal by functional circuit blocks.

The hardware configuration of the functional circuit blocks of the client terminal 1002 serving as a communication unit will be described. As shown in FIG. 13, if an operation input section 1020 formed by various operation buttons provided on the surface of the casing or a remote controller (not shown) is operated by the user, the client terminal 1002 recognizes this in the above operation input section 1020, and transmits an operation input signal according to the above operation to an input processing section 1021.

The input processing section 1021 converts the operation input signal supplied from the operation input section 1020 into a specified operation command, and transmits the command to a control section 1023 via a bus 1022.

The control section 1023 controls the operation of each of these circuits based on an operation command and a control signal that are supplied from each circuit connected via the bus 1022.

A display control section 1024 performs digital-to-analog conversion on video data supplied via the bus 1022, and transmits thus obtained analog video signal to a display section 1025.

The display section 1025 is a display device such as a liquid crystal display, and is sometimes directly attached to the surface of the casing and is sometimes externally provided.

If a processing result by the control section 1023 or various video data is supplied as an analog video signal to the display section 1025 via the display control section 1024, an image based on the above analog video signal is displayed.

An audio control section 1026 performs digital-to-analog conversion on audio data supplied via the bus 1022, and transmits thus obtained analog audio signal to a speaker 1027. The speaker 1027 emits a sound based on the analog audio signal supplied from the audio control section 1026.

An external recording medium recording/reproducing section 1028 is a recording/reproducing section for reading contents data recorded in an external recording medium such as a CD and a memory stick (registered trademark) in that a flash memory is contained in an outer case and reproducing it, or for recording contents data to be recorded in the above external recording medium.

If reading video data from an external recording medium as contents data, the external recording medium recording/reproducing section 1028 supplies the above read video data to the display control section 1024 via the bus 1022.

The display control section 1024 converts the video data read from the external recording medium as contents data by the external recording medium recording/reproducing section 1028 into an analog video signal, and supplies the signal to the display section 1025.

On the other hand, if reading audio data from an external recording medium as contents data, the external recording medium recording/reproducing section 1028 supplies the above read audio data to the audio control section 1026 via the bus 1022.

The audio control section 1026 converts the audio data read from the external recording medium as contents data by the external recording medium recording/reproducing section 1028 into an analog audio signal, and supplies the signal to the speaker 1027.

Further, the control section 1023 can transmit contents data read from an external recording medium by the external recording medium recording/reproducing section 1028 to a storage medium 1029 in the client terminal 1002 via the bus 1022, so that the above contents data can be stored in the storage medium 1029 (hereinafter, storing contents data in the storage medium 1029 as the above is referred to as ripping).

Then, if video data such as image data and motion picture data is read from the storage medium 1029 as contents data, the control section 1023 supplies the above read video data to the display control section 1024 via the bus 1022.

If audio data such as audio data is read from the storage medium 1029 as contents data, the control section 1023 supplies the above read audio data to the audio control section 1026 via the bus 1022.

In addition to this, the control section 1023 also can read music data from the storage medium 1029 and can transfer the read data to the external recording medium recording/reproducing section 1028, so that the music data can be recorded in an external recording medium by the above external recording medium recording/reproducing section 1028.

A broadcast signal receiving section 1030 receives a radio broadcast wave transmitted from each radio station, and supplies the wave to a tuner section 1031.

The tuner section 1031 extracts a radio broadcast signal at a broadcast frequency corresponding to a radio station that was specified for example via the operation input section 1020 from radio broadcast waves received via the broadcast signal receiving section 1030, performs predetermined receiving processing on the extracted signal, and transmits thus obtained audio data to the audio control section 1026 via the bus 1022, under the control of the control section 1023.

The audio control section 1026 transmits the audio data supplied from the tuner section 1031 into an analog audio signal and transmits the signal to the speaker 1027, so that the sound of the radio program broadcasted by the radio station is emitted from the above speaker 1027. Thus, the user can listen to the sound of the radio program.

Furthermore, the control section 1023 can transmit the audio data obtained in the tuner section 1031 to the storage medium 1029 so as to store the data, so that also the sound of the radio program can be recorded.

Further, the control section 1023 can connect the client terminal 1002 to the network NT1000 sequentially via a communication control section 1032 and a network interface 1033, and can access the portal server 1003 and the other servers 1004 to 1007 on the above network NT1000. Thereby, various information and various data can be transmitted/received to/from the portal server 1003 and the other servers 1004 to 1007.

An encoder/decoder section 1034 decodes compressively-coded contents data received from the network NT1000 sequentially via the network interface 1033 and the communication control section 1032, or compressively-coded contents data read from the storage medium 1029 and an external recording medium, and transmits the decoded data to the display control section 1024 and the audio control section 1026.

Further, the encoder/decoder section 1034 compressively codes contents data not compressively coded and read from an external recording medium, audio data supplied from the tuner section 1031, or the like, and transmits the above compressively-coded contents data to the storage medium 1029.

Thus, the contents data compressively coded in the encoder/decoder section 1034 is stored in the storage medium 1029, under the control of the communication control section 1023.

A copyright management section 1035 generates copyright management information that corresponds to contents data downloaded from the network NT1000 sequentially via the network interface 1033 and the communication control section 1032, and copyright management information that corresponds to contents data read from an external recording medium by the external recording medium recording/reproducing section 1028.

The copyright management information generated in the copyright management section 1035 is registered in the storage medium 1029 in association with the contents data, under the control of the control section 1023.

Further, when contents data associated with copyright management information is checked out from the storage medium 1029 to a specified external recording medium, and when contents data associated with the above copyright management information is checked in from the above specified external recording medium to the storage medium 1029, the copyright management section 1035 properly updates the contents of the copyright management information corresponding to the above contents data. Thereby, the copyright for the contents data is protected.

A page information generating section 1036 interprets page information such as an extensible markup language (XML) file, and a hypertext markup language (HTML) file, received from the network NT1000 sequentially via the network interface 1033 and the communication control section 1032, generates video data to be displayed in the display section 1025, and transmits the above generated video data to the display control section 1024.

An authentication processing section 1037 performs authentication processing such as transmitting authentication information to the portal server 1003 and the other servers 1004 to 1007 on the network NT1000 connected via the network interface 1033, sequentially via the communication control section 1032 and the network interface 1033.

An authentication information storing section 1038 stores authentication information that is necessary when the authentication processing section 1037 accesses the portal server 1003 and the other servers 1004 to 1007.

A radio broadcasting display control section 1039 transmits a request signal for requesting radio broadcast information about radio broadcasting being received now for listening by the user, to a radio broadcasting information distribution server 1006 that corresponds to the radio station broadcasting the above radio broadcasting being received, sequentially via the communication control section 1032 and the network interface 1033.

As a result, the radio broadcasting display control section 1039 receives the radio broadcast information transmitted from the radio broadcasting information distribution server 1006 on the network NT1000, sequentially via the network interface 1033 and the communication control section 1032, and transmits the above received radio broadcast information to the display control section 1024. Thereby, the radio broadcast information formed by the program title of the radio program being received now, the title and the artist name of the above musical composition being received, and the like, is displayed in the display section 1025. Note that, this radio broadcast information corresponds to the related information in the aforementioned first embodiment.

By the way, in the program modules (FIG. 7) in the terminal unit 10 described in the aforementioned first embodiment, the HTTP message program 111 and the communicator program 112 are program modules that can realize the same function as the communication control section 1032 (FIG. 13) of the client terminal 1002 in this second embodiment.

The contents reproducing module 113 (FIG. 7) is a program module that can realize the same function as the encoder/decoder section 1034 (FIG. 13) of the client terminal 1002.

Further, the copyright protection information management module 114 (FIG. 7) is a program module that can realize the same function as the copyright management section 1035 (FIG. 13) of the client terminal 1002.

Further, the Internet radio channel selection/reproducing module 118 (FIG. 7) is a program module that can realize the same function as the control section 1023 and the audio control section 1026 (FIG. 13) of the client terminal 1002.

Further, the musical composition purchase/reproducing module 119 (FIG. 7) is a program module that can realize the same function as the control section 1023 and the audio control section 1026 (FIG. 13) of the client terminal 1002.

Further, the XML browser 151 (FIG. 7) is a program module that can realize the same function as the input processing section 1021 and the page information generating section 1036 (FIG. 13) of the client terminal 1002.

Further, the hard disk contents controller 117, the database access module 115 and the contents data access module 116 (FIG. 7) are program modules that can realize the same function as the control section 1023 (FIG. 13) of the client terminal 1002.

Further, the authentication library 131 in the library 130 (FIG. 7) is a program module that can realize the same function as the authentication processing section 1037 and the authentication information storing section 1038 (FIG. 13) of the client terminal 1002.

Further, the clip library 132 in the library 130 (FIG. 7) is a program module that can realize the same function as the control section 1023 (FIG. 13) of the client terminal 1002.

Further, the related information display module 120 (FIG. 7) is a program module that can realize the same function as the radio broadcasting display control section 1039 (FIG. 13) of the client terminal 1002.

Further, the tuner selection and reproducing/recording module 121 (FIG. 7) is a program module that can realize the same function as the control section 1023, the audio control section 1026 and the tuner section 1031 (FIG. 13) of the client terminal 1002.

Further, the audio user interface 152 (FIG. 7) is a program module that can realize the same function as the input processing section 1021, the control section 1023 and the display control section 1024 (FIG. 13) of the client terminal 1002.

Further, the CD reproducing module 141 (FIG. 7) is a program module that can realize the same function as the audio control section 1026 and the external recording medium recording/reproducing section 1028 (FIG. 13) of the client terminal 1002.

Further, the HDD reproducing module 142 (FIG. 7) is a program module that can realize the same function as the control section 1023 and the audio control section 1026 (FIG. 13) of the client terminal 1002.

Therefore, also in the terminal unit 10 having the hardware circuit block configuration in the aforementioned first embodiment, the CPU 11 can perform the same processing as the client terminal 1002 having the functional circuit blocks in this second embodiment, according to the aforementioned various program modules.

(3-2-2) Directory Management

Figure 14:
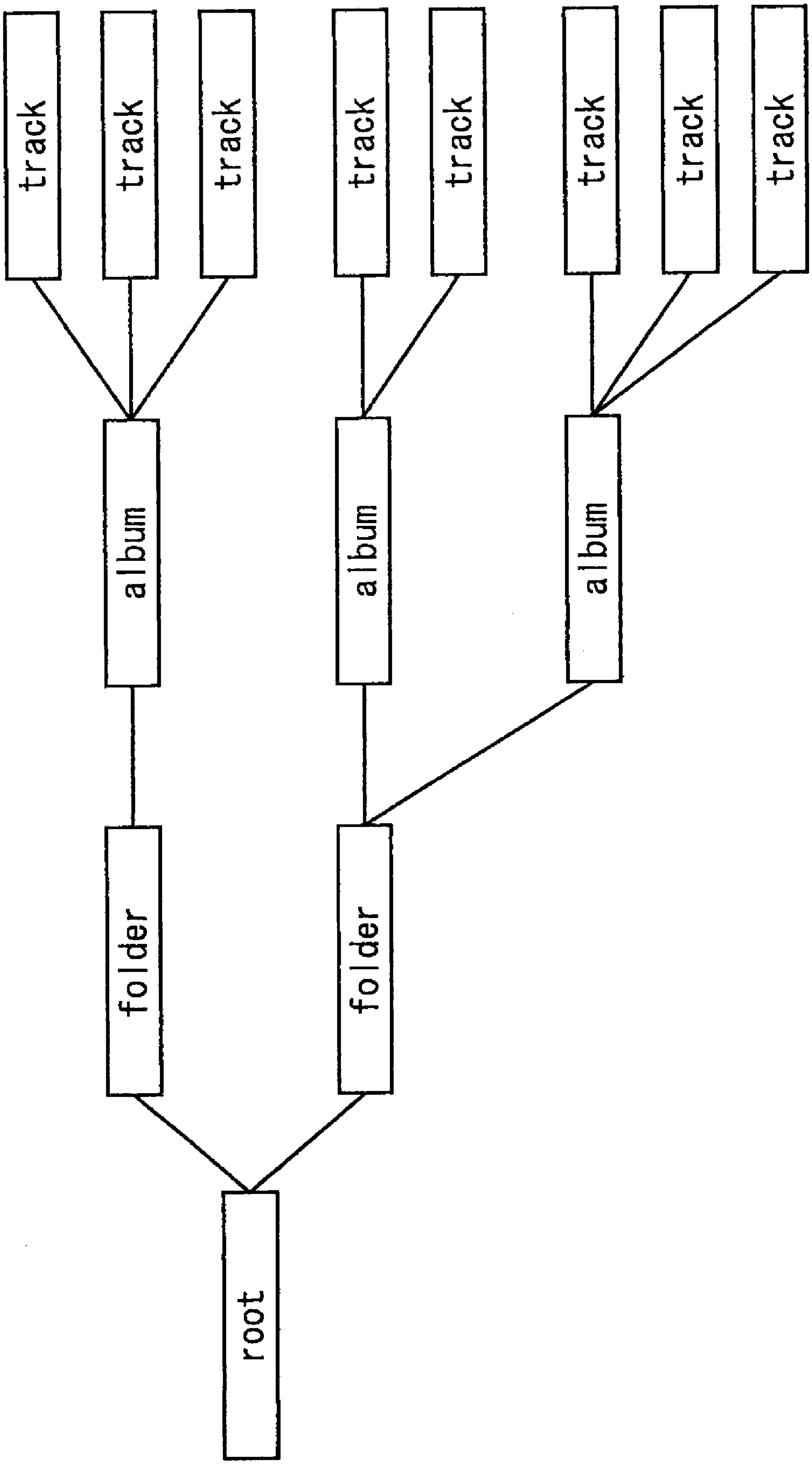
FIG. 14 is a schematic diagram illustrating a directory configuration.

The control section 1023 of the client terminal 1002 manages contents data to be stored in the storage medium 1029 in a directory structure shown in FIG. 14. First, as the subdirectories of a "root" directory, arbitrary number within the prescribed range of "folder" directories are created. This "folder" directory is created corresponding to the genre that contents belong, the owner user, or the like, for example.

As the subdirectory of this "folder" directory, arbitrary number, within the prescribed range, of "album" directories are created. The above "album" directory corresponds to each one album title, for example. As the subdirectories of this "album" directory, one or more "track" files which belong to the "album" directory are stored. This "track" file becomes one musical composition, that is, contents.

The directory management of such contents data will be performed by a database file stored in the storage medium 1029.

(3-3) Functional Circuit Block Configuration of Portal Server 1003

Figure 15:
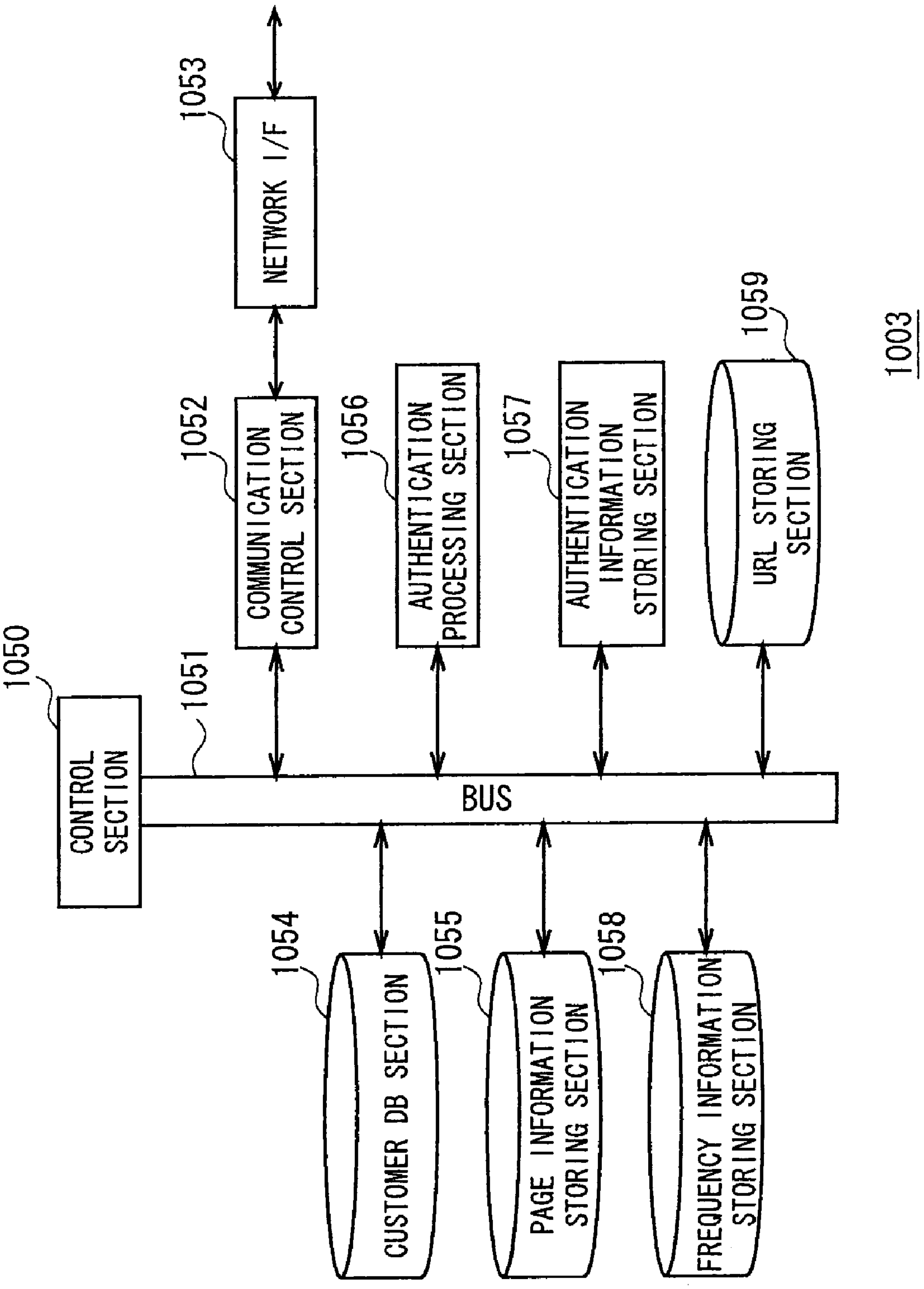
FIG. 15 is a block diagram showing the hardware configuration of a portal server by functional circuit blocks.

Next, the hardware configuration of the functional circuit blocks of the portal server 1003 serving as an authentication server will be described, with reference to FIG. 15. The control section 1050 in the portal server 1003 controls the operation of each circuit connected via a bus 1051.

A communication control section 1052 transmits/receives various information to/from the client terminal 1002, the other servers 1004 to 1007, and the like, via a network interface 1053, under the control of the control section 1050.

In a customer database section 1054, user identification (ID) information and password information about the user who already completed a contract with the administrator dealer of the music related service provision system 1000 has been registered in association with each other, as customer information.

In a page information storing section 1055, page information managed by the administrator dealer of the music related service provision system 1000 or the like has been stored.

Note that, the page information is described by a language such as the XML, and includes uniform resource locator (URL) information for accessing the music data distribution server 1004, the trade server 1005, the radio broadcasting information distribution server 1006 and the Internet radio server 1007, and the like.

If the user ID information and password information transmitted from the client terminal 1002 is received sequentially via the network interface 1053 and the communication control section 1052, as user authentication processing, an authentication processing section 1056 confirms whether or not the above received user ID information and password information has been registered in the customer database section 1054 as customer information.

Then, if the user authentication processing is finished, the authentication processing section 1056 issues portal authentication result information showing the result of the above user authentication processing (authentication session ID information that will be described later), and temporarily stores the above issued portal authentication result information in an authentication information storing section 1057.

At this time, as the result of the user authentication processing by the authentication processing section 1056, if the user is authenticated as a legal user, the control section 1050 transmits page information for contractor stored in the page information storing section 1055, together with portal authentication result information, to the client terminal 1002 sequentially via the communication control section 1052 and the network interface 1053.

Note that, as the result of the user authentication processing by the authentication processing section 1056, if the user is not authenticated as a legal user, the control section 1050 may transmit authentication error information, together with authentication failure notification page information showing the failure of the authentication stored in the page information storing section 1055, to the client terminal 1002 sequentially via the communication control section 1052 and the network interface 1053.

Further, as a result that authentication processing of the user was performed from the music data distribution server 1004, the trade server 1005 and the radio broadcasting information distribution server 1006, if portal authentication result information (an authentication ticket that will be described later) obtained and transmitted from the client terminal 1002 of the above user's is received sequentially via the network interface 1053 and the communication control section 1052, the authentication processing section 1056 compares the above received portal authentication result information with the portal authentication result information corresponding to the above user temporarily stored in the authentication information storing section 1057.

As authentication processing of the portal authentication result information received from the music data distribution server 1004, the trade server 1005 and the radio broadcasting information distribution server 1006, the authentication processing section 1056 performs confirmation processing for confirming whether or not to be regular portal authentication result information, and returns confirmation result information showing the confirmation result to the above music data distribution server 1004, the trade server 1005 and the radio broadcasting information distribution server 1006, sequentially via the communication control section 1052 and the network interface 1053.

In a frequency information storing section 1058, an area code such as a zip code capable of specifying an area, frequency information showing the broadcast frequency of radio broadcasting that can be received in the area shown by that area code, the name a radio station broadcasting the above radio broadcasting (hereinafter, this is referred to as a radio station name), and a call sign being identification information unique to the above radio station have been stored in association with each other.

In a URL storing section 1059, the call sign of each radio station for radio broadcasting, and URL information by which on a radio program being broadcasted now provided by the radio station corresponding to the above call sign, radio broadcasting information composed of the program title of the above radio program, the title of the musical composition being on air now in that radio program, and the like, (hereinafter, this is specially referred to as now-on-air information) can be obtained have been stored in association with each other.

(3-4) Functional Circuit Block Configuration of Music Data Distribution Server 1004

Figure 16:
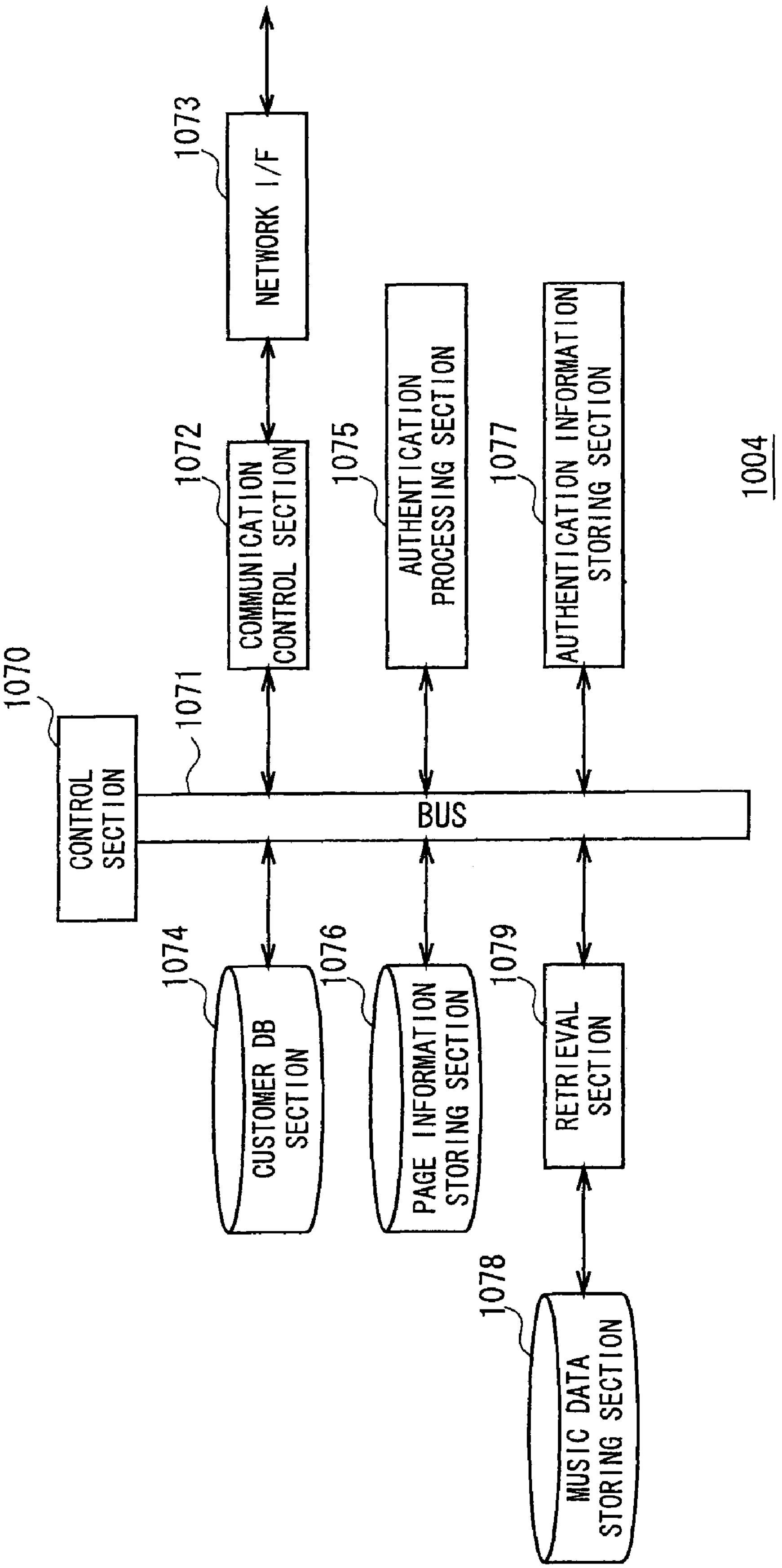
FIG. 16 is a block diagram showing the hardware configuration of a music data distribution server by functional circuit blocks.

Next, the hardware configuration of the functional circuit blocks of the music data distribution server 1004 will be described with reference to FIG. 16. A control section 1070 in the music data distribution server 1004 controls the operation of each circuit connected via a bus 1071.

A communication control section 1072 transmits/receives various information and various data such as contents data to/from the client terminal 1002, the portal server 1003, and the like, via a network interface 1073, under the control of the control section 1070.

In a customer database section 1074, user ID information and password information about the user who already completed a contract with the administrator dealer of the music data distribution server 1004 have been registered in association with each other, as customer information. However, in the case where an authentication processing section 1075 has a function to perform authentication processing of the user based on portal authentication result information issued by the portal server 1003 that is transmitted from the client terminal 1002, the customer database section 1074 may not be provided.

In a page information storing section 1076, page information for music data distribution that introduces downloadable music data managed by the music data distribution server 1004, or the like, has been stored.

In this connection, the page information for music data distribution is described by a language such as the XML. It can make the user using the client terminal 1002 select music data that the user wants to download.

Then, if a page information acquisition request signal for requesting page information for music data distribution that was transmitted from the client terminal 1002 is received sequentially via the network interface 1073 and the communication control section 1072, the control section 1070 transmits the page information for music data distribution stored in the page information storing section 1076 to the client terminal 1002 sequentially via the communication control section 1072 and the network interface 1073, according to the above received page information acquisition request signal.

If user ID information and password information about the user using the client terminal 1002 that was transmitted from the above client terminal 1002 is received sequentially via the network interface 1073 and the communication control section 1072, as user authentication processing, the authentication processing section 1075 confirms whether or not the above received user ID information and password information has been registered in the customer database section 1074 as customer information.

Further, as a user authentication method different from the user authentication processing that uses the user ID information and the password information, the authentication processing section 1075 receives portal authentication result information issued in the portal server 1003 (an authentication ticket that will be described later) that was transmitted from the above client terminal 1002 sequentially via the network interface 1073 and the communication control section 1072, and transmits the above received portal authentication result information to the portal server 1003 sequentially via the communication control section 1072 and the network interface 1073.

Then, the authentication processing section 1075 receives confirmation result information returned as a result that authentication processing of the portal authentication result information (that is, the aforementioned confirmation processing) was performed responding to the transmission of the portal authentication result information to the portal server 1003, from the above portal server 1003 sequentially via the network interface 1073 and the communication control section 1072, and confirms whether or not the user is a regular user who already completed a contract with the administrator dealer of the music related service provision system 1000, based on the above received confirmation result information.

In this manner, if the user authentication processing is finished, the authentication processing section 1075 issues server authentication result information showing the result of the user authentication processing (service session ID information that will be described later).

At this time, as the result of the user authentication processing by the authentication processing section 1075, if the user is authenticated as a regular user, the control section 1070 transmits page information for music data distribution stored in the page information storing section 1076 for contractor, together with the server authentication result information, to the client terminal 1002 sequentially via the communication control section 1072 and the network interface 1073.

On the contrary, as the result of the user authentication processing by the authentication processing section 1075, if the user was not authenticated as a regular user, the control section 1070 transmits authentication error information, together with authentication failure notification page information showing the failure of the authentication stored in the page information storing section 1076, to the client terminal 1002 sequentially via the communication control section 1072 and the network interface 1073.

By the way, in an authentication information storing section 1077, server authentication result information issued by the authentication processing section 1075 is temporarily stored, and also various authentication information that is necessary to perform user authentication processing of the user using the client terminal 1002 by the above authentication processing section 1075 has been stored.

In a music data storing section 1078, plural music data compressively coded in the aforementioned ATRAC3 format, MP3 format, or the like, has been stored in association with the search key of each contents ID information or the like.

As a result that page information for music data distribution was transmitted to the client terminal 1002, if a download request signal in which a search key for retrieving music data wanted to download has been stored, which requests to download the music data wanted to download, and which was transmitted from the above client terminal 1002 is received sequentially via the network interface 1073 and the communication control section 1072, a retrieval section 1079 extracts that search key from the above received download request signal.

Then, the retrieval section 1079 retrieves the music data wanted to downloaded that corresponds to the search condition shown by the above search key out of plural music data in the music data storing section 1078, based on the above search key.

The control section 1070 transmits that retrieved music data wanted to download to the client terminal 1002, sequentially via the communication control section 1072 and the network interface 1073.

Further, at this time, the control section 1070 transmits account information for charging processing to the user for the download of the music data to the client terminal 1002 to an account server 1008, sequentially via the communication control section 1072 and the network interface 1073, in order to make the account server 1008 perform the processing to charge the above user for the download of the music data.

(3-5) Functional Circuit Block Configuration of Trade Server 1005

Figure 17:
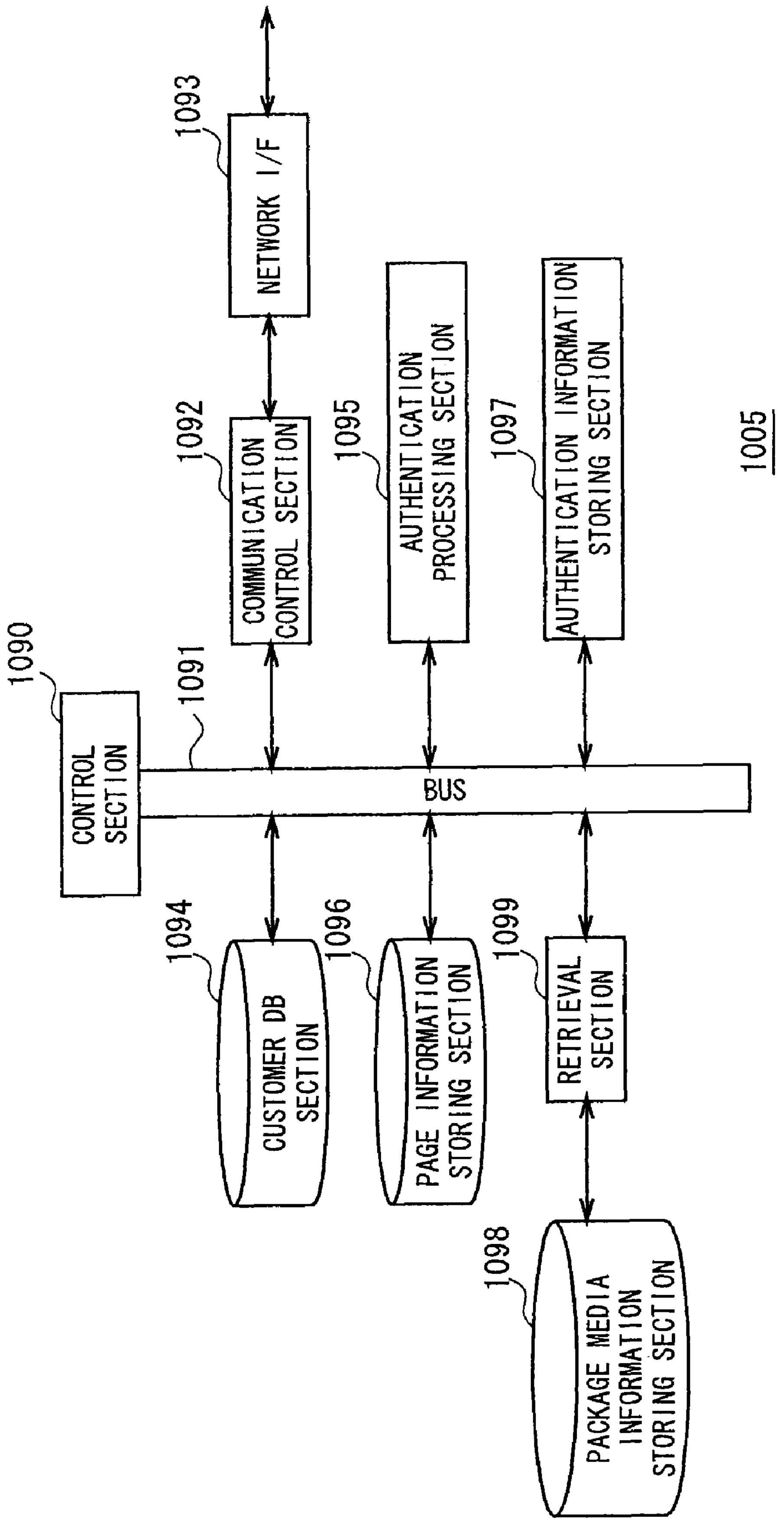
FIG. 17 is a block diagram showing the hardware configuration of a trade server by functional circuit blocks.

Next, the hardware configuration of the trade server 1005 by functional circuit blocks will be described with reference to FIG. 17. A control section 1090 in the trade server 1005 controls the operation of each circuit connected via a bus 1091.

A communication control section 1092 transmits/receives various information to/from the client terminal 1002, the portal server 1003, and the like, via a network interface 1093, under the control of the control section 1090.

In a customer database section 1094, user ID information and password information about the user who already completed a contract with the administrator dealer of the trade server 1005 has been registered in association with each other, as customer information. However, in the case where an authentication processing section 1095 has a function to perform authentication processing of the user based on the portal authentication result information issued by the portal server 1003 that was transmitted from the client terminal 1002, the customer database section 1094 may not be provided.

In a page information storing section 1096, page information for package media sale for introducing package media such as CDs and DVDs for sale that is managed by the trade server 1005, or the like, has been stored.

In this connection, the page information for package media sale is described by a language such as the XML. It can make the user using the client terminal 1002 select package media such as a CD or a DVD that the user wants to purchase.

Then, if a page information acquisition request signal for requesting page information for package media sale that was transmitted from the client terminal 1002 is received sequentially via the network interface 1093 and the communication control section 1092, the control section 1090 transmits the page information for package media sale stored in the page information storing section 1096 to the client terminal 1002 sequentially via the communication control section 1092 and the network interface 1093, according to the above received page information acquisition request signal.

If user ID information and password information about the user using the client terminal 1002 that was transmitted from the above client terminal 1002, is received sequentially via the network interface 1093 and the communication control section 1092, as user authentication processing, the authentication processing section 1095 confirms whether or not the above received user ID information and password information has been registered in the customer database section 1094 as customer information.

Further, as a user authentication method different from the user authentication processing using the user ID information and password information, the authentication processing section 1095 receives portal authentication result information issued in the portal server 1003 that was transmitted from the client terminal 1002 (an authentication ticket that will be described later) sequentially via the network interface 1093 and the communication control section 1092, and transmits the above received portal authentication result information to the portal server 1003 sequentially via the communication control section 1092 and the network interface 1093.

Then, the authentication processing section 1095 receives confirmation result information returned as a result that authentication processing of the portal authentication result information (that is, the aforementioned confirmation processing) was performed responding to the transmission of the portal authentication result information to the portal server 1003, from the above portal server 1003 sequentially via the network interface 1093 and the communication control section 1092, and confirms whether or not the user is a regular user who already completed a contract with the administrator dealer of the music related service provision system 1000, based on the above received confirmation result information.

In this manner, if the user authentication processing is finished, the authentication processing section 1095 issues server authentication result information showing the result of that user authentication processing (service session ID information that will be described later).

At this time, as the result of the user authentication processing by the authentication processing section 1095, if the user is authenticated as a regular user, the control section 1090 transmits page information for package media sale stored in the page information storing section 1096 for contractor, together with the server authentication result information, to the client terminal 1002 sequentially via the communication control section 1092 and the network interface 1093.

On the contrary, as the result of the user authentication processing by the authentication processing section 1095, if the user was not authenticated as a regular user, the control section 1090 transmits authentication error information, together with authentication failure notification page information showing the failure of the authentication stored in the page information storing section 1096, to the client terminal 1002 sequentially via the communication control section 1092 and the network interface 1093.

By the way, in an authentication information storing section 1097, server authentication result information issued by the authentication processing section 1095 is temporarily stored, and also various authentication information that is necessary to perform user authentication processing of the user using the client terminal 1002 by the above authentication processing section 1095 has been stored.

In a package media information storing section 1098, information about plural package media such as CDs and DVDs for sale (hereinafter, this is referred to as package media information) has been stored in association with the search key of each package media ID information or the like.

As a result that page information for package media sale was transmitted to the client terminal 1002, if a media information request signal for requesting package media information concerning specified packaged media such as a CD or a DVD that was transmitted from the above client terminal 1002 is received sequentially via the network interface 1093 and the communication control section 1092, a retrieval section 1099 extracts a search key for the above specified package media from the above received media information request signal.

Then, the retrieval section 1099 retrieves package media information about specified package media corresponding to the search condition shown by the above search key out of the plural package media information in the package media information storing section 1098, based on the above search key.

The control section 1090 transmits the retrieved package media information to the client terminal 1002, sequentially via the communication control section 1092 and the network interface 1093. Thus, the package media information concerning the specified package media is presented to the user.

As a result, if a purchase request signal for requesting to purchase the aforementioned specified package media that was transmitted from the client terminal 1002, is received sequentially via the network interface 1093 and the communication control section 1092, the control section 1090 performs purchase processing such as the procedure for delivering the above specified package media to the user using the above client terminal 1002.

Further, the control section 1090 transmits account information for charging processing to the user for the purchase of the specified package media to the account server 1008, sequentially via the communication control section 1092 and the network interface 1093, in order to make the account server 1008 perform the charging processing to the above user corresponding to the purchase of the specified package media.

Further, if the charging processing to the user by the account server 1008 is completed, the control section 1090 transmits purchase completion page information showing the completion of the purchase processing of the package media to the client terminal 1002, sequentially via the communication control section 1092 and the network interface 1093.

(3-6) Functional Circuit Block Configuration of Radio Broadcasting Information Distribution Server 1006

Figure 18:
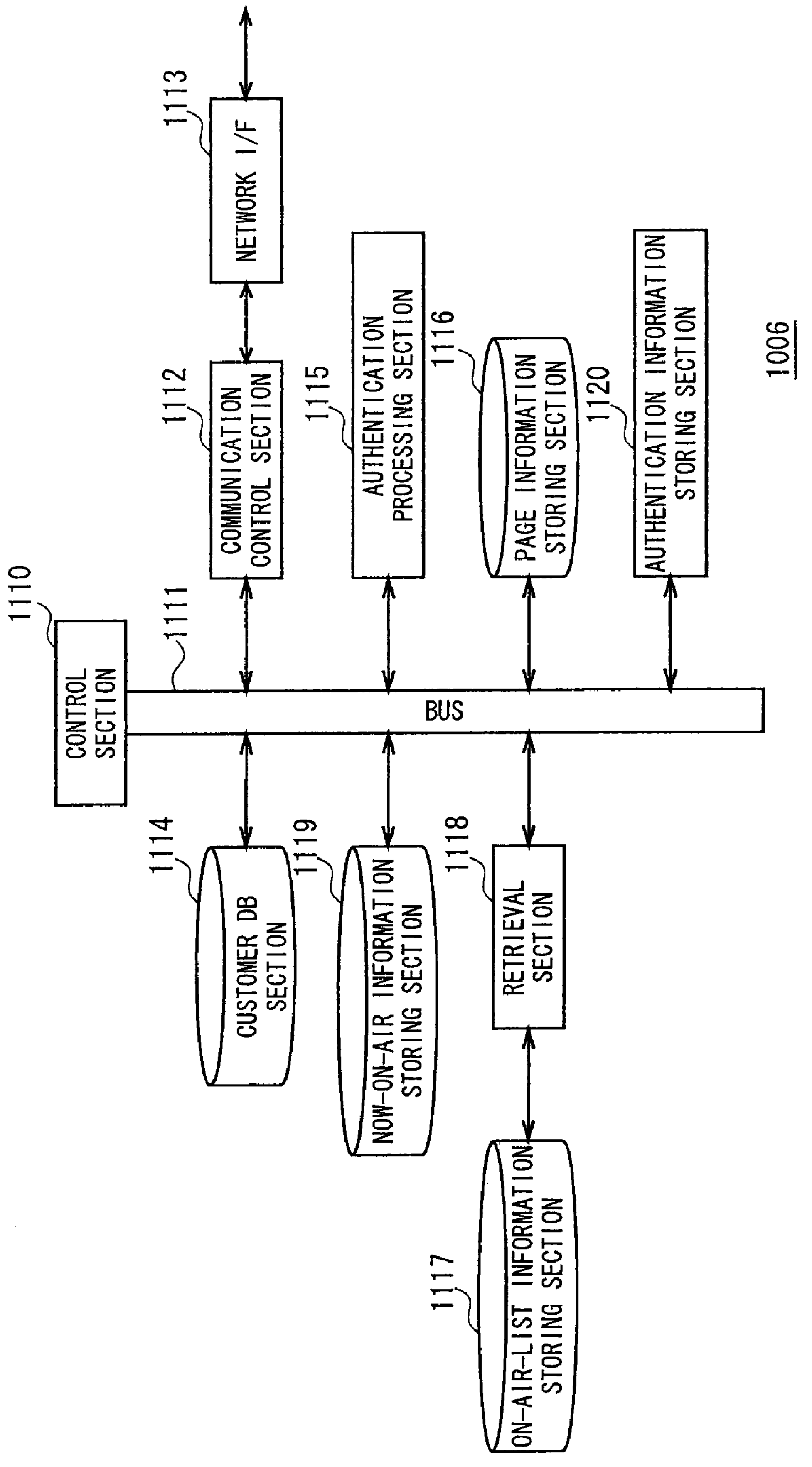
FIG. 18 is a block diagram showing the hardware configuration of a radio broadcast information distribution server by functional circuit blocks.

Next, the hardware configuration of the radio broadcasting information distribution server 1006 by functional circuit blocks will be described with reference to FIG. 18. A control section 1110 in the radio broadcasting information distribution server 1006 controls the operation of each circuit connected via a bus 1111.

A communication control section 1112 transmits/receives various information to/from the client terminal 1002, the portal server 1003, and the like, via a network interface 1113, under the control of the control section 1110.

In a customer database section 1114, user ID information and password information about the user who already completed a contract with the administrator dealer of the radio broadcasting information distribution server 1006 has been registered in association with each other, as customer information. However, in the case where an authentication processing section 1115 has a function to perform authentication processing of the user based on the portal authentication result information issued by the portal server 1003 that was transmitted from the client terminal 1002, the customer database section 1114 may not be provided.

In a page information storing section 1116, page information for on-air-list information distribution managed by the radio broadcasting information distribution server 1006 and to be used to obtain radio broadcasting information concerning the radio programs that were already broadcasted by a radio station corresponding to the above radio broadcasting information distribution server 1006 (hereinafter, this is specially referred to as on-air-list information), or the like, has been stored.

In this connection, the page information for on-air-list information distribution is described by a language such as the XML, and in which entering boxes for making the user using the client terminal 1002 enter broadcasting time and date information, the program title, and the like of a radio program as a search key for the on-air-list information wanted to obtain are provided.

In the on-air-list information storing section 1117, on-air-list information created by listing the program title, the broadcasting of program starting time, the broadcasting of program ending time, and the like of the radio programs that were already broadcasted by the radio station corresponding to the radio broadcasting information distribution server 1006, and the title, the artist name, the broadcasting of program starting time, and the like of the musical compositions that were broadcasted in the above radio programs has been stored.

Then, if a page information acquisition request signal for requesting page information for on-air-list information distribution that was transmitted from the client terminal 1002 is received sequentially via the network interface 1113 and the communication control section 1112, the control section 1110 transmits page information for on-air-list information distribution stored in the page information storing section 1116 to the client terminal 1002 sequentially via the communication control section 1112 and the network interface 1113, according to the above received page information acquisition request signal.

As a result, an on-air list information request signal in which a search key for on-air-list information search wanted to obtain entered on the page information for on-air-list information distribution has been stored and which requests to download the on-air-list information is transmitted from the client terminal 1002. Thereby, if the on-air-list information request signal is received sequentially via the network interface 1113 and the communication control section 1112, a retrieval section 1118 extracts the search key from the above received on-air list information request signal.

Then, the retrieval section 1118 retrieves a predetermined area part corresponding to the search condition shown by the above search key as the on-air-list information wanted to obtain, from all of the on-air-list information in the on-air-list information storing section 1117, based on the above search key.

The control section 1110 transmits the retrieved on-air-list information wanted to obtain to the client terminal 1002, sequentially via the communication control section 1112 and the network interface 1113.

On the other hand, in a now-on-air information storing section 1119, now-on-air information composed of the program title, the broadcasting of program starting time, and the broadcasting of program ending time of the radio program that is being broadcasted now by the radio station corresponding to the radio broadcasting information distribution server 1006, and the title, the artist name, the broadcasting of musical composition starting time, and the like of the musical composition that is being broadcasted at the present time in the above radio program has been stored.

If user ID information and password information about the user using the client terminal 1002 that was transmitted from the client terminal 1002 together with a now-on-air information request signal for requesting to obtain now-on-air information is received sequentially via the network interface 1113 and the communication control section 1112, as user authentication processing, the authentication processing section 1115 confirms whether or not the above received user ID information and password information has been registered in the customer database section 1114 as customer information.

Further, as a user authentication method different from the user authentication processing using the user ID information and password information, the authentication processing section 1115 receives portal authentication result information issued in the portal server 1003 that was transmitted from the client terminal 1002 (an authentication ticket that will be described later) sequentially via the network interface 1113 and the communication control section 1112, and transmits the above received portal authentication result information to the portal server 1003 sequentially via the communication control section 1112 and the network interface 1113.

Then, the authentication processing section 1115 receives confirmation result information returned as a result that authentication processing of the portal authentication result information (that is, the aforementioned confirmation processing) was performed responding to the transmission of the portal authentication result information to the portal server 1003, from the above portal server 1003 sequentially via the network interface 1113 and the communication control section 1112, and confirms whether or not the user is a regular user who already completed a contract with the administrator dealer of the music related service provision system 1000, based on the above received confirmation result information.

In this manner, if the user authentication processing is finished, the authentication processing section 1115 issues server authentication result information showing the result of that user authentication processing (service session ID information that will be described later).

At this time, as the result of the user authentication processing by the authentication processing section 1115, if the user is authenticated as a regular user, the control section 1110 transmits now-on-air information stored in the now-on-air information storing section 1119, together with the server authentication result information, to the client terminal 1002 sequentially via the communication control section 1112 and the network interface 1113.

On the contrary, as the result of the user authentication processing by the authentication processing section 1115, if the user was not authenticated as a regular user, the control section 1110 transmits authentication error information, together with authentication failure notification page information showing the failure of the authentication stored in the page information storing section 1116, to the client terminal 1002 sequentially via the communication control section 1112 and the network interface 1113.

In this manner, when the user requested to obtain now-on-air information, if the above user is authenticated as a regular user, the control section 1110 distributes the now-on-air information. However, if the user cannot be authenticated as a regular user, the control section 1110 forbids the user to receive a radio broadcasting information distribution service provided by the radio broadcasting information distribution server 1006, such as a now-on-air information distribution service.

By the way, in an authentication information storing section 1120, server authentication result information issued by the authentication processing section 1115 is temporarily stored, and also various authentication information that is necessary to perform user authentication processing of the user using the client terminal 1002 by the above authentication processing section 1115 has been stored.

(3-7) Summary of Processing in Each Server

Next, a summary of processing performed between the client terminal 1002 and the portal server 1003, and processing performed between the client terminal 1002 and the other servers of the music data distribution server 1004, the trade server 1005 and the radio broadcasting information distribution server 1006 will be described, with reference to sequence charts shown in FIGS. 19 to 24.

(3-7-1) User Authentication Processing Procedure Between Client Terminal 1002 and Portal Server 1003

Figure 19:
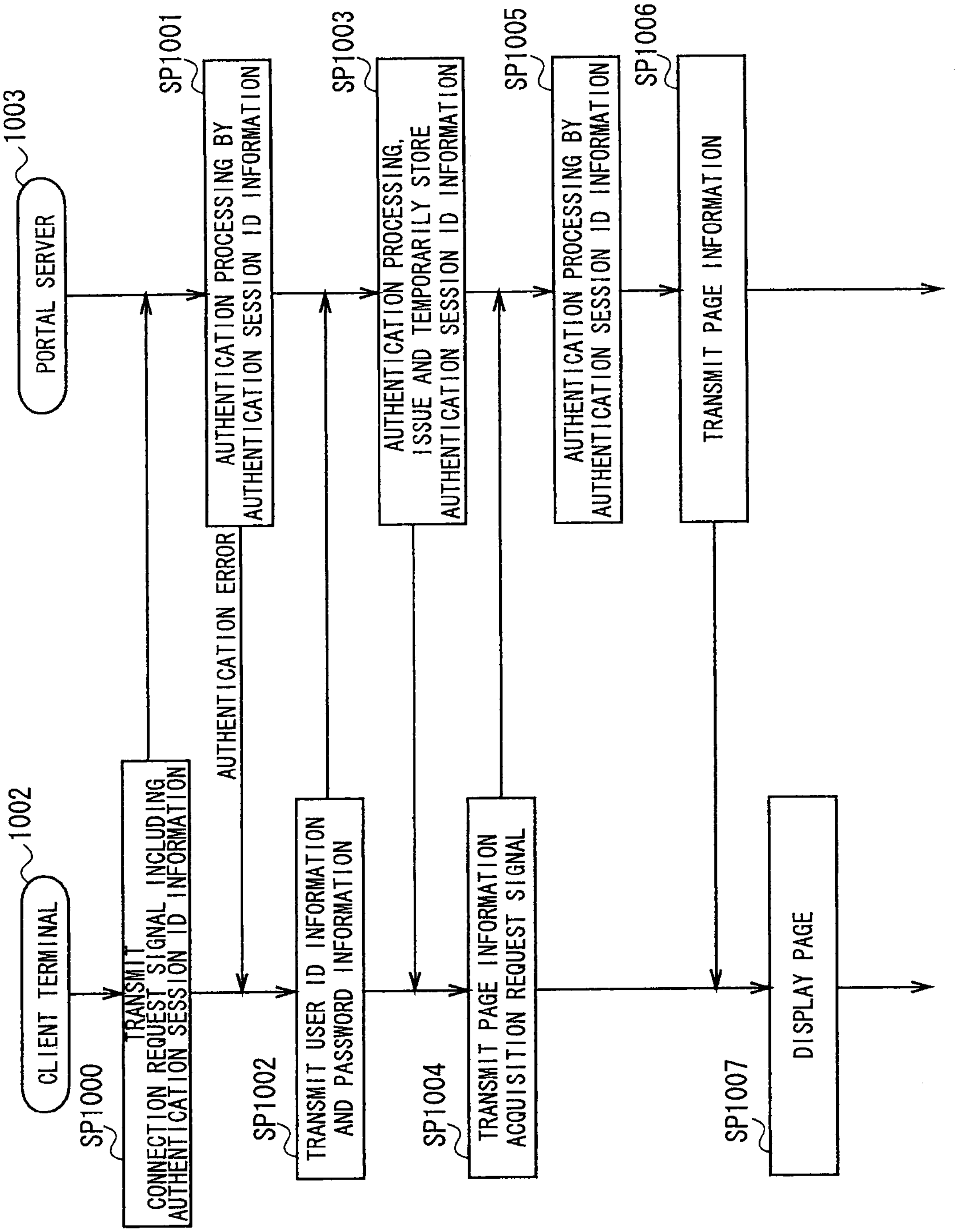
FIG. 19 is a sequence chart showing a user authentication processing procedure between the client terminal and the portal server.

First, a user authentication processing procedure performed between the client terminal 1002 and the portal server 1003 will be described with reference to FIG. 19.

In the client terminal 1002 of the user contracting with the administrator dealer of the music related service provision system 1000, if an operation input signal recognized in the operation input section 1020 is converted into an operation command in the input processing section 1021 and it is supplied, for instance, in response to that an operation to turn on the switch was performed to the client terminal 1002, or that a specified operation button in the operation input section 1020 was depressed by the user, the control section 1023 starts authentication request processing.

If the authentication request processing is started in the client terminal 1002, in step SP1000, the control section 1023 generates a connection request signal storing authentication session ID information or the like that has been previously stored in the authentication information storing section 1038, and transmits the above generated connection request signal to the portal server 1003 sequentially via the communication control section 1032 and the network interface 1033.

In this connection, the authentication session ID information is identification information that will be issued by the portal server 1003 for identifying each communication connected state (that is, session) every time when communication between the client terminal 1002 and the portal server 1003 is connected to perform various processing such as user authentication processing.

Note that, as to the above authentication session ID information, on the use of it in user authentication processing or the like, a predetermined valid period based on the time when it was issued by the portal server 1003 (for example, approximately one minute) has been set.

Therefore, in the case where the client terminal 1002 that obtained the authentication session ID information from the portal server 1003 cannot present the authentication session ID information to the portal server 1003 within the valid period, it is determined that the communication connected state specified by the above authentication session ID information was cut off, by the portal server 1003.

Thereby, the portal server 1003 can prevent that the authentication session ID information issued in the past is illegally used by the user who does not contract with the administrator dealer of the music related service provision system 1000 in the user authentication processing or the like.

The authentication session ID information temporarily stored in the authentication information storing section 1038 is ID information that was issued by the portal server 1003 when the communication between the client terminal 1002 and that portal server 1003 was connected in the past to perform user authentication processing or the like.

If a connection request signal is transmitted from the client terminal 1002, in response to this, in step SP1001, the control section 1050 in the portal server 1003 receives the connection request signal sequentially via the network interface 1053 and the communication control section 1052, and transmits authentication session ID information or the like stored in the above received connection request signal to the authentication processing section 1056.

The authentication processing section 1056 performs user authentication processing based on the authentication session ID information or the like received from the client terminal 1002 as the connection request signal, under the control of the control section 1050.

As a result, if the user using the above client terminal 1002 cannot be authenticated as a regular user by the authentication processing section 1056 because the valid period of the authentication session ID information or the like received from the client terminal 1002 has expired or the like, the control section 1050 transmits authentication error information showing an authentication error to the client terminal 1002 sequentially via the communication control section 1052 and the network interface 1053.

In step SP1002, if the authentication error information transmitted from the portal server 1003 is received sequentially via the network interface 1033 and the communication control section 1032, in response to this, the control section 1023 of the client terminal 1002 reads user ID information, password information, and the like stored in the authentication information storing section 1038, and transmits the above read user ID information, password information, and the like to the portal server 1003 sequentially via the communication control section 1032 and the network interface 1033.

In step SP1003, the control section 1050 of the portal server 1003 receives the user ID information, password information, and the like transmitted from the client terminal 1002 sequentially via the network interface 1053 and the communication control section 1052, and transmits the above received user ID information, password information, and the like to the authentication processing section 1056.

As user authentication processing, the authentication processing section 1056 detects whether or not the user ID information, password information, and the like received from that client terminal 1002 is included in customer information registered in the customer database section 1054, under the control of the control section 1050.

As a result, if the user using the client terminal 1002 is authenticated as a regular user, the authentication processing section 1056 issues authentication session ID information or the like for the current communication connected state between the client terminal 1002 and the portal server 1003, as portal authentication result information, under the control of the control section 1050, and temporarily stores the authentication session ID information or the like issued to the above client terminal 1002 in the authentication information storing section 1057.

Then, the control section 1050 transmits the authentication session ID information or the like issued to that client terminal 1002 by the authentication processing section 1056, to the client terminal 1002 sequentially via the communication control section 1052 and the network interface 1053.

In step SP1004, the control section 1023 in the client terminal 1002 receives the authentication session ID information or the like transmitted from the portal server 1003 sequentially via the network interface 1033 and the communication control section 1032, and transmits the above received authentication session ID information or the like to the authentication processing section 1037.

The authentication processing section 1037 temporarily stores that authentication session ID information or the like received from the portal server 1003 to the authentication information storing section 1038, under the control of the control section 1023.

Thereby, the control section 1023 transmits a page information acquisition request signal for requesting the portal server 1003 to supply page information, together with that authentication session ID information or the like received from the portal server 1003 and temporarily stored in the authentication information storing section 1038, to the portal server 1003 sequentially via the communication control section 1032 and the network interface 1033.

In step SP1005, the control section 1050 of the portal server 1003 receives the page information acquisition request signal and the authentication session ID information or the like that was transmitted from the client terminal 1002, sequentially via the network interface 1053 and the communication control section 1052, and transmits the above received authentication session ID information or the like to the authentication processing section 1056.

Thereby, the authentication processing section 1056 performs user authentication processing by comparing the authentication session ID information or the like received from the client terminal 1002 with the authentication session ID information or the like that was issued to the client terminal 1002 in the aforementioned step SP1003 and has been temporarily stored in the authentication information storing section 1057, under the control of the control section 1050.

As a result, if the user using the client terminal 1002 is authenticated as a regular user, in step SP1006, the authentication processing section 1056 determines the page information acquisition request from the above client terminal 1002 as a legal request, and extends the valid period of the authentication session ID information or the like issued to that client terminal 1002.

Thereby, the control section 1050 reads page information requested to obtain by the user from the page information storing section 1055, and transmits the above read page information, together with the authentication session ID information or the like of which the valid period was extended by the authentication processing section 1056, to the client terminal 1002 sequentially via the communication control section 1052 and the network interface 1053.

In step SP1007, the control section 1023 in the client terminal 1002 receives the page information transmitted from the portal server 1003 and the authentication session ID information or the like of which the valid period was extended, sequentially via the network interface 1033 and the communication control section 1032, transmits the above received page information to the page information generating section 1036, and transmits that authentication session ID information or the like of which the valid period was extended to the authentication processing section 1037.

The page information generating section 1036 generates video data on a page in which links to the music data distribution server 1004, the trade server 1005 and the radio broadcasting information distribution server 1006 are embedded, based on the page information supplied from the control section 1023, and transmits the above generated video data to the display control section 1024.

The display control section 1024 performs digital-to-analog conversion on the video data supplied from the page information generating section 1036, and transmits thus obtained analog video signal to the display section 1025, so that the page of the portal server 1003 is displayed in the above display section 1025 as images based on that analog video signal.

Further, the authentication processing section 1037 temporarily stores the authentication session ID information or the like that was received from the portal server 1003 and of which the valid period was extended, in the authentication information storing section 1038, under the control of the control section 1023, so as to update it on the authentication information or the like before extending the valid period. Thereby, the authentication session ID information or the like temporarily stored in the aforementioned step SP1004 is updated to the authentication session ID information of which the valid period was extended or the like.

(3-7-2) User Authentication Processing Procedure Between Client Terminal 1002 and Each Server 1004 to 1006

Next, referring to FIG. 20, user authentication processing performed between the client terminal 1002 and the music data distribution server 1004, the trade server 1005 and the radio broadcasting information distribution server 1006 will be described.

In this case, as the above user authentication processing, there is user authentication processing performed by that the client terminal 1002 once obtains page information from the portal server 1003 as described above with reference to FIG. 19, and then accesses the music data distribution server 1004, the trade server 1005 and the radio broadcasting information distribution server 1006 by links embedded in that page information (hereinafter, this is referred to as indirect access authentication processing).

Further, as the above user authentication processing, also there is user authentication processing performed by that the client terminal 1002 directly accesses the music data distribution server 1004, the trade server 1005 and the radio broadcasting information distribution server 1006 by URL information or the like previously registered as a bookmark, without obtaining the page information about the portal server 1003 (hereinafter, this is referred to as direct access authentication processing).

However, as to the indirect access authentication processing, the processing can be performed in the same procedure, even in any combinations of the client terminal 1002 and the music data distribution server 1004, the trade server 1005 and the radio broadcasting information distribution server 1006.

Furthermore, also as to the direct access authentication processing, the processing can be performed in the same procedure, even in any combinations of the client terminal 1002 and the music data distribution server 1004, the trade server 1005 and the radio broadcasting information distribution server 1006.

In the direct access authentication processing and the indirect access authentication processing, only the manners of obtaining the URL information to be used in access to the music data distribution server 1004, the trade server 1005 and the radio broadcasting information distribution server 1006 in the client terminal 1002 are different. After the above URL information was obtained, both of the indirect access authentication processing and the direct access authentication processing can be performed in the same procedure.

Thus, hereinafter, the music data distribution server 1004 will be used as a typical of the access destination of the client terminal 1002, to simplify the description. Further, the indirect access authentication processing and the direct access authentication processing will be described as one user authentication processing by putting into together.

First, in step SP1010, the control section 1023 of the client terminal 1002 transmits service session ID information or the like read from the authentication information storing section 1038, together with a page information acquisition request signal that requests to obtain page information for music data distribution (in the trade server 1005 and the radio broadcasting information distribution server 1006 other than that, it changes to page information for package media sale, page information for on-air-list information distribution, or the like), to the music data distribution server 1004 sequentially via the communication control section 1032 and the network interface 1033, according to URL information embedded in the page information as a link, URL information already registered as a bookmark, or the like.

In this connection, the service session ID information is identification information that is issued for identifying each communication connected state (that is, session) every time when the communication of the client terminal 1002 with the music data distribution server 1004, the trade server 1005 and the radio broadcasting information distribution server 1006 is connected to perform various processing such as user authentication processing, by the server accessed by the client terminal 1002, the music data distribution server 1004, the trade server 1005 and the radio broadcasting information distribution server 1006.

Note that, as to the above service session ID information, similarly to the aforementioned authentication session ID information, on use in user authentication processing or the like, a predetermined valid period based on the time issued by the music data distribution server 1004, the trade server 1005 and the radio broadcasting information distribution server 1006 (for example, approximately one minute) has been set.

Therefore, if the client terminal 1002 that obtained the service session ID information from each server 1004 to 1006 cannot present the server being the issuers of the music data distribution server 1004, the trade server 1005 and the radio broadcasting information distribution server 1006, that service session ID information within the valid period, the client terminal 1002 is determined that the communication connected state specified by the above service session ID information was cut off, by these music data distribution server 1004, the trade server 1005 and radio broadcasting information distribution server 1006 being the issuers.

Thereby, the music data distribution server 1004, the trade server 1005 and the radio broadcasting information distribution server 1006 can prevent that the service session ID information issued in the past is illegally used by the user who does not contract with the administrator dealer of the music related service provision system 1000 in the user authentication processing or the like.

The service session ID information temporarily stored in the authentication information storing section 1038 is ID information that was issued by the destinations of access of the music data distribution server 1004, the trade server 1005 and the radio broadcasting information distribution server 1006, when the communication between the client terminal 1002 and the music data distribution server 1004, the trade server 1005 and the radio broadcasting information distribution server 1006 was connected in the past to perform user authentication processing or the like.

In step SP1011, the control section 1070 of the music data distribution server 1004 receives a page information acquisition request signal and service session ID information or the like transmitted from the client terminal 1002, sequentially via the network interface 1073 and the communication control section 1072, and transmits the above received service session ID information or the like to the authentication processing section 1075.

The authentication processing section 1075 performs user authentication processing by comparing the service session ID information or the like received from the client terminal 1002 with the service session ID information or the like already temporarily stored in the authentication information storing section 1077, under the control of the control section 1070.

As a result, if the user using the above client terminal 1002 cannot be authenticated as a regular user because for instance, the valid period of the service session ID information received from the client terminal 1002 has already expired, the authentication processing section 1075 determines the acquisition request for the page information for music data distribution from the client terminal 1002 as an illegal request.

If the user using the client terminal 1002 is not authenticated as a regular user by the authentication processing section 1075, the control section 1070 transmits authentication error information showing an authentication error and a shop code to identify the music data distribution server 1004 to the client terminal 1002 sequentially via the communication control section 1072 and the network interface 1073.

In step SP1012, the control section 1023 of the client terminal 1002 receives the authentication error information and a shop code transmitted from the music data distribution server 1004, sequentially via the network interface 1033 and the communication control section 1032, and recognizes that the user was not authenticated as a regular user in the music data distribution server 1004 by the above received authentication error information, and also temporarily stores that shop code received from the music data distribution server 1004 in the authentication information storing section 1038.

Then, the control section 1023 generates an authentication ticket issuance request signal that requests to issue an authentication ticket to access the music data distribution server 1004 to the portal server 1003, and transmits the above generated authentication ticket issuance request signal, together with the shop code of the music data distribution server 1004 and the authentication session ID information or the like already received from the portal server 1003 and temporarily stored in the authentication information storing section 1038, to the portal server 1003 sequentially via the communication control section 1032 and the network interface 1033.

In step SP1013, the control section 1050 of the portal server 1003 receives the authentication ticket issuance request signal, the shop code and the authentication session ID information or the like transmitted from the client terminal 1002, sequentially via the network interface 1053 and the communication control section 1052, and transmits them to the authentication processing section 1056.

Thereby, the authentication processing section 1056 performs user authentication processing by comparing that authentication session ID information or the like received from that client terminal 1002 with the authentication session ID information or the like already temporarily stored in the authentication information storing section 1057, under the control of the control section 1050.

As a result, if the user using the above client terminal 1002 cannot be authenticated as a regular user because for instance, the valid period of the authentication session ID information received from the client terminal 1002 has already expired, the authentication processing section 1056 determines the authentication ticket issuance request from the client terminal 1002 as an illegal request.

If the user using the client terminal 1002 is not authenticated as a regular user by the authentication processing section 1056, the control section 1050 transmits authentication error information showing an authentication error to the client terminal 1002, sequentially via the communication control section 1052 and the network interface 1053.

On the contrary, if the user using the client terminal 1002 is authenticated as a regular user because for instance, the valid period of the authentication session ID information received from the client terminal 1002 has not been expired, the authentication processing section 1056 determines the authentication ticket issuance request from the above client terminal 1002 as a legal request.

If the user using the client terminal 1002 is authenticated as a regular user by the authentication processing section 1056, the control section 1050 proceeds to step SP1018 that will be described later.

In step SP1014, if the authentication error information transmitted from the portal server 1003 is received sequentially via the network interface 1033 and the communication control section 1032, the control section 1023 of the client terminal 1002 reads the user ID information and the password information or the like stored in the authentication information storing section 1038, and transmits the above read user ID information and password information or the like to the portal server 1003, sequentially via the communication control section 1032 and the network interface 1033.

In step SP1015, the control section 1050 of the portal server 1003 receives the user ID information and the password information or the like transmitted from the client terminal 1002, sequentially via the network interface 1053 and the communication control section 1052, and transmits the above received user ID information and password information or the like to the authentication processing section 1056.

Thereby, the authentication processing section 1056 performs user authentication processing by detecting whether or not the user ID information and the password information or the like received from the client terminal 1002 is included in customer information registered in the customer database section 1054, under the control of the control section 1050.

As a result, if the user using the client terminal 1002 is authenticated as a regular user, the authentication processing section 1056 issues authentication session ID information to the current communication connected state between the client terminal 1002 and the portal server 1003 or the like as portal authentication result information, under the control of the control section 1050, and temporarily stores the authentication session ID information or the like issued to the above client terminal 1002 in the authentication information storing section 1057.

Then, the control section 1050 transmits that authentication session ID information or the like issued to the client terminal 1002 by the authentication processing section 1056, to the client terminal 1002 sequentially via the communication control section 1052 and the network interface 1053.

In step SP1016, the control section 1023 of the client terminal 1002 receives the authentication session ID information or the like transmitted from the portal server 1003, sequentially via the network interface 1033 and the communication control section 1032, and temporarily stores the above received authentication session ID information or the like in the authentication information storing section 1038 by the authentication processing section 1037.

Then, the control section 1023 generates again an authentication ticket issuance request signal that requests to issue an authentication ticket to the portal server 1003, and transmits the above generated authentication ticket issuance request signal, together with the shop code already temporarily stored in the authentication information storing section 1038 and the authentication session ID information or the like temporarily stored at this time, to the portal server 1003 sequentially via the communication control section 1032 and the network interface 1033.

Here, in this embodiment, the shop code has been temporarily stored in the authentication information storing section 1038 in the client terminal 1002. However, the present invention is not only limited to this but when the processing in step SP1012 to step SP1016 is performed between the above client terminal 1002 and the portal server 1003, the shop code may be sequentially transmitted/received. Thereby, it is possible to transmit the shop code to the portal server 1003 in step SP1016 without temporarily storing the shop code in the authentication information storing section 1038 in the client terminal 1002.

In step SP1017, the control section 1050 of the portal server 1003 receives the authentication ticket issuance request signal, shop code and authentication session ID information or the like transmitted from the client terminal 1002 sequentially via the network interface 1053 and the communication control section 1052, and transmits them to the authentication processing section 1056.

Thereby, the authentication processing section 1056 performs user authentication processing by comparing that authentication session ID information or the like received from the client terminal 1002 with the authentication session ID information or the like already temporarily stored in the authentication information storing section 1057, under the control of the control section 1050.

As a result, if the user using the client terminal 1002 is authenticated as a regular user because for instance, the valid period of the authentication session ID information or the like received from the client terminal 1002 has not been expired, the authentication processing section 1056 determines the authentication ticket issuance request from the above client terminal 1002 as a legal request.

If the user using the client terminal 1002 is authenticated as a regular user by the authentication processing section 1056, the control section 1050 proceeds to the next step SP1018.

In step SP1018, the authentication processing section 1056 issues an authentication ticket that enables the client terminal 1002 to access the music data distribution server 1004 shown by the shop code, or the like, as portal authentication result information, based on the shop code and the authentication ticket issuance request signal received from the client terminal 1002 in the aforementioned step SP1017, under the control of the control section 1050.

Then, the authentication processing section 1056 temporarily stores that issued authentication ticket or the like in the authentication information storing section 1057, and extends the valid period of the authentication session ID information or the like issued to the client terminal 1002, under the control of the control section 1050.

The control section 1050 transmits the authentication ticket or the like, together with the authentication session ID information or the like of which the valid period was extended by the authentication processing section 1056, to the client terminal 1002 sequentially via the communication control section 1052 and the network interface 1053.

In step SP1019, the control section 1023 of the client terminal 1002 receives the authentication ticket or the like transmitted from the portal server 1003 and the authentication session ID information of which the valid period was extended or the like, sequentially via the network interface 1033 and the communication control section 1032, and transmits the above received authentication session ID information to the authentication processing section 1037.

The control section 1023 transmits that authentication ticket or the like received from the portal server 1003, together with an authentication request signal, to the music data distribution server 1004 sequentially via the communication control section 1032 and the network interface 1033.

Further, at this time, the authentication processing section 1037 temporarily stores the authentication session ID information or the like that was received from the portal server 1003 and of which the valid period has been extended, in the authentication information storing section 1038, under the control of the control section 1023, by overwriting on the authentication session ID information or the like before that the valid period was extended. Thereby, the authentication session ID information or the like temporarily stored in the aforementioned step SP1016 is updated to the authentication session ID information of which the valid period was extended or the like.

In step SP1020, the control section 1070 in the music data distribution server 1004 receives an authentication request signal and an authentication ticket or the like transmitted from the client terminal 1002, sequentially via the network interface 1073 and the communication control section 1072.

Then, the control section 1070 transmits that authentication ticket or the like received from the client terminal 1002, together with an authentication ticket confirmation request signal that requests to confirm the above authentication ticket or the like, to the portal server 1003 sequentially via the communication control section 1072 and the network interface 1073.

In step SP1021, the control section 1050 of the portal server 1003 receives the authentication ticket confirmation request signal and the authentication ticket or the like transmitted from the music data distribution server 1004, sequentially via the network interface 1053 and the communication control section 1052, and transmits the above received authentication ticket confirmation request signal and authentication ticket or the like to the authentication processing section 1056.

The authentication processing section 1056 performs confirmation processing of the authentication ticket received from the music data distribution server 1004, by comparing that authentication session ID information or the like received from the music data distribution server 1004 with the authentication ticket or the like already temporarily stored in the authentication information storing section 1057, according to the authentication ticket confirmation request signal, under the control of the control section 1050.

As a result, if the authentication ticket or the like received from the music data distribution server 1004 is confirmed as a legal authentication ticket or the like by the authentication processing section 1056, the control section 1050 transmits confirmation result information showing that the above authentication ticket or the like was confirmed as a legal authentication ticket or the like to the music data distribution server 1004, sequentially via the communication control section 1052 and the network interface 1053.

In step SP1022, the control section 1070 in the music data distribution server 1004 receives the confirmation result information transmitted from the portal server 1003 sequentially via the network interface 1073 and the communication control section 1072, and transmits the above received confirmation result information to the authentication processing section 1075.

According to that confirmation result information, the authentication processing section 1075 issues service session ID information or the like to the current communication connected state between the client terminal 1002 and the music data distribution server 1004, as server authentication result information, under the control of the control section 1070, and temporarily stores the above issued service session ID information or the like in the authentication information storing section 1077.

On the other hand, the control section 1070 transmits that service session ID information or the like issued to the client terminal 1002 by the authentication processing section 1075, to the client terminal 1002 sequentially via the communication control section 1072 and the network interface 1073.

In step SP1023, the control section 1023 in the client terminal 1002 receives the service session ID information or the like transmitted from the music data distribution server 1004, sequentially via the network interface 1033 and the communication control section 1032. The above received service session ID information or the like is temporarily stored in the authentication information storing section 1038 by the authentication processing section 1037.

The control section 1023 receives a page information acquisition request signal that requests page information for music data distribution, and transmits, together with the service session ID information or the like received from the music data distribution server 1004 and temporarily stored in the authentication information storing section 1038, to the music data distribution server 1004 sequentially via the communication control section 1032 and the network interface 1033.

In step SP1024, the control section 1070 in the music data distribution server 1004 receives the page information acquisition request signal and the service session ID information or the like transmitted from the client terminal 1002, sequentially via the network interface 1073 and the communication control section 1072, and transmits the above received service session ID information or the like to the authentication processing section 1075.

Thereby, the authentication processing section 1075 performs user authentication processing by comparing the service session ID information or the like received from the client terminal 1002 with the service session ID information or the like that was already issued to the client terminal 1002 in the aforementioned step SP1022 and has been temporarily stored in the authentication information storing section 1077, under the control of the control section 1070.

As a result, if the user using the client terminal 1002 is authenticated as a regular user because for instance, the valid period of the service session ID information or the like received from the client terminal 1002 has not been expired, the authentication processing section 1075 determines the acquisition request for the page information for music data distribution from the above client terminal 1002 as a legal request.

If the user using the client terminal 1002 is authenticated as a regular user by the authentication processing section 1075, the control section 1070 proceeds to the next step SP1025.

In step SP1025, the control section 1070 reads the page information for music data distribution that was requested to obtain by the user from the page information storing section 1076, and also extends the valid period of the service session ID information or the like issued to the client terminal 1002 by the authentication processing section 1075.

Then, the control section 1070 transmits that page information for music data distribution read from the page information storing section 1076, together with the service session ID information of which the valid period was extended by the authentication processing section 1075 or the like, to the client terminal 1002 sequentially via the communication control section 1072 and the network interface 1073.

In step SP1026, the control section 1023 in the client terminal 1002 receives the page information for music data distribution and the service session ID information of which the valid period was extended or the like transmitted from the music data distribution server 1004, sequentially via the network interface 1033 and the communication control section 1032, transmits the above received page information for music data distribution to the page information generating section 1036, and also transmits that service session ID information or the like received from the music data distribution server 1004 to the authentication processing section 1037.

The authentication processing section 1037 temporarily stores the service session ID information or the like that was received from the music data distribution server 1004 and of which the valid period has been extended, in the authentication information storing section 1038, under the control of the control section 1023, by overwriting on the service session ID information or the like before that the valid period was extended. Thereby, the service session ID information or the like temporarily stored in the aforementioned step SP1023 is updated to the service session ID information of which the valid period was extended or the like.

On the other hand, the page information generating section 1036 generates video data based on the page information for music data distribution, and transmits the above generated video data to the display control section 1024.

The display control section 1024 performs digital-to-analog conversion on the video data supplied from the page information generating section 1036, and transmits thus obtained analog video signal to the display section 1025. Thus, a page for music data distribution is displayed in the above display section 1025 as an image based on that analog video signal.

(3-7-3) Music Related Service Providing Processing

Next, referring to FIGS. 21 to 24, music related service providing processing when the client terminal 1002 receives the provision of a music data distribution service, a trade service and a radio broadcasting information distribution service by using page information for music data distribution, page information for package media sale, and page information for on-air-list information distribution, or the like, obtained from the music data distribution server 1004, the trade server 1005 and the radio broadcasting information distribution server 1006 in the above user authentication processing procedure, after completion of the user authentication processing procedure described above with reference to FIG. 20 performed between the client terminal 1002 and the music data distribution server 1004, the trade server 1005 and the radio broadcasting information distribution server 1006, will be described.

(3-7-3-1) Music Data Distribution Service Providing Processing Procedure

Figure 21:
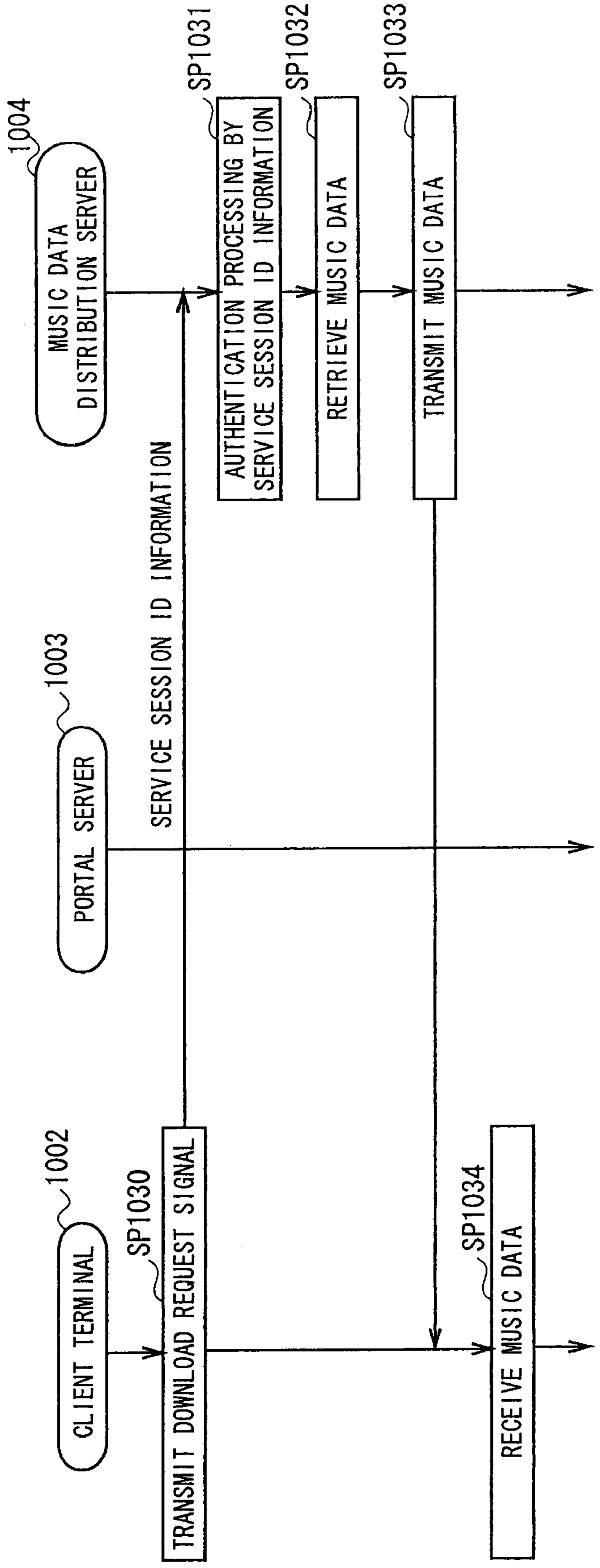
FIG. 21 is a sequence chart showing a music data distribution service providing processing procedure.

First, referring to FIG. 21, a music data distribution service providing processing procedure when the client terminal 1002 receives the provision of a music data distribution service from the music data distribution server 1004 will be described.

If a control command to select a part of a page for music data distribution displayed in the display section 1025 as an image is inputted from the input processing section 1021, in step SP1030, the control section 1023 in the client terminal 1002 generates a download request signal that requests to download music data wanted to download, according to the above inputted control command.

Then, the control section 1023 transmits that download request signal, together with service session ID information or the like that was already issued in the music data distribution server 1004 and has been temporarily stored in the authentication information storing section 1038, to the music data distribution server 1004 sequentially via the communication control section 1032 and the network interface 1033.

In step SP1031, the control section 1070 in the music data distribution server 1004 receives the download request signal transmitted from the client terminal 1002 and the service session ID information or the like, sequentially via the network interface 1073 and the communication control section 1072, and transmits the above received service session ID information or the like to the authentication processing section 1075.

The authentication processing section 1075 performs user authentication processing by comparing the service session ID information or the like received from the client terminal 1002 with the service session ID information or the like already temporarily stored in the authentication information storing section 1077, under the control of the control section 1070.

As a result, if the user who requested to download the music data by using the client terminal 1002 is authenticated as a regular user by the authentication processing section 1075, the control section 1070 proceeds to the next step SP1032.

In step SP1032, the retrieval section 1079 retrieves music data wanted to download that corresponds to a search condition shown by a search key, from among plural music data in the music data storing section 1078, based on the search key stored in the download request signal.

If the music data is retrieved by the retrieval section 1079, the control section 1070 extends the valid period of the service session ID information issued to the client terminal 1002 or the like by the authentication processing section 1075, and proceeds to the next step SP1033.

In step SP1033, the control section 1070 reads the music data wanted to download that was retrieved by the retrieval section 1079 from the music data storing section 1078, and transmits the above read music data wanted to download, together with the service session ID information of which the valid period was extended by the authentication processing section 1075 or the like, to the client terminal 1002 sequentially via the communication control section 1072 and the network interface 1073.

In step SP1034, the control section 1023 in the client terminal 1002 receives the music data wanted to download transmitted from the music data distribution server 1004 and the service session ID information of which the valid period was extended or the like, sequentially via the network interface 1033 and the communication control section 1032, and stores the above received music data in the storage medium 1029 and also transmits that service session ID information or the like received from the music data distribution server 1004 to the authentication processing section 1037.

The authentication processing section 1037 temporarily stores the service session ID information or the like that was received from the music data distribution server 1004 and of which the valid period has been extended, in the authentication information storing section 1038, under the control of the control section 1023, by overwriting on the service session ID information or the like before that the valid period was extended. Thereby, the contents of the service session ID information or the like already temporarily stored in the above authentication information storing section 1038 are updated.

In this manner, the client terminal 1002 can download music data that was wanted to obtain by the user by using the music data distribution service provided by the music data distribution server 1004.

(3-7-3-2) Trade Service Providing Processing Procedure

Figure 22:
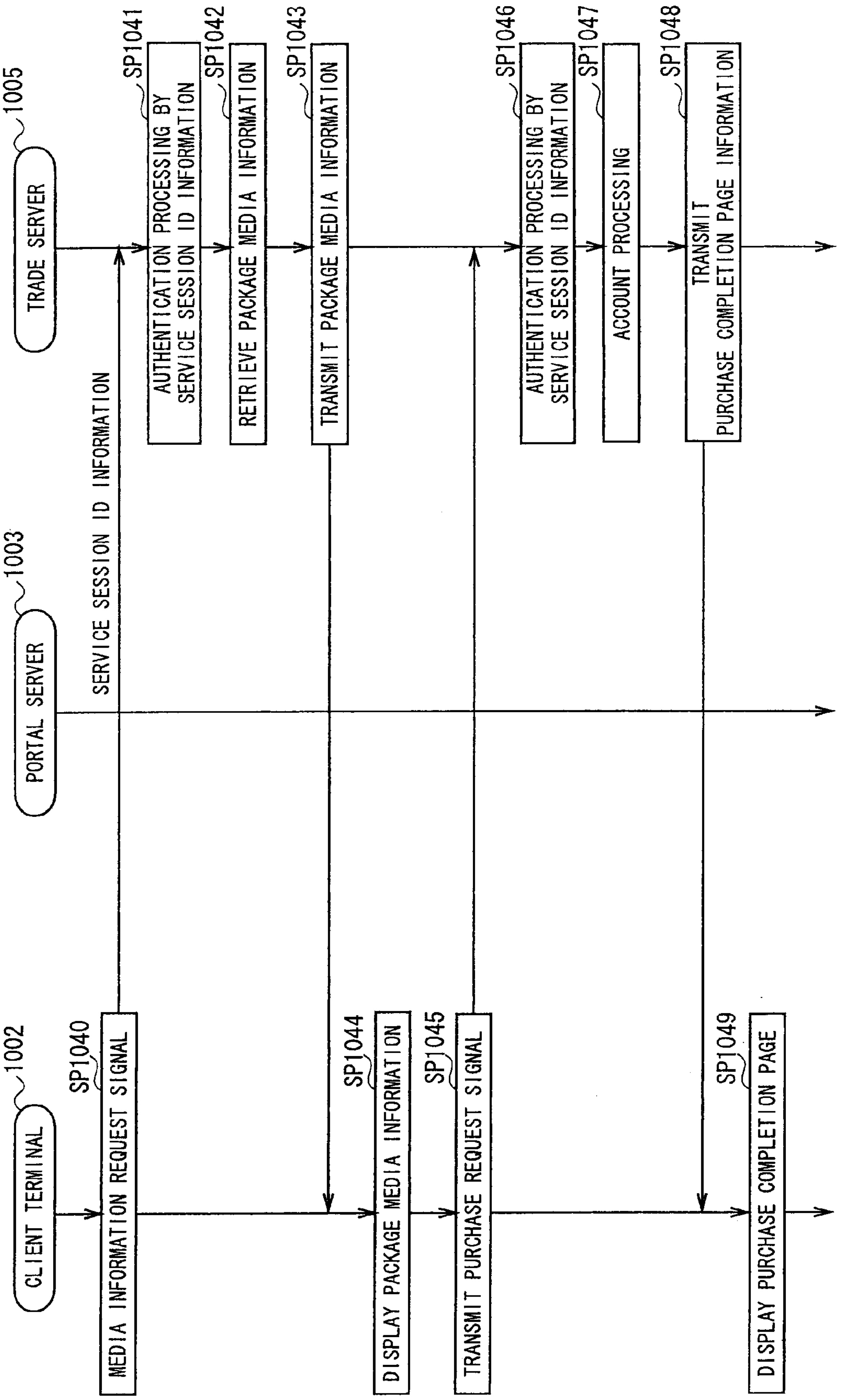
FIG. 22 is a sequence chart showing a trade service providing processing procedure.

Next, referring to FIG. 22, a trade service providing processing procedure when the client terminal 1002 receives the provision of a trade service from the trade server 1005 will be described.

If a control command to select a part of a page for package media sale displayed in the display section 1025 as an image is inputted from the input processing section 1021, in step SP1040, the control section 1023 in the client terminal 1002 generates a media information request signal that requests package media information concerning specified package media according to the above inputted control command.

Then, the control section 1023 transmits that media information request signal, together with service session ID information or the like that was already issued in the trade server 1005 and has been temporarily stored in the authentication information storing section 1038, to the trade server 1005 sequentially via the communication control section 1032 and the network interface 1033.

In step SP1041, the control section 1090 in the trade server 1005 receives the media information request signal and the service session ID information or the like, transmitted from the client terminal 1002, sequentially via a network interface 1093 and a communication control section 1092, and transmits the above received service session ID information or the like to an authentication processing section 1095.

The authentication processing section 1095 performs user authentication processing by comparing the service session ID information or the like received from the client terminal 1002 with the service session ID information or the like already temporarily stored in an authentication information storing section 1097, under the control of the control section 1090.

As a result, if the user who requested package media information concerning package media by using the client terminal 1002 is authenticated as a regular user by the authentication processing section 1095, the control section 1090 proceeds to the next step SP1042.

In step SP1042, a retrieval section 1099 retrieves package media information on specified package media that corresponds to a search condition shown by a search key, from among plural package media information in the package media storing section 1098, based on the search key stored in the media information request signal.

If the package media information is retrieved by the retrieval section 1099, the control section 1090 extends the valid period of the service session ID information or the like issued to the client terminal 1002 by the authentication processing section 1095, and proceeds to the next step SP1043.

In step SP1043, the control section 1090 reads the package media information retrieved by the retrieval section 1099 from the package media storing section 1098, and transmits the above read package media information, together with the service session ID information of which the valid period was extended by the authentication processing section 1095 or the like, to the client terminal 1002 sequentially via the communication control section 1092 and the network interface 1093.

In step SP1044, the control section 1023 in the client terminal 1002 receives the package media information transmitted from the trade server 1005 and the service session ID information of which the valid period was extended or the like, sequentially via the network interface 1033 and the communication control section 1032, and transmits the above received package media information to the page information generating section 1036 and also transmits that service session ID information or the like received from the trade server 1005 to the authentication processing section 1037.

The authentication processing section 1037 temporarily stores the service session ID information that was received from the trade server 1005 and of which the valid period has been extended or the like, in the authentication information storing section 1038, under the control of the control section 1023, by overwriting on the service session ID information or the like before that the valid period was extended. Thereby, the contents of the service session ID information or the like already temporarily stored in the above authentication information storing section 1038 are updated.

Further, the page information generating section 1036 generates video data based on the package media information supplied from the control section 1023, converts the above generated video data into an analog video signal by the display control section 1024 and transmits the signal to the display section 1025.

If displaying the package media information in the display section 1025 as an image based on that analog video signal, the control section 1023 proceeds to the next step SP1045.

In step SP1045, if a control command to order the purchase of package media corresponding to the package media information displayed in the display section 1025 as the image is inputted from the input processing section 1021, the control section 1023 generates a purchase order signal that orders the purchase of that package media according to the above inputted control command.

Then, the control section 1023 transmits that purchase order signal, together with the service session ID information already received from the trade server 1005 and temporarily stored in the authentication information storing section 1038 (that is, the service session ID information of which the valid period was extended or the like), to the trade server 1005 sequentially via the communication control section 1032 and the network interface 1033.

In step SP1046, the control section 1090 in the trade server 1005 receives the purchase order signal transmitted from the client terminal 1002 and the service session ID information or the like, sequentially via the network interface 1093 and the communication control section 1092, and transmits the above received service session ID information or the like to the authentication processing section 1095.

The authentication processing section 1095 performs user authentication processing by comparing the service session ID information or the like received from the client terminal 1002 with the service session ID information or the like already temporarily stored in the authentication information storing section 1097, under the control of the control section 1090.

As a result, if the user who ordered the purchase of package media by using the client terminal 1002 is authenticated as a regular user by the authentication processing section 1095, the control section 1090 proceeds to the next step SP1047.

In step SP1047, the control section 1090 performs purchase processing such as the procedure for delivering the package media of which the purchase was ordered to the user using the client terminal 1002, and transmits account information for charging processing to the user accompanied with the purchase of the above package media to the account server 1008 sequentially via the communication control section 1092 and the network interface 1093. Thereby, charging processing corresponding to the purchase of the package media to the above user is performed in that account server 1008.

Further, the control section 1090 makes the authentication processing section 1095 extend the valid period of the service session ID information or the like that was issued to the client terminal 1002.

In step SP1048, after completion of the charging processing, the control section 1090 transmits purchase completion page information showing that the purchase processing of the package media has completed, together with the service session ID information of which the valid period was extended by the authentication processing section 1095 or the like, to the client terminal 1002 sequentially via the communication control section 1092 and the network interface 1093.

In step SP1049, the control section 1023 in the client terminal 1002 receives the purchase completion page information transmitted from the trade server 1005 and the service session ID information of which the valid period was extended or the like, sequentially via the network interface 1033 and the communication control section 1032, and transmits the above received purchase completion page information to the page information generating section 1036, and also transmits that service session ID information or the like received from the trade server 1005 to the authentication processing section 1037.

The authentication processing section 1037 temporarily stores the service session ID information that was received from the trade server 1005 and of which the valid period has been extended or the like, in the authentication information storing section 1038, under the control of the control section 1023, by overwriting on the service session ID information or the like before that the valid period was extended. Thereby, the contents of the service session ID information or the like already temporarily stored in the above authentication information storing section 1038 are updated.

Further, the page information generating section 1036 generates video data based on the purchase completion page information supplied from the control section 1023, converts the above generated video data into an analog video signal by the display control section 1024 and transmits the signal to the display section 1025.

Thereby, a purchase completion page is displayed in the display section 1025 as an image based on that analog video signal by the control section 1023.

In this manner, the client terminal 1002 can make the user purchase desired package media by using the trade service provided by the trade server 1005.

Figure 23:
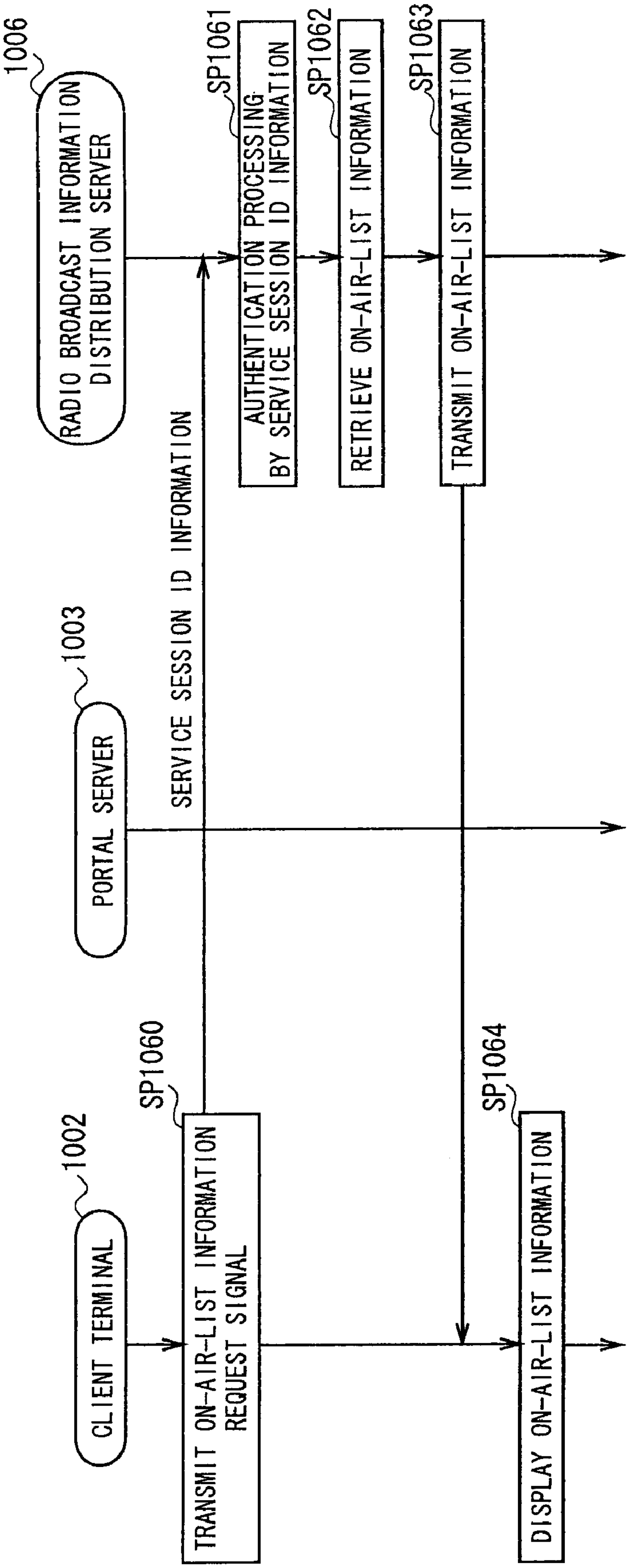
FIG. 23 is a sequence chart showing a radio broadcast information (on-air-list information) distribution service providing processing procedure (1).

(3-7-3-3) On-air-list Information Distribution Service Providing Processing Procedure Next, with reference to FIG. 23, a radio broadcasting information distribution service providing processing procedure when the client terminal 1002 receives the provision of especially an on-air-list information distribution service from the radio broadcasting information distribution server 1006 as a radio broadcasting information distribution service will be described.

If a search key for on-air-list information retrieval wanted to obtain is inputted to an input box on a page for on-air-list information distribution displayed in the display section 1025 as an image, and a control command corresponding to a character string showing the above inputted search key is inputted from the input processing section 1021, in step SP1060, the control section 1023 in the client terminal 1002 generates an on-air-list information request signal that requests to download the on-air-list information wanted to obtain, according to the above inputted control command.

Then, the control section 1023 transmits that on-air-list information request signal, together with the service session ID information or the like already issued in the radio broadcasting information distribution server 1006 and temporarily stored in the authentication information storing section 1038, to the radio broadcasting information distribution server 1006 sequentially via the communication control section 1032 and the network interface 1033.

In step SP1061, the control section 1110 in the radio broadcasting information distribution server 1006 receives the on-air-list information request signal and the service session ID information or the like transmitted from the client terminal 1002, sequentially via the network interface 1113 and the communication control section 1112, and transmits the above received service session ID information or the like to the authentication processing section 1115.

The authentication processing section 1115 performs user authentication processing by comparing the service session ID information or the like received from the client terminal 1002 with the service session ID information or the like already temporarily stored in the authentication information storing section 1120, under the control of the control section 1110.

As a result, if the user who requested the on-air-list information by using the client terminal 1002 is authenticated as a regular user by the authentication processing section 1115, the control section 1110 proceeds to the next step SP1062.

In step SP1062, the retrieval section 1118 retrieves a predetermined range part corresponding to a search condition shown by the search key from all of the on-air-list information in the on-air-list information storing section 1117, as the on-air-list information wanted to obtain, based on the search key stored in the on-air-list information request signal.

If the on-air-list information is retrieved by the retrieval section 1118, the control section 1110 makes the authentication processing section 1115 extend the valid period of the service session ID information or the like issued to the client terminal 1002, and proceeds to the next step SP1063.

In step SP1063, the control section 1110 reads the on-air-list information retrieved by the retrieval section 1118 from the on-air-list information storing section 1117, and transmits the above read on-air-list information, together with the service session ID information of which the valid period was extended by the authentication processing section 1115 or the like, to the client terminal 1002 sequentially via the communication control section 1112 and the network interface 1113.

In step SP1064, the control section 1023 in the client terminal 1002 receives the on-air-list information and the service session ID information of which the valid period was extended or the like that was transmitted from the radio broadcasting information distribution server 1006, sequentially via the network interface 1033 and the communication control section 1032, and transmits the above received on-air-list information to the page information generating section 1036 and also transmits that service session ID information or the like received from the radio broadcasting information distribution server 1006 to the authentication processing section 1037.

The authentication processing section 1037 temporarily stores the service session ID information that was received from the radio broadcasting information distribution server 1006 and of which the valid period was extended or the like, in the authentication information storing section 1038, under the control of the control section 1023, by overwriting on the service session ID information or the like before that the valid period was extended. Thereby, the contents of the service session ID information or the like already temporarily stored in the above authentication information storing section 1038 are updated.

Further, the page information generating section 1036 generates video data based on the on-air-list information supplied from the control section 1023, converts the above generated video data into an analog video signal by the display control section 1024 and transmits the signal to the display section 1025. Thereby, the on-air-list information is displayed in the above display section 1025 as an image based on that analog video signal.

In this manner, the client terminal 1002 can make the user obtain desired on-air-list information by using the radio broadcast information distribution service provided by the radio broadcasting information distribution server 1006.

Figure 24:
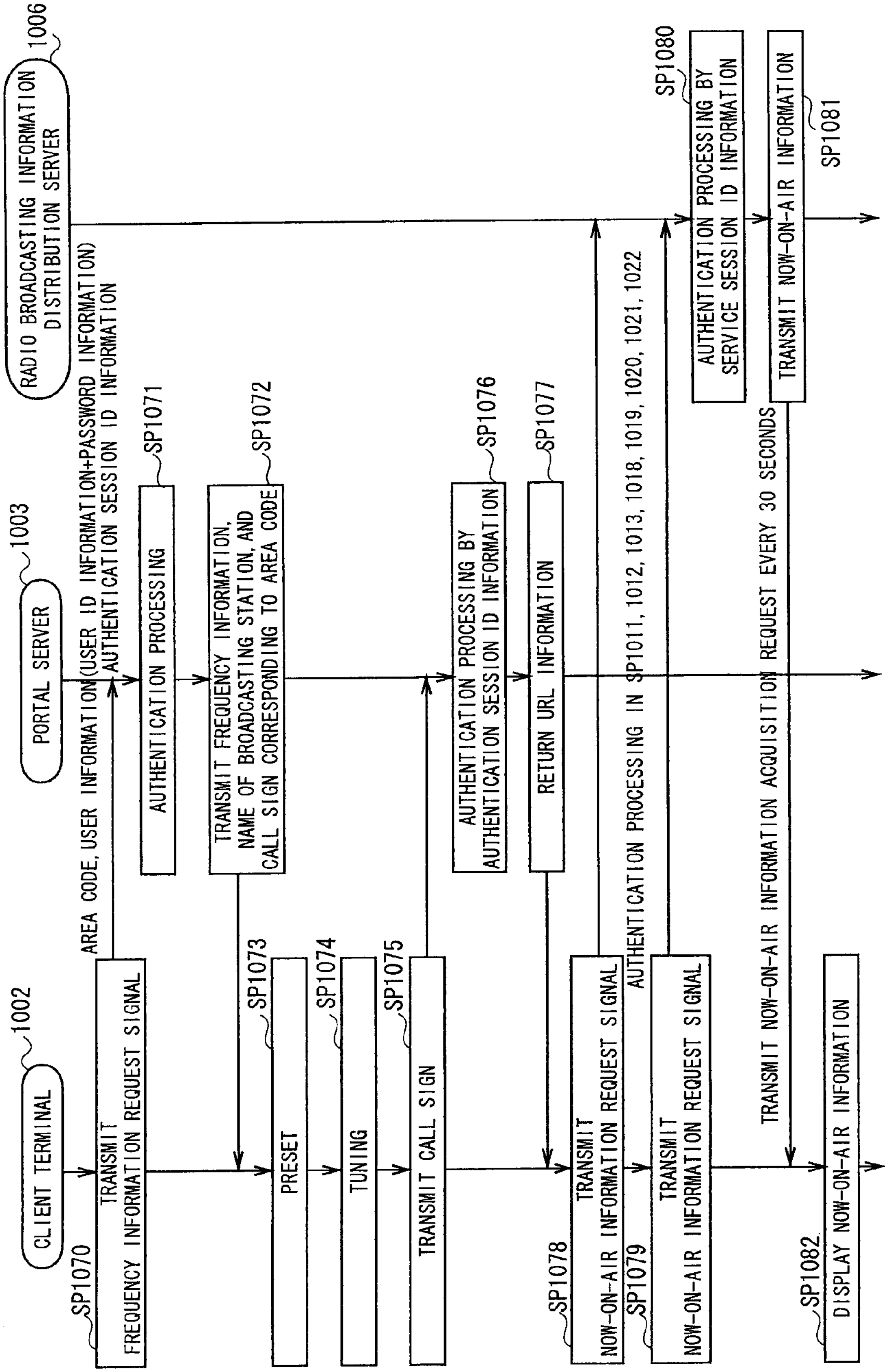
FIG. 24 is a sequence chart showing a radio broadcast information (now-on-air information) distribution service providing processing procedure (2).

(3-7-3-4) Now-on-air Information Distribution Service Providing Processing Procedure Next, with reference to FIG. 24, a radio broadcasting information distribution service providing processing procedure when the client terminal 1002 especially receives the provision of a now-on-air information distribution service from the radio broadcasting information distribution server 1006 as a radio broadcasting information distribution service will be described.

However, the radio broadcasting information distribution server 1006 which provides now-on-air information is provided in each radio station (call sign).

Then, there is a case where in the initial state, URL information about the radio broadcasting information distribution server 1006 corresponding to each radio station has not been stored in the client terminal 1002.

Therefore, as to the radio broadcasting information distribution service providing processing procedure below, the case where the URL information about each radio broadcasting information distribution server 1006 is managed by the portal server 1003 every call sign of a radio station will be described as an example.

Further, in the above radio broadcasting information distribution service providing processing procedure, the case where when the client terminal 1002 requests the portal server 1003 to transmit frequency information showing the broadcasting frequency in order to automatically preset the broadcast frequency of each radio station, authentication session ID information or the like has not been temporarily stored in the authentication information storing section 1038 is assumed. Thus, the client terminal 1002 first transmits user ID information and password information or the like to the portal server 1003.

In step SP1070, if an operating command to request to automatically preset the broadcast frequency of each radio station is inputted from the input processing section 1021, in response to this, the control section 1023 in the client terminal 1002 transmits a frequency information request signal that requests to obtain frequency information about receivable broadcasting frequency of each radio station, together with an area code inputted by the user and user ID information and password information or the like stored in the authentication information storing section 1038, to the portal server 1003 sequentially via the communication control section 1032 and the network interface 1033.

In step SP1071, the control section 1050 in the portal server 1003 receives the frequency information request signal, area code, user ID information, and password information or the like transmitted from the client terminal 1002, sequentially via the network interface 1053 and the communication control section 1052, and transmits that user ID information and password information or the like received from the client terminal 1002 to the authentication processing section 1056.

The authentication processing section 1056 performs user authentication processing by comparing the user ID information and password information or the like received from the client terminal 1002 with customer information registered in the customer database section 1054, under the control of the control section 1050.

As a result, if the authentication processing section 1056 authenticates the user using the client terminal 1002 as a regular user and determines the frequency information acquisition request from the above client terminal 1002 as a legal request, authentication session ID information or the like to the current communication connected state between the client terminal 1002 and the portal server 1003 is issued, and the above issued authentication session ID information or the like is temporarily stored in the authentication information storing section 1057, under the control of the control section 1050.

If the user is authenticated as a regular user by the authentication processing section 1056 as the above, the control section 1050 proceeds to the next step SP1072.

In step SP1072, the control section 1050 searches for frequency information, radio station name and a call sign that corresponds to the area code from the list of plural frequency information, radio station names and call signs in the frequency information storing section 1058 based on the area code received from the client terminal 1002, lists them, and reads it out.

The control section 1050 transmits the frequency information, radio station name and call sign thus listed and read from the frequency information storing section 1058, together with the authentication session ID information or the like issued to the client terminal 1002 by the authentication processing section 1056 in the aforementioned step SP1071, to the client terminal 1002 sequentially via the communication control section 1052 and the network interface 1053.

In step SP1073, the control section 1023 in the client terminal 1002 receives the list of the frequency information, radio station name and call sign, and the authentication session ID information or the like, that were transmitted from the portal server 1003, sequentially via the network interface 1033 and the communication control section 1032, and transmits the above authentication session ID information or the like received from the portal server 1003 to the authentication processing section 1037, and also transmits the list of the frequency information, radio station name and call sign to the display control section 1024.

The authentication processing section 1037 temporarily stores the authentication session ID information or the like received from the portal server 1003 in the authentication information storing section 1038, under the control of the control section 1023.

On the other hand, the display control section 1024 transmits the list of the frequency information, radio station name and call sign supplied from the control section 1023 to the display section 1025, so that the list is displayed in the above display section 1025.

Further, the control section 1023 stores the frequency information, radio station name and call sign selected based on a select command inputted from the input processing section 1021 at this time, in the storage medium 1029 as presetting, and proceeds to the next step SP1074.

In step SP1074, the control section 1023 controls the tuner section 1031 to extract the radio broadcasting signal of radio broadcasting broadcasted at a broadcast frequency corresponding to a tuning control command from radio broadcast waves, according to the tuning control command inputted from the input processing section 1021.

Thereby, the tuner section 1031 extracts the radio broadcasting signal broadcasted at that broadcast frequency from among radio broadcast waves received by the broadcast signal receiving section 30, performs predetermined receiving processing such as decoding to the extracted signal, and transmits thus obtained audio data to the audio control section 1026.

The audio control section 1026 converts the audio data supplied from the tuner section 1031 into an analog audio signal, and transmits the signal to the speaker 1027. Thus, the sound of the selected radio program can be emitted from the above speaker 1027.

In step SP1075, the radio broadcasting display control section 1039 reads the call sign that has been stored corresponding to the frequency information showing a broadcast frequency corresponding to the aforementioned tuning control command from the storage medium 1029, under the control of the control section 1029, and transmits the above read call sign, together with the authentication session ID information or the like already temporarily stored in the authentication information storing section 1038, to the portal server 1003 sequentially via the communication control section 1032 and the network interface 1033.

In step SP1076, the control section 1050 in the portal server 1003 receives the call sign and the authentication session ID information or the like transmitted from the client terminal 1002, sequentially via the network interface 1053 and the communication control section 1052, and transmits the above received authentication session ID information or the like to the authentication processing section 1056.

The authentication processing section 1056 performs user authentication processing by comparing the authentication session ID information or the like received from the client terminal 1002 with the authentication session ID information or the like already temporarily stored in the authentication information storing section 1057, under the control of the control section 1050.

As a result, if the authentication session ID information or the like received from the client terminal 1002 is before the valid period and the user who transmitted the call sign by using the above client terminal 1002 is authenticated as a regular user by the authentication processing section 1056, the control section 1050 proceeds to the next step SP1077.

In step SP1077, the control section 1050 retrieves URL information connected with the call sign from among plural URL information in the URL storing section 1059, based on the call sign received from the client terminal 1002.

Further, the control section 1050 extends the valid period of the authentication session ID information or the like issued to the client terminal 1002 by the authentication processing section 1056.

Then, the control section 1050 reads that retrieved URL information from the URL storing section 1059, and transmits the above read URL information, together with the authentication session ID information of which the valid period was extended by the authentication processing section 1056 or the like, to the client terminal 1002 sequentially via the communication control section 1052 and the network interface 1053.

In step SP1078, the control section 1023 in the client terminal 1002 receives the URL information and the authentication session ID information of which the valid period was extended or the like that was transmitted from the portal server 1003, sequentially via the network interface 1033 and the communication control section 1032, and transmits the above received authentication session ID information or the like to the authentication processing section 1037 and also transmits the URL information to the radio broadcasting display control section 1039.

The authentication processing section 1037 temporarily stores the authentication session ID information that was received from the portal server 1003 and of which the valid period was extended or the like, in the authentication information storing section 1038, under the control of the control section 1023, by overwriting on the authentication session ID information or the like before that the valid period was extended. Thereby, the contents of the authentication session ID information or the like already temporarily stored in the above authentication information storing section 1038 are updated.

On the other hand, the radio broadcasting display control section 1039 temporarily stores the above URL information supplied from the control section 1023 in the storage medium 1029 or the like in connection with the call sign stored in the storage medium 1029, under the control of the control section 1023.

Then, the radio broadcasting display control section 1039 transmits a now-on-air information request signal that requests to obtain now-on-air information, together with the service session ID information or the like that was already received from the radio broadcasting information distribution server 1006 and has been temporarily stored in the authentication information storing section 1038, to the radio broadcasting information distribution server 1006 sequentially via the communication control section 1032 and the network interface 1033, according to the URL information temporarily stored in the storage medium 1029 or the like, under the control of the control section 1023.

Figure 20:
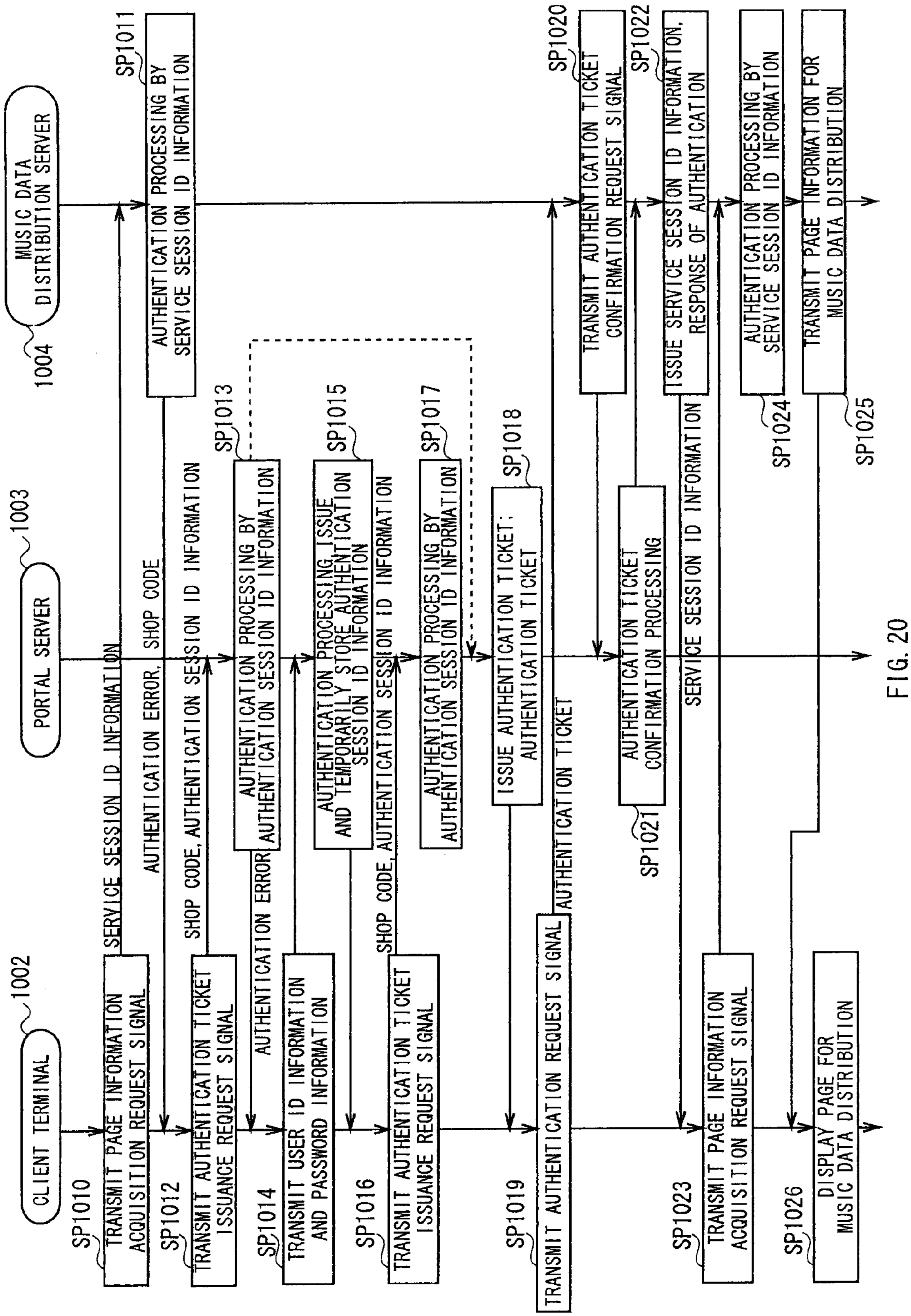
FIG. 20 is a sequence chart showing a user authentication processing procedure between the client terminal and the music data distribution server.

Here, in the above radio broadcasting information distribution service providing processing procedure, the processing for transmitting the now-on-air information request signal and the service session ID information or the like from the client terminal 1002 to the radio broadcasting information distribution server 1006 in step SP1078 corresponds to the processing in the aforementioned step SP1010 with reference to FIG. 20.

Therefore, in this radio broadcasting information distribution service providing processing procedure, following the processing in step SP1078, in the client terminal 1002, the radio broadcasting information distribution server 1006 and the portal server 1003, the same user authentication processing as the processing in steps SP1011-SP1013 and steps SP1018-SP1022 described above with reference to FIG. 20 is sequentially performed, and then the control section 1039 proceeds to the next step SP1079.

In step SP1079, the radio broadcasting display control section 1039 in the client terminal 1002 transmits again a now-on-air information request signal, together with the service session ID information or the like that was already received from the radio broadcasting information distribution server 1006 and has been temporarily stored in the authentication information storing section 1038, to the radio broadcasting information distribution server 1006 sequentially via the communication control section 1032 and the network interface 1033, according to the URL information temporarily stored in the storage medium 1029 or the like, under the control of the control section 1023.

In step SP1080, the control section 1110 in the radio broadcasting information distribution server 1006 receives the now-on-air information request signal and the service session ID information or the like transmitted from the client terminal 1002, sequentially via the network interface 1113 and the communication control section 1112, and transmits the above received authentication session ID information or the like to the authentication processing section 1115.

The authentication processing section 1115 performs user authentication processing by comparing the service session ID information or the like received from the client terminal 1002 with the service session ID information or the like already temporarily stored in the authentication information storing section 1120, under the control of the control section 1110.

As a result, if authenticating the user using the client terminal 1002 as a regular user, the authentication processing section 1115 determines that the now-on-air information acquisition request from the above client terminal 1002 is a legal request.

If the user using the client terminal 1002 is authenticated as a regular user by the authentication processing section 1115, the control section 1110 makes the above authentication processing section 1115 extend the valid period of the service session ID information or the like issued to that client terminal 1002, and then proceeds to the next step SP1081.

In step SP1081, the control section 1110 reads now-on-air information from the now-on-air information storing section 1119, and transmits the above read now-on-air information, together with the service session ID information of which the valid period was extended by the authentication processing section 1115 or the like, to the client terminal 1002 sequentially via the communication control section 1112 and the network interface 1113.

In step SP1082, the control section 1023 in the client terminal 1002 receives the now-on-air information transmitted from the radio broadcasting information distribution server 1006, and the service session ID information of which the valid period was extended or the like, sequentially via the network interface 1033 and the communication control section 1032, and transmits the above received service session ID information or the like to the authentication processing section 1037, and also temporarily stores the now-on-air information in a random access memory (RAM, not shown) in the above control section 1023, and transmits the now-on-air information to the radio broadcasting display control section 1039.

The authentication processing section 1037 temporarily stores the service session ID information that was received from the radio broadcasting information distribution server 1006 and of which the valid period was extended or the like, in the authentication information storing section 1038, under the control of the control section 1023, by overwriting on the service session ID information or the like before that the valid period was extended. Thereby, the contents of the service session ID information or the like already temporarily stored in the above authentication information storing section 1038 are updated.

The radio broadcasting display control section 1039 transmits the now-on-air information supplied from the control section 1023 to the display section 1025 via the display control section 1024. Thereby, the now-on-air information about the radio program by the radio broadcasting being received now is displayed in the above display section 1025.

After this, in the above radio broadcasting information distribution service providing processing procedure, the client terminal 1002 periodically repeats the now-on-air information acquisition request in step SP1079 (for example, every 30 seconds), and the radio broadcasting information distribution server 1006 receives that acquisition request from the client terminal 1002 and sequentially performs the processing of steps SP1080 and SP1081.

Thereby, in the client terminal 1002, the program title of the radio program being received now, the broadcasting start time of the program, the broadcasting end time of the program, the title, the artist name of the musical composition being broadcasted now in that radio program, the broadcasting start time of the musical composition, and the like can be momentarily updated as now-on-air information, and can be displayed in the display section 1025 in the client terminal 1002.

Furthermore, in this second embodiment, also if a pleased musical composition is broadcasted, and the user of the client terminal 1002 and clips radio broadcasting information (that is, now-on-air information) about that musical composition while listening to the radio broadcasting, the above client terminal 1002, the portal server 1003 and the radio broadcasting information distribution server 1006 perform the processing of steps SP1078 to SP1082.

However, in the case where an input to direct a clip is received from the user, in the processing of step SP1082, the control section 1023 in the client terminal 1002 stores the obtained now-on-air information in the storage medium 1029, similarly to the first embodiment.

According to the above structure, the same effects as the first embodiment can be obtained also in the music related service provision system 1000 according to this second embodiment.

Note that, in the aforementioned first and second embodiments, it has dealt with the case where the related information provided from the broadcasting station server 32 and the radio broadcasting information distribution server 1006 is clipped by the terminal unit 10 and the client terminal 1002. In the above terminal unit 10 and client terminal 1002, however, also related information provided from the other server can be clipped. That is, when musical compositions of which related information can be clipped are displayed in the display device 17 and the display section 1025, if the user starts clip operation by selecting the musical composition, corresponding related information is stored in the clip information storage unit 21*a* and the storage medium 1029.

The clip information stored in the terminal unit 10 and the client terminal 1002 can be used for the search of a musical composition, purchase of audio data, purchase of a CD and a DVD, and the like, by that the user accesses the CD title information provision server 31, the music distribution server 33, the CD shop server 34, the music data distribution server 1004, and the trade server 1005, or the like, from the above terminal unit 10 and client terminal 1002.

Further, each processing function described in the aforementioned first and second embodiments is realized by a program to be executed by the CPU 11 of the terminal unit 10 and the control section 1023 of the client terminal 1002. Such program is stored by installing in the HDD 21, the ROM 13 and the storage medium 1029, for example.

Or, the program can be temporarily or perpetually stored in a removable recording medium such as a flexible disk, a compact disc read-only memory (CD-ROM), a magneto-optical (MO) disc, a DVD, a magnetic disk, and a semiconductor memory. Such removable recording medium can be provided as the so-called package software.

For instance, if it is the first embodiment, the program can be recorded in media or the like usable in the media drives 19*a*, 19*b*, and the media can be provided as package software. Thus, in the terminal unit 10, the program can be installed by reading the program from the media, with the media drives 19*a*, 19*b* and storing it in the HDD 21 and the ROM 13. Furthermore, by setting as such package software, the system program to which the present invention is applied can be installed also to a general purpose personal computer, for example. Of course, also in the second embodiment, the program may be recorded in package software and may be installed in a personal computer or the like.

Further, the program also can be downloaded from a server storing the program via a network such as a local area network (LAN) and the Internet, in addition to installation from the removable recording medium as the above.

Furthermore, an updating program to add later a processing function to which the present invention is applied may be created, and this update program may be distributed as package software or may be distributed on the network. The user may get this updating program, and may install this updating program in the environment in that the existent system has been installed.

In the aforementioned second embodiment, it has dealt with the case where the client terminal 1002 serving as a communication apparatus is formed by using the communication control section 1032 serving as first transmission means, first receiving means, second transmission means and second receiving means, the control section 1023 serving as temporarily-storing means, the display section 1025 serving as display means, and the storage medium 1029 serving as storage means. However, the present invention is not only limited to this but also a communication apparatus may be formed by other first transmission means, first receiving means, second transmission means, second receiving means, temporarily storing means, display means and storage means having other various circuit configurations.

Further, in the aforementioned first and second embodiments, radio broadcasting broadcasted from a radio station is applied to the broadcasting that can be received by the terminal unit 10 and the client terminal 1002. However, the present invention is not only limited to this but also the terminal unit 10 and the client terminal 1002 may receive Internet radio broadcasting and satellite radio broadcasting and may obtain related information and radio broadcasting information about the broadcasting, or may receive television broadcasting broadcasted from a broadcasting station for television and may obtain various broadcasting information or the like on television programs by the television broadcasting from a server on the network.

Furthermore, in the aforementioned first and second embodiments, it has dealt with the case where the hardware circuit blocks, the functional circuit blocks and the program modules are mounted in the terminal unit 10 and the client terminal 1002. However, the present invention is not only limited to this but also they may be mounted in various terminals other than the terminal unit 10 and the client terminal 1002, such as a cellular phone and a personal computer. Provided that it is a terminal having these hardware circuit blocks, functional circuit blocks and program modules, the same processing as the aforementioned terminal unit 10 and client terminal 1002 can be realized.

INDUSTRIAL APPLICABILITY

The present invention can be utilized also in various network systems such as a service for providing video contents, in addition to a network system for providing a music related service.

EXPLANATION OF REFERENCE NUMERALS

1 . . . COMMUNICATION APPARATUS, 2 . . . FIRST TRANSMISSION MEANS, 3 . . . FIRST RECEIVING MEANS, 4 . . . TEMPORARILY-STORING MEANS, 5 . . . DISPLAY MEANS, 6 . . . SECOND TRANSMISSION MEANS, 7 . . . SECOND RECEIVING MEANS, 8 . . . STORAGE MEANS, 11 . . . CPU, 20 . . . RAM, 21 . . . HDD, 1000 . . . MUSIC RELATED SERVICE PROVISION SYSTEM, 1002 . . . CLIENT TERMINAL, 1003 . . . PORTAL SERVER, 1004 . . . MUSIC DATA DISTRIBUTION SERVER, 1005 . . . TRADE SERVER, 1006 . . . RADIO BROADCASTING INFORMATION DISTRIBUTION SERVER, 1023 . . . CONTROL SECTION, 1029 . . . STORAGE MEDIUM, 1037 . . . AUTHENTICATION PROCESSING SECTION, 1038 . . . AUTHENTICATION INFORMATION STORING SECTION.

The invention claimed is:

1. A communication method for obtaining information concerning contents of a broadcasting program comprising:

receiving, at a device from a server, first information corresponding to the contents of a plurality of broadcasting programs;

temporarily storing said first information in a first storage media;

receiving a request to permanently store said first information temporarily stored in said first storage media in a second storage media;

transmitting, from said device to said server, second information corresponding to said contents of said plurality of broadcasting programs responsive to said request to permanently store said first information in said second storage media;

receiving, at said device, said second information; and storing said second information in said second storage media.

2. The communication method according to claim 1, further comprising:

transmitting, from said device to said server, a service session identification;

receiving, at said device from said server, authentication information responsive to said service session identification;

transmitting, from said device to said server, said authentication information and said first information corresponding to said contents of said plurality of broadcasting programs.

3. The communication method according to claim 1, further comprising:

transmitting said first information stored in said first storage media to a display device.

4. The communication method according to claim 1, wherein said plurality of broadcasting programs correspond to at least one of a television broadcast, radio broadcast, and an internet broadcast.

5. The communication method according to claim 1, wherein said first information corresponding to said contents of said plurality of broadcasting programs corresponds to at least one of a broadcast date, broadcast time, broadcast title, and broadcast duration.

6. A communication apparatus for obtaining information concerning contents of a broadcasting program comprising:

a network interface configured to receive from a server first information corresponding to the contents of a plurality of broadcasting programs;

a first memory configured to temporarily store said first information;

an interface configured to receive a request to permanently store said first information stored in said first memory in a second memory;

said network interface configured to transmit from said server second information corresponding to said contents of said plurality of broadcasting programs responsive to said request to permanently store said first information in said second memory;

said network interface configured to receive from said server said second information; and said second memory configured to store said second information.

7. The communication apparatus according to claim 6, wherein said network interface is configured to transmit a service session identification and to receive authentication information responsive to said service session identification.

8. The communication apparatus according to claim 7, wherein said network interface is configured to transmit, from said device to said server, said authentication information and said first information concerning said contents of said plurality of broadcasting programs.

9. The communication apparatus according to claim 6, further comprising:

a display device configured to display said first information temporarily stored in said first memory.

10. The communication apparatus according to claim 6, wherein said plurality of broadcasting programs correspond to at least one of a television broadcast, radio broadcast, and an internet broadcast.

11. The communication apparatus according to claim 6, wherein said first information concerning said contents of said plurality of broadcasting programs corresponds to at least one of a broadcast date, broadcast time, broadcast title, and broadcast duration.

12. A communication apparatus for obtaining information concerning contents of a broadcasting program comprising:

first receiving means for receiving, at a device from a server, first information corresponding to the contents of a plurality of broadcasting programs;

temporary storage means for temporarily storing said first information;

second receiving means for receiving a request to permanently store said first information temporarily stored in said temporary storage means;

transmitting means for transmitting, from said device to said server, second information corresponding to said contents of said plurality of broadcasting programs responsive to said request to permanently store said first information;

third receiving means for receiving, at said device, said second information; and permanent storage means for permanently storing said second information.

13. The communication apparatus according to claim 12, further comprising:

means for transmitting a service session identification; and means for receiving authentication information responsive to said service session identification.

14. The communication apparatus according to claim 12, further comprising:

display means for displaying said first information temporarily stored in said temporary storage means.

15. The communication apparatus according to claim 12, wherein said plurality of broadcasting programs correspond to at least one of a television broadcast, radio broadcast, and an internet broadcast.

16. The communication apparatus according to claim 12, wherein said first information concerning said contents of said plurality of broadcasting programs corresponds to at least one of a broadcast date, broadcast time, broadcast title, and broadcast duration.

* * * * *